US012732966B2

(12) United States Patent
Hu et al.

(10) Patent No.: US 12,732,966 B2
(45) Date of Patent: Sep. 8, 2026

(54) METHOD AND DEVICE FOR PHYSICAL UPLINK CONTROL CHANNEL RESOURCE DETERMINATION IN WIRELESS COMMUNICATIONS

(71) Applicant: Apogee 5G Global, LLC, Plano, TX (US)

(72) Inventors: Yang Hu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 289 days.

(21) Appl. No.: 18/235,354

(22) Filed: Aug. 18, 2023

(65) Prior Publication Data

US 2023/0413235 A1 Dec. 21, 2023

Related U.S. Application Data

(63) Continuation of application No. PCT/CN2022/080132, filed on Mar. 10, 2022.

(30) Foreign Application Priority Data

Mar. 12, 2021 (CN) ......................... 202110268952.1

(51) Int. Cl.

*H04W 72/02* (2009.01)
*H04W 72/1273* (2023.01)
*H04W 72/232* (2023.01)

(52) U.S. Cl.

CPC ....... *H04W 72/02* (2013.01); *H04W 72/1273* (2013.01); *H04W 72/232* (2023.01)

(58) Field of Classification Search

CPC .............. H04W 72/02; H04W 72/232; H04W 72/1273

See application file for complete search history.

(56) References Cited

U.S. PATENT DOCUMENTS 10,715,283 B2 * 7/2020 Park ...................... H04L 1/1861
11,722,255 B2 * 8/2023 Park ...................... H04L 1/1854 370/329

(Continued)

FOREIGN PATENT DOCUMENTS

CN 107733620 A 2/2018
CN 107733621 A 2/2018

(Continued)

OTHER PUBLICATIONS

First Office Action of Chinese patent application No. CN202110268952.1 dated Mar. 7, 2024.

(Continued)

*Primary Examiner* — Michael J Moore, Jr.
(74) *Attorney, Agent, or Firm* — Volpe Koenig

(57) ABSTRACT

The present application discloses a method and a device in a node for wireless communications. A first receiver receives a second signal; a first transmitter transmits a first signal in a target radio resource pool, the first signal carries a third bit block and a fourth bit block; wherein a first bit block is associated with the second signal; a second bit block corresponds to a target index, the target index is a first index or a second index, and the first index is different from the second index; the third bit block is related to the first bit block, and the fourth bit block is related to the second bit block; a determination method of the target radio resource pool is related to the target index.

18 Claims, 9 Drawing Sheets

(56) References Cited

U.S. PATENT DOCUMENTS

| | | | | |
|---|---|---|---|---|
| 11,785,618 | B2 * | 10/2023 | Jiang | H04L 1/1896 370/329 |
| 2014/0153484 | A1 | 6/2014 | Kim | |
| 2019/0261361 | A1 | 8/2019 | Xiong et al. | |
| 2020/0259625 | A1 | 8/2020 | Papasakellariou | |
| 2020/0374978 | A1 * | 11/2020 | Panteleev | H04W 72/0446 |
| 2021/0051673 | A1 * | 2/2021 | Chae | H04W 72/23 |
| 2021/0099994 | A1 * | 4/2021 | Park | H04L 1/1861 |
| 2021/0168762 | A1 * | 6/2021 | Huang | H04B 7/0456 |
| 2022/0053462 | A1 * | 2/2022 | Wang | H04W 72/1263 |
| 2022/0159692 | A1 | 5/2022 | Lee et al. | |
| 2022/0225287 | A1 * | 7/2022 | Zhang | H04W 72/56 |
| 2022/0346085 | A1 * | 10/2022 | Hu | H04L 5/0053 |
| 2022/0369360 | A1 * | 11/2022 | Zhao | H04L 1/1642 |
| 2023/0164816 | A1 * | 5/2023 | Hwang | H04W 72/25 370/330 |
| 2023/0413235 | A1 * | 12/2023 | Hu | H04W 72/02 |

FOREIGN PATENT DOCUMENTS

| | | | |
|---|---|---|---|
| CN | 109964437 | A | 7/2019 |
| CN | 110445593 | A | 11/2019 |
| CN | 111448839 | A | 7/2020 |
| WO | 2020204526 | A1 | 10/2020 |

OTHER PUBLICATIONS

First Search Report of Chinese patent application No. CN202110268952.1 dated Mar. 6, 2024.

Supplementary European search report in application No. 22766357, dated Jun. 28, 2024.

Second Office Action of Chinese patent application No. CN202110268952.1 dated Oct. 24, 2024.

ISR received in application No. PCT/CN2022/080132 dated May 23, 2022.

Third Generation Partnership Project, "Technical Specification Group Radio Access Network; NR; Physical channels and modulation (Release 16)," 3GPP TS 38.211 V16.4.0 (Dec. 2020).

Third Generation Partnership Project, "Technical Specification Group Radio Access Network; NR; Multiplexing and channel coding (Release 16)," 3GPP TS 38.212 V16.4.0 (Dec. 2020).

Third Generation Partnership Project, "Technical Specification Group Radio Access Network; NR; Physical layer procedures for control (Release 16)," 3GPP TS 38.213 V16.4.0 (Dec. 2020).

Third Generation Partnership Project, "Technical Specification Group Radio Access Network; NR; Physical layer procedures for data (Release 16)," 3GPP TS 38.214 V16.4.0 (Dec. 2020).

Third Generation Partnership Project, "Technical Specification Group Radio Access Network; NR; Radio Resource Control (RRC) protocol specification (Release 16)," 3GPP TS 38.331 V16.3.1 (Jan. 2021).

* cited by examiner

EPS 200
HSS 220
NG-RAN 202
MME/AMF/UPF 211
Other MMEs/AMFs/UPFs 214
UE 201
NR Node B 203
First link
Third link
Other NR Nodes B 204
S-GW 212
P-GW 213
Internet Service 230
EPC/5G-CN 210
UE 241
Second link Start S81: target index is?

Second index

S82. Both first bit block and second bit block are used to determine second number, N radio resource pools respectively correspond to N number ranges, target radio resource pool is a radio resource pool corresponding to second number range among the N radio resource pools, and the second number range is a number range comprising the second number among the N number ranges, N being a positive integer greater than 1

First index

S83. Both first bit block and second bit block are used to determine first number, K radio resource pool lists respectively correspond to K number ranges, target radio resource pool list is a radio resource pool list corresponding to first number range in the K radio resource pool lists, the first number range is a number range comprising the first number among the K number ranges, target radio resource pool is a radio resource pool with a default sequence index in the target radio resource pool list, and a number radio resource pools comprised in at least one of the K radio resource pool lists is greater than 1, K being a positive integer greater than 1

End

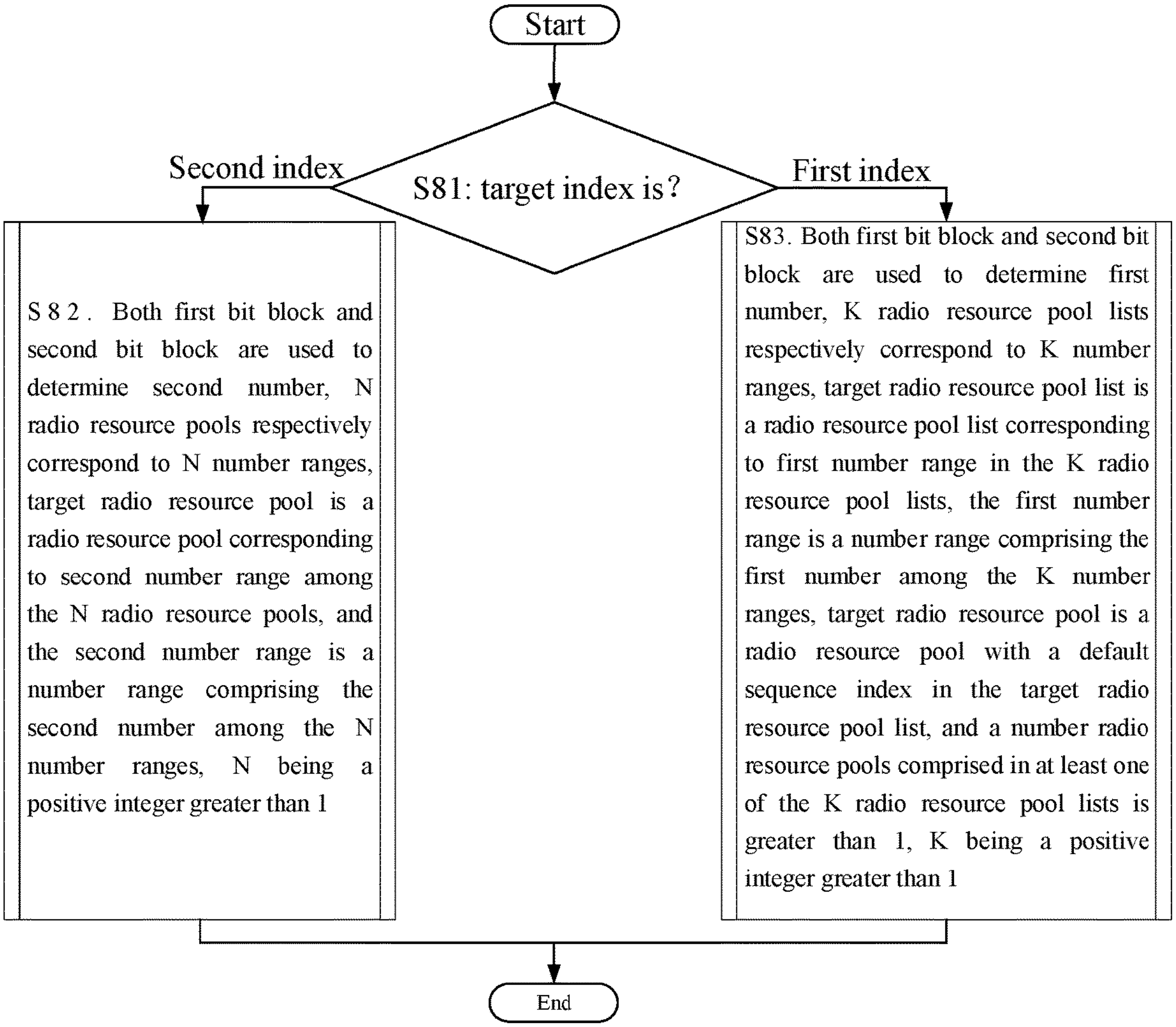

FIG. 8

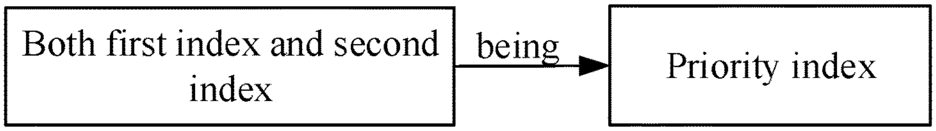

FIG. 9

METHOD AND DEVICE FOR PHYSICAL UPLINK CONTROL CHANNEL RESOURCE DETERMINATION IN WIRELESS COMMUNICATIONS

CROSS REFERENCE TO RELATED APPLICATIONS

This application is the continuation of the international patent application No. PCT/CN2022/080132, filed on Mar. 10, 2022, and claims the priority benefit of Chinese Patent Application No. 202110268952.1, filed on Mar. 12, 2021, the full disclosure of which is incorporated herein by reference.

BACKGROUND

Technical Field

The present application relates to transmission methods and devices in wireless communication systems, and in particular to a method and device of radio signal transmission in a wireless communication system supporting cellular networks.

Related Art

In 3rd Generation Partner Project (3GPP) New Radio (NR) system, in order to support Ultra Reliable and Low Latency Communications (URLLC) services with higher demands (such as higher reliability, lower latency and etc.), NR Release 16 protocol has enhanced many aspects of uplink transmission.

A Work Item (WI) of URLLC enhancement in NR Release 17 was approved at 3GPP RAN plenary, where the multiplexing of various Intra-UE services is a focus that needs to be researched.

SUMMARY

Against the above-mentioned background, how to process the multiplexing of Uplink Control Information (UCI) is a key issue to be solved.

To address the above problem, the present application provides a solution. It should be noted that the above description adopts URLLC as an example; the present application is also applicable to other scenarios, such as sidelink, Internet of Things (IoT), Internet of Vehicles (IoV), non-terrestrial networks (NTN), Multicast and Broadcast Services (MBS), etc., where similar technical effects can be achieved. In addition, the adoption of a unified solution in different scenarios (including but not limited to URLLC, uplink, sidelink, IoT, IoV, NTN, MBS) also helps to reduce hardware complexity and cost, or improve performance. If no conflict is incurred, embodiments in any node in the present application and the characteristics of the embodiments are also applicable to any other node, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

- receiving a second signal; and
- transmitting a first signal in a target radio resource pool, the first signal carrying a third bit block and a fourth bit block;
- herein, a first bit block is associated with the second signal; a second bit block corresponds to a target index, the target index is a first index or a second index, and the first index is different from the second index; the third bit block is related to the first bit block, and the fourth bit block is related to the second bit block; a determination method of the target radio resource pool is related to the target index.

In one embodiment, problems to be solved in the present application comprise: how to determine a radio resource pool used for a transmission of multiplexed UCI according to priority index.

In one embodiment, problems to be solved in the present application comprise: how to determine a PUCCH resource used for a transmission of multiplexed UCI according to priority index.

In one embodiment, problems to be solved in the present application comprise: how to select an appropriate method used for determining the target radio resource pool according to the target index.

In one embodiment, problems to be solved in the present application comprise: how to perform a selection of PUCCH resources used for UCI multiplexing based on RNTI.

In one embodiment, problems to be solved in the present application comprise: how to perform a selection of PUCCH resources based on a type of a multiplexed UCI.

According to one aspect of the present application, the above method is characterized in comprising:

- receiving a first signaling;
- herein, the first signaling comprises scheduling information of the second signal.

According to one aspect of the present application, the above method is characterized in that

- the meaning of the phrase that a determination method of the target radio resource pool is related to the target index comprises: when the target index is the second index, the first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, the first signaling is used to indicate the target radio resource pool from the target radio resource pool list, M being a positive integer greater than 1; when the target index is the first index, the first bit block and the second bit block are both used to determine a first number, N radio resource pools respectively correspond to N number ranges, the target radio resource pool is a radio resource pool corresponding to a first number range among the N radio resource pools, the first number range is a number range comprising the first number among the N number ranges, N being a positive integer greater than 1.

In one embodiment, characteristics of the above method comprise: the first bit block comprises low-priority HARQ-ACK information bit(s) for PDSCH reception(s) scheduled by DCI(s), and the second bit block only comprises HARQ-ACK information bit(s) for SPS PDSCH reception(s).

In one embodiment, characteristics of the above method comprise: determining whether the target radio resource pool is determined from one of the M radio resource pool lists or the target radio resource pool is determined from the N radio resource pools according to a priority index corresponding to the second bit block.

In one embodiment, advantages of the above method comprise: it is convenient to multiplex low-priority HARQ-ACK information bit(s) for PDSCH reception(s) scheduled by DCI(s) and high-priority HARQ-ACK information bit(s) for SPS PDSCH reception(s) into a PUCCH resource configured to a high-priority UCI, which is conducive to ensuring the transmission performance of the high-priority UCI.

According to one aspect of the present application, the above method is characterized in that the meaning of the phrase that a determination method of the target radio resource pool is related to the target index comprises: when the target index is the second index, the first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, the first signaling is used to indicate the target radio resource pool from the target radio resource pool list, M being a positive integer greater than 1; when the target index is the first index, the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one embodiment, characteristics of the above method comprise: the first bit block comprises low-priority HARQ-ACK information bit(s) for PDSCH reception(s) scheduled by DCI(s), the second bit block comprises at least one of HARQ-ACK information bit(s) or SR bit(s) for SPS PDSCH reception(s), and the second bit block does not comprise HARQ-ACK information bit(s) for PDSCH reception(s) scheduled by DCI(s).

In one embodiment, characteristics of the above method comprise: determining whether the target radio resource is a radio resource pool indicated by a DCI from one of the M radio resource pool lists or a radio resource pool with a default sequential index in one of the K radio resource pool lists according to a priority index corresponding to the second bit block.

In one embodiment, advantages of the above method comprise: it is convenient to multiplex low-priority HARQ-ACK information bit(s) for PDSCH reception(s) scheduled by DCI(s) and high-priority HARQ-ACK information bit(s) for SPS PDSCH reception(s) into a PUCCH resource configured to a high-priority UCI, which is conducive to ensuring the transmission performance of the high-priority UCI.

In one embodiment, advantages of the above method comprise: it is convenient to multiplex low-priority HARQ-ACK information bit(s) for PDSCH reception(s) scheduled by DCI(s) and a high-priority SR bit into a PUCCH resource configured to a high-priority UCI, which is conducive to ensuring the transmission performance of the high-priority UCI.

According to one aspect of the present application, the above method is characterized in that the meaning of the phrase that a determination method of the target radio resource pool is related to the target index comprises: when the target index is the second index, the first bit block and the second bit block are both used to determine a second number, N radio resource pools respectively correspond to N number ranges, the target radio resource pool is a radio resource pool corresponding to a second number range among the N radio resource pools, the second number range is a number range comprising the second number among the N number ranges, N being a positive integer greater than 1; when the target index is the first index, the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one embodiment, characteristics of the above method comprise: the first bit block comprises low-priority HARQ-ACK information bit(s) for SPS PDSCH reception(s), and the second bit block comprises SR bit(s).

In one embodiment, characteristics of the above method comprise: the first bit block and the second bit block do not comprise HARQ-ACK information bit(s) for PDSCH reception(s) scheduled by DCI(s).

In one embodiment, characteristics of the above method comprise: determining whether the target radio resource is one of the N radio resource pool or a radio resource pool with a default sequential index in one of the K radio resource pool lists according to a priority index corresponding to the second bit block.

In one embodiment, advantages of the above method comprise: it is convenient to multiplex a low-priority HARQ-ACK information bit(s) for SPS PDSCH reception (s) and a high-priority SR bit into a PUCCH resource configured to a high-priority UCI, which is conducive to ensuring the transmission performance of the high-priority UCI.

According to one aspect of the present application, the above method is characterized in that the first bit block comprises a UCI bit, and the second bit block comprises a UCI bit.

According to one aspect of the present application, the above method is characterized in that the first bit block corresponds to the second index.

According to one aspect of the present application, the above method is characterized in that the first index and the second index are priority indexes.

According to one aspect of the present application, the above method is characterized in that a first radio resource pool is reserved for the first bit block, and a second radio resource pool is reserved for the second bit block; the first radio resource pool and the second radio resource pool are overlapped in time domain.

According to one aspect of the present application, the above method is characterized in comprising:

receiving a third signal;

herein, the second bit block is associated with the third signal.

In one embodiment, multiple characteristics of the above method can be combined with each other arbitrarily without conflict.

The present application provides a method in a second node for wireless communications, comprising:

transmitting a second signal; and receiving a first signal in a target radio resource pool, the first signal carrying a third bit block and a fourth bit block;

herein, a first bit block is associated with the second signal; a second bit block corresponds to a target index, the target index is a first index or a second index, and the first index is different from the second index; the third bit block is related to the first bit block, and the fourth bit block is related to the second bit block; a determination method of the target radio resource pool is related to the target index.

According to one aspect of the present application, the above method is characterized in comprising:

transmitting a first signaling;

herein, the first signaling comprises scheduling information of the second signal.

According to one aspect of the present application, the above method is characterized in that the meaning of the phrase that a determination method of the target radio resource pool is related to the target index comprises: when the target index is the second index, the first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, the first signaling is used to indicate the target radio resource pool from the target radio resource pool list, M being a positive integer greater than 1; when the target index is the first index, the first bit block and the second bit block are both used to determine a first number, N radio resource pools respectively correspond to N number ranges, the target radio resource pool is a radio resource pool corresponding to a first number range among the N radio resource pools, the first number range is a number range comprising the first number among the N number ranges, N being a positive integer greater than 1.

According to one aspect of the present application, the above method is characterized in that the meaning of the phrase that a determination method of the target radio resource pool is related to the target index comprises: when the target index is the second index, the first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, the first signaling is used to indicate the target radio resource pool from the target radio resource pool list, M being a positive integer greater than 1; when the target index is the first index, the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

According to one aspect of the present application, the above method is characterized in that the meaning of the phrase that a determination method of the target radio resource pool is related to the target index comprises: when the target index is the second index, the first bit block and the second bit block are both used to determine a second number, N radio resource pools respectively correspond to N number ranges, the target radio resource pool is a radio resource pool corresponding to a second number range among the N radio resource pools, the second number range is a number range comprising the second number among the N number ranges, N being a positive integer greater than 1; when the target index is the first index, the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

According to one aspect of the present application, the above method is characterized in that the first bit block comprises a UCI bit, and the second bit block comprises a UCI bit.

According to one aspect of the present application, the above method is characterized in that the first bit block corresponds to the second index.

According to one aspect of the present application, the above method is characterized in that the first index and the second index are priority indexes.

According to one aspect of the present application, the above method is characterized in that a first radio resource pool is reserved for the first bit block, and a second radio resource pool is reserved for the second bit block; the first radio resource pool and the second radio resource pool are overlapped in time domain.

According to one aspect of the present application, the above method is characterized in comprising:

transmitting a third signal;

herein, the second bit block is associated with the third signal.

In one embodiment, multiple characteristics of the above method can be combined with each other arbitrarily without conflict.

The present application provides a first node for wireless communications, comprising:

a first receiver, receiving a second signal; and a first transmitter, transmitting a first signal in a target radio resource pool, the first signal carrying a third bit block and a fourth bit block;

herein, a first bit block is associated with the second signal; a second bit block corresponds to a target index, the target index is a first index or a second index, and the first index is different from the second index; the third bit block is related to the first bit block, and the fourth bit block is related to the second bit block; a determination method of the target radio resource pool is related to the target index.

The present application provides a second node for wireless communications, comprising:

a second transmitter, transmitting a second signal; and a second receiver, receiving a first signal in a target radio resource pool, the first signal carrying a third bit block and a fourth bit block;

herein, a first bit block is associated with the second signal; a second bit block corresponds to a target index, the target index is a first index or a second index, and the first index is different from the second index; the third bit block is related to the first bit block, and the fourth bit block is related to the second bit block; a determination method of the target radio resource pool is related to the target index.

The present application provides a method in a first node for wireless communications, comprising:

receiving a second signal; and transmitting a first signal in a target radio resource pool, the first signal carrying a third bit block and a fourth bit block;

herein, a first bit block is associated with the second signal; the third bit block is related to the first bit block, and the fourth bit block is related to a second bit block; the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one embodiment, the above method provides a scheme for determining PUCCH resources used for a transmission of a multiplexed UCI without DCI related indication.

In one embodiment, advantages of the above method comprise: it is conducive to ensuring the transmission performance of a high-priority UCI.

In one embodiment, advantages of the above method comprise: it is conducive to implementing the multiplexing situation of applying a unified multiplexing rule for different priorities and different types of UCIs.

In one embodiment, advantages of the above method comprise: good compatibility.

According to one aspect of the present application, the above method is characterized in comprising:

receiving a first signaling;

herein, the first signaling comprises scheduling information of the second signal.

According to one aspect of the present application, the above method is characterized in that the first bit block comprises a UCI bit, and the second bit block comprises a UCI bit.

According to one aspect of the present application, the above method is characterized in that the second bit block comprises an SR bit.

According to one aspect of the present application, the above method is characterized in that the first bit block corresponds to the second index.

According to one aspect of the present application, the above method is characterized in that the first index and the second index are priority indexes.

According to one aspect of the present application, the above method is characterized in that a first radio resource pool is reserved for the first bit block, and a second radio resource pool is reserved for the second bit block; the first radio resource pool and the second radio resource pool are overlapped in time domain.

In one embodiment, multiple characteristics of the above method can be combined with each other arbitrarily without conflict.

The present application provides a method in a second node for wireless communications, comprising: transmitting a second signal; and receiving a first signal in a target radio resource pool, the first signal carrying a third bit block and a fourth bit block;

herein, a first bit block is associated with the second signal; the third bit block is related to the first bit block, and the fourth bit block is related to a second bit block; the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

According to one aspect of the present application, the above method is characterized in comprising:

transmitting a first signaling;

herein, the first signaling comprises scheduling information of the second signal.

According to one aspect of the present application, the above method is characterized in that the first bit block comprises a UCI bit, and the second bit block comprises a UCI bit.

According to one aspect of the present application, the above method is characterized in that the second bit block comprises an SR bit.

According to one aspect of the present application, the above method is characterized in that the first bit block corresponds to the second index.

According to one aspect of the present application, the above method is characterized in that the first index and the second index are priority indexes.

According to one aspect of the present application, the above method is characterized in that a first radio resource pool is reserved for the first bit block, and a second radio resource pool is reserved for the second bit block; the first radio resource pool and the second radio resource pool are overlapped in time domain.

In one embodiment, multiple characteristics of the above method can be combined with each other arbitrarily without conflict.

The present application provides a first node for wireless communications, comprising:

a first receiver, receiving a second signal; and a first transmitter, transmitting a first signal in a target radio resource pool, the first signal carrying a third bit block and a fourth bit block;

herein, a first bit block is associated with the second signal; the third bit block is related to the first bit block, and the fourth bit block is related to a second bit block; the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

The present application provides a second node for wireless communications, comprising:

a second transmitter, transmitting a second signal; and a second receiver, receiving a first signal in a target radio resource pool, the first signal carrying a third bit block and a fourth bit block;

herein, a first bit block is associated with the second signal; the third bit block is related to the first bit block, and the fourth bit block is related to a second bit block; the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

The present application provides a method in a first node for wireless communications, comprising:

receiving a first signaling; and transmitting a first signal in a target radio resource pool, the first signal carrying a first bit block and a second bit block;

herein, the first signaling is used to determine the target radio resource pool; a number of bit(s) comprised in the second bit block (size of the second bit block) is used to determine a first intermediate number, the first bit block and a first limiting parameter value are used to determine a second intermediate number, a second limiting parameter value is used to determine a third intermediate number, and the third intermediate number is linearly correlated with the second limiting parameter value; a number of resource elements used to transmit the second bit block in the target radio resource pool is not greater than a smallest one among a result of the first intermediate number rounding to an integer, the second intermediate number and a result of the third intermediate number rounding to an integer.

In one embodiment, problems to be solved in the present application comprise: when UCIs with different priorities are multiplexed into a same PUSCH, how to determine a number of resource elements occupied by a low-priority UCI.

In one embodiment, problems to be solved in the present application comprise: when HARQ-ACK information with different priorities are multiplexed to a same PUSCH, how to determine a number of resource elements occupied by low-priority HARQ-ACK information.

In one embodiment, characteristics of the above method comprise: when HARQ-ACK information with different priorities is multiplexed into a same PUSCH, a number of resource elements occupied by low-priority HARQ-ACK information is limited by the second intermediate number determined by a scaling parameter value corresponding to a high priority, and also by the result after the third intermediate number determined by a scaling parameter value corresponding to low priority rounding to an integer.

In one embodiment, advantages of the above method comprise: it is conducive to ensuring the transmission performance of UL-SCH bits (especially high-priority UL-SCH bits).

In one embodiment, advantages of the above method comprise: it is conducive to avoiding a low-priority UCI occupying too much transmission resources reserved for high-priority bits.

In one embodiment, advantages of the above method comprise: it is conducive to improving the system efficiency.

In one embodiment, advantages of the above method comprise: good compatibility.

In one embodiment, advantages of the above method comprise: it is conducive to multiplexing UCIs with different priorities onto a same PUSCH on the premise of ensuring the transmission performance of UL-SCH bits.

According to one aspect of the present application, the above method is characterized in that the first intermediate number, the second intermediate number and the third intermediate number are used to determine the number of the resource elements used to transmit the second bit block in the target radio resource pool.

According to one aspect of the present application, the above method is characterized in that the number of the resource elements used to transmit the second bit block in the target radio resource pool is equal to a smallest one among a result of the first intermediate number rounding to an integer, the second intermediate number and a result of the third intermediate number rounding to an integer.

According to one aspect of the present application, the above method is characterized in that a first actual resource amount is used to determine a fourth intermediate number; the number of the resource elements used to transmit the second bit block in the target radio resource pool is equal to a smallest one among the fourth of a result of the first intermediate number rounding to an integer, the second intermediate number, a result of the third intermediate number rounding to an integer, and the fourth intermediate number.

In one embodiment, characteristics of the above method comprise: when HARQ-ACK information with different priorities is multiplexed into a same actual repetition of a same PUSCH transmission, a number of resource elements occupied by low-priority HARQ-ACK information is not only limited by the second intermediate number determined by a scaling parameter value corresponding to a high priority but also by the result after rounding the third intermediate number determined by a scaling parameter value corresponding to a low priority, and also limited by resources occupied by the same actual repetition of the same PUSCH transmission.

According to one aspect of the present application, the above method is characterized in that the first limiting parameter value is configured for a first priority index, and the second limiting parameter value is configured for a second priority index.

According to one aspect of the present application, the above method is characterized in that the first bit block comprises a HARQ-ACK information bit corresponding to a first priority index.

According to one aspect of the present application, the above method is characterized in that the second bit block comprises a HARQ-ACK information bit corresponding to a second priority index.

According to one aspect of the present application, the above method is characterized in that the first signal also carries a transport block.

According to one aspect of the present application, the above method is characterized in that the first signaling indicates a first priority index.

In one embodiment, multiple characteristics of the above method can be combined with each other arbitrarily without conflict.

The present application provides a method in a second node for wireless communications, comprising:

transmitting a first signaling; and receiving a first signal in a target radio resource pool, the first signal carrying a first bit block and a second bit block;

herein, the first signaling is used to determine the target radio resource pool; a number of bit(s) comprised in the second bit block (size of the second bit block) is used to determine a first intermediate number, the first bit block and a first limiting parameter value are used to determine a second intermediate number, a second limiting parameter value is used to determine a third intermediate number, and the third intermediate number is linearly correlated with the second limiting parameter value; a number of resource elements used to transmit the second bit block in the target radio resource pool is not greater than a smallest one among a result of the first intermediate number rounding to an integer, the second intermediate number and a result of the third intermediate number rounding to an integer.

According to one aspect of the present application, the above method is characterized in that the first intermediate number, the second intermediate number and the third intermediate number are used to determine the number of the resource elements used to transmit the second bit block in the target radio resource pool.

According to one aspect of the present application, the above method is characterized in that the number of the resource elements used to transmit the second bit block in the target radio resource pool is equal to a smallest one among a result of the first intermediate number rounding to an integer, the second intermediate number and a result of the third intermediate number rounding to an integer.

According to one aspect of the present application, the above method is characterized in that a first actual resource amount is used to determine a fourth intermediate number; the number of the resource elements used to transmit the second bit block in the target radio resource pool is equal to a smallest one among the fourth of a result of the first intermediate number rounding to an integer, the second intermediate number, a result of the third intermediate number rounding to an integer, and the fourth intermediate number.

According to one aspect of the present application, the above method is characterized in that the first limiting parameter value is configured for a first priority index, and the second limiting parameter value is configured for a second priority index.

According to one aspect of the present application, the above method is characterized in that the first bit block comprises a HARQ-ACK information bit corresponding to a first priority index.

According to one aspect of the present application, the above method is characterized in that the second bit block comprises a HARQ-ACK information bit corresponding to a second priority index.

According to one aspect of the present application, the above method is characterized in that the first signal also carries a transport block.

According to one aspect of the present application, the above method is characterized in that the first signaling indicates a first priority index.

In one embodiment, multiple characteristics of the above method can be combined with each other arbitrarily without conflict.

The present application provides a first node for wireless communications, comprising:

a first receiver, receiving a first signaling; and a first transmitter, transmitting a first signal in a target radio resource pool, the first signal carrying a first bit block and a second bit block;

herein, the first signaling is used to determine the target radio resource pool; a number of bit(s) comprised in the second bit block (size of the second bit block) is used to determine a first intermediate number, the first bit block and a first limiting parameter value are used to determine a second intermediate number, a second limiting parameter value is used to determine a third intermediate number, and the third intermediate number is linearly correlated with the second limiting parameter value; a number of resource elements used to transmit the second bit block in the target radio resource pool is not greater than a smallest one among a result of the first intermediate number rounding to an integer, the second intermediate number and a result of the third intermediate number rounding to an integer.

The first node according to the present application, wherein the first intermediate number, the second intermediate number and the third intermediate number are used to determine the number of the resource elements used to transmit the second bit block in the target radio resource pool.

The first node according to the present application, wherein the number of the resource elements used to transmit the second bit block in the target radio resource pool is equal to a smallest one among a result of the first intermediate number rounding to an integer, the second intermediate number and a result of the third intermediate number rounding to an integer.

The first node according to the present application, wherein a first actual resource amount is used to determine a fourth intermediate number; the number of the resource elements used to transmit the second bit block in the target radio resource pool is equal to a smallest one among the fourth of a result of the first intermediate number rounding to an integer, the second intermediate number, a result of the third intermediate number rounding to an integer, and the fourth intermediate number.

The first node according to the present application, wherein the first limiting parameter value is configured for a first priority index, and the second limiting parameter value is configured for a second priority index.

The first node according to the present application, wherein the first bit block comprises a HARQ-ACK information bit corresponding to a first priority index.

The first node according to the present application, wherein the second bit block comprises a HARQ-ACK information bit corresponding to a second priority index.

The first node according to the present application, wherein the first signal also carries a transport block.

The first node according to the present application, wherein the first signaling indicates a first priority index.

In one embodiment, the above multiple characteristics can be combined with each other arbitrarily without conflict.

The present application provides a second node for wireless communications, comprising:

a second transmitter, transmitting a first signaling; and a second receiver, receiving a first signal in a target radio resource pool, the first signal carrying a first bit block and a second bit block;

herein, the first signaling is used to determine the target radio resource pool; a number of bit(s) comprised in the second bit block (size of the second bit block) is used to determine a first intermediate number, the first bit block and a first limiting parameter value are used to determine a second intermediate number, a second limiting parameter value is used to determine a third intermediate number, and the third intermediate number is linearly correlated with integer, the second intermediate number and a result of the third intermediate number rounding to an integer.

The present application provides a method in a first node for wireless communications, comprising:

receiving a first signaling; and transmitting T bit blocks in a first time window, T being a positive integer greater than 1;

herein, a first bit block is associated with the first signaling, and the first bit block does not belong to the T bit blocks; any of the T bit blocks is a first-type bit block or a second-type bit block, the first-type bit block is a bit block comprising a HARQ-ACK information bit, and the second-type bit block is a bit block different from the first-type bit block and having a same priority as the first-type bit block; whether a third bit block is transmitted in the first time window is related to a number of the first-type bit block(s) in the T bit blocks, the third-type bit block is a bit block associated with the first bit block.

In one embodiment, problems to be solved in the present application comprise: when a low-priority PUCCH overlaps with multiple high-priority PUCCHs in time domain, how to deal with the problem of a low-priority UCI.

In one embodiment, problems to be solved in the present application comprise: when a low-priority PUCCH overlaps with multiple high-priority PUCCHs in time domain, how to determine whether a low-priority UCI is multiplexed into a high-priority PUCCH according to a type of a high-priority UCI.

In one embodiment, characteristics of the above method comprise: a low-priority PUCCH carrying a low-priority a HARQ-ACK information bit overlaps with multiple high-priority PUCCHs in time domain; a number of PUCCHs used to transmit a high-priority HARQ-ACK information bit in the plurality of high-priority PUCCHs is used to determine whether to multiplex a low-priority UCI into a high-priority PUCCH.

In one subembodiment of the above embodiment, any PUCCH of the multiple high-priority PUCCHs is used to transmit at least one of a high-priority HARQ-ACK information bit or a high-priority SR bit.

In one embodiment, advantages of the above method comprise: it alleviates the problem of system performance degradation incurred by the dropping of a low-priority HARQ-ACK information bit.

In one embodiment, advantages of the above method comprise: it is conducive to ensuring the transmission performance of a high-priority UCI.

In one embodiment, advantages of the above method comprise: the introduction of overly complex multiplexing rules is avoided.

According to one aspect of the present application, the above method is characterized in that whether the third-type bit block is transmitted in the first time window is related to a size relation between a number of the first-type bit block(s) in the T bit blocks and a first value.

According to one aspect of the present application, the above method is characterized in that whether the third-type bit block is transmitted in the first time window is related to a size relation between a first difference value and a first value, and the first difference value is equal to *T minus* a number of the first-type bit block(s) in the T bit blocks.

According to one aspect of the present application, the above method is characterized in that the T bit blocks are respectively transmitted in different T time sub-windows in the first time window.

According to one aspect of the present application, the above method is characterized in that the first time window is a slot.

According to one aspect of the present application, the above method is characterized in that time-domain resources occupied by transmissions of any two of the T bit blocks do not overlap.

According to one aspect of the present application, the above method is characterized in that when a number of the first-type bit block(s) in the T bit blocks is greater than a first value, the third-type bit block is transmitted in the first time window; when a number of the first-type bit block(s) in the T bit blocks is not greater than a first value, the third-type bit block is not transmitted in the first time window.

According to one aspect of the present application, the above method is characterized in that when a number of the first-type bit block(s) in the T bit blocks is not greater than a first value, the third-type bit block is transmitted in the first time window; when a number of the first-type bit block(s) in the T bit blocks is greater than a first value, the third-type bit block is not transmitted in the first time window.

According to one aspect of the present application, the above method is characterized in that when a number of the first-type bit block(s) in the T bit blocks is less than a first value, the third-type bit block is transmitted in the first time window; when a number of the first-type bit block(s) in the T bit blocks is not less than a first value, the third-type bit block is not transmitted in the first time window.

According to one aspect of the present application, the above method is characterized in that when a number of the first-type bit block(s) in the T bit blocks is not less than a first value, the third-type bit block is transmitted in the first time window; when a number of the first-type bit block(s) in the T bit blocks is less than a first value, the third-type bit block is not transmitted in the first time window.

According to one aspect of the present application, the above method is characterized in that when a first difference value is greater than a first value, the third-type bit block is transmitted in the first time window; when a first difference value is not greater than a first value, the third-type bit block is not transmitted in the first time window; the first difference value is equal to *T minus* a number of the first-type bit block(s) in the T bit blocks.

According to one aspect of the present application, the above method is characterized in that when a first difference value is not greater than a first value, the third-type bit block is transmitted in the first time window; when a first difference value is greater than a first value, the third-type bit block is not transmitted in the first time window; the first difference value is equal to *T minus* a number of the first-type bit block(s) in the T bit blocks.

According to one aspect of the present application, the above method is characterized in that when a first difference value is not less than a first value, the third-type bit block is transmitted in the first time window; when a first difference value is less than a first value, the third-type bit block is not transmitted in the first time window; the first difference value is equal to *T minus* a number of the first-type bit block(s) in the T bit blocks.

According to one aspect of the present application, the above method is characterized in that when a first difference value is less than a first value, the third-type bit block is transmitted in the first time window; when a first difference value is not less than a first value, the third-type bit block is not transmitted in the first time window; the first difference value is equal to *T minus* a number of the first-type bit block(s) in the T bit blocks.

According to one aspect of the present application, the above method is characterized in that when the third-type bit block is transmitted in the first time window, the third-type bit block and the first-type bit block in the T bit blocks are transmitted in a same radio resource pool.

According to one aspect of the present application, the above method is characterized in that when the third-type bit block is transmitted in the first time window and a number of the first-type bit blocks in the T bit blocks is greater than 1, the third-type bit block and the first-type bit block with an earliest start time in the T bit blocks are transmitted in a same radio resource pool.

According to one aspect of the present application, the above method is characterized in that when the third-type bit block is transmitted in the first time window, the third-type bit block and the second-type bit block in the T bit blocks are transmitted in a same radio resource pool.

According to one aspect of the present application, the above method is characterized in that when the third-type bit block is transmitted in the first time window and a number of the second-type bit blocks in the T bit blocks is greater than 1, the third-type bit block and the second-type bit block with an earliest start time in the T bit blocks are transmitted in a same radio resource pool.

According to one aspect of the present application, the above method is characterized in that for the T bit blocks and the first bit block, timeline condition(s) required to execute UCI multiplexing is(are) satisfied.

According to one aspect of the present application, the above method is characterized in that T radio resource pools are respectively reserved for the T bit blocks; a first radio resource pool is reserved for the first bit block, and the first radio resource overlap with each of the T radio resource pools in time domain.

According to one aspect of the present application, the above method is characterized in that a first radio resource pool is reserved for the first bit block, and the first radio resource pool comprises a PUCCH resource; a PUCCH format adopted by the PUCCH resource comprised in the first resource pool is PUCCH format 2.

According to one aspect of the present application, the above method is characterized in that a first radio resource pool is reserved for the first bit block, and the first radio resource pool comprises a PUCCH resource; a PUCCH format adopted by the PUCCH resource comprised in the first resource pool is PUCCH format 3.

According to one aspect of the present application, the above method is characterized in that a first radio resource pool is reserved for the first bit block, and the first radio resource pool comprises a PUCCH resource; a PUCCH format adopted by the PUCCH resource comprised in the first resource pool is PUCCH format 4.

According to one aspect of the present application, the above method is characterized in that all bit blocks in the T bit blocks correspond to a first priority index, the first bit block corresponds to a second priority index, and the second priority index is different from the first priority index.

According to one aspect of the present application, the above method is characterized in that the second-type bit block is a bit block comprising an SR bit.

According to one aspect of the present application, the above method is characterized in that the second-type bit block is a bit block comprising a bit indicating a positive SR.

According to one aspect of the present application, the above method is characterized in that the first value is equal to 0.

According to one aspect of the present application, the above method is characterized in that the first value is equal to 1.

According to one aspect of the present application, the above method is characterized in that the first value is equal to T.

According to one aspect of the present application, the above method is characterized in that the third-type bit block is: the first bit block, or, a bit block generated by the first bit block.

In one embodiment, multiple characteristics of the above method can be combined with each other arbitrarily without conflict.

The present application provides a method in a second node for wireless communications, comprising:

transmitting a first signaling; and receiving T bit blocks in a first time window, T being a positive integer greater than 1;

herein, a first bit block is associated with the first signaling, and the first bit block does not belong to the T bit blocks; any of the T bit blocks is a first-type bit block or a second-type bit block, the first-type bit block is a bit block comprising a HARQ-ACK information bit, and the second-type bit block is a bit block different from the first-type bit block and having a same priority as the first-type bit block; whether a third bit block is received in the first time window is related to a number of the first-type bit block(s) in the T bit blocks, and the third-type bit block is a bit block associated with the first bit block.

According to one aspect of the present application, the above method is characterized in that whether the third-type bit block is received in the first time window is related to a size relation between a number of the first-type bit block(s) in the T bit blocks and a first value.

According to one aspect of the present application, the above method is characterized in that whether the third-type bit block is received in the first time window is related to a size relation between a first difference value and a first value, and the first difference value is equal to *T minus* a number of the first-type bit block(s) in the T bit blocks.

According to one aspect of the present application, the above method is characterized in that the T bit blocks are respectively received in different T time sub-windows in the first time window.

According to one aspect of the present application, the above method is characterized in that the first time window is a slot.

According to one aspect of the present application, the above method is characterized in that time-domain resources occupied by transmissions of any two of the T bit blocks do not overlap.

According to one aspect of the present application, the above method is characterized in that when a number of the first-type bit block(s) in the T bit blocks is greater than a first value, the third-type bit block is received in the first time window; when a number of the first-type bit block(s) in the T bit blocks is not greater than a first value, the third-type bit block is not received in the first time window.

According to one aspect of the present application, the above method is characterized in that when a number of the first-type bit block(s) in the T bit blocks is not greater than a first value, the third-type bit block is received in the first time window; when a number of the first-type bit block(s) in the T bit blocks is greater than a first value, the third-type bit block is not received in the first time window.

According to one aspect of the present application, the above method is characterized in that when a number of the first-type bit block(s) in the T bit blocks is less than a first value, the third-type bit block is received in the first time window; when a number of the first-type bit block(s) in the T bit blocks is not less than a first value, the third-type bit block is not received in the first time window.

According to one aspect of the present application, the above method is characterized in that when a number of the first-type bit block(s) in the T bit blocks is not less than a first value, the third-type bit block is received in the first time window; when a number of the first-type bit block(s) in the T bit blocks is less than a first value, the third-type bit block is not received in the first time window.

According to one aspect of the present application, the above method is characterized in that when a first difference value is greater than a first value, the third-type bit block is received in the first time window; when a first difference value is not greater than a first value, the third-type bit block is not received in the first time window; the first difference value is equal to T minus a number of the first-type bit block(s) in the T bit blocks.

According to one aspect of the present application, the above method is characterized in that when a first difference value is not greater than a first value, the third-type bit block is received in the first time window; when a first difference value is greater than a first value, the third-type bit block is not received in the first time window; the first difference value is equal to T minus a number of the first-type bit block(s) in the T bit blocks.

According to one aspect of the present application, the above method is characterized in that when a first difference value is not less than a first value, the third-type bit block is received in the first time window; when a first difference value is less than a first value, the third-type bit block is not received in the first time window; the first difference value is equal to T minus a number of the first-type bit block(s) in the T bit blocks.

According to one aspect of the present application, the above method is characterized in that when a first difference value is less than a first value, the third-type bit block is received in the first time window; when a first difference value is not less than a first value, the third-type bit block is not received in the first time window; the first difference value is equal to T minus a number of the first-type bit block(s) in the T bit blocks.

According to one aspect of the present application, the above method is characterized in that when the third-type bit block is received in the first time window, the third-type bit block and the first-type bit block in the T bit blocks are received in a same radio resource pool.

According to one aspect of the present application, the above method is characterized in that when the third-type bit block is received in the first time window and a number of the first-type bit blocks in the T bit blocks is greater than 1, the third-type bit block and the first-type bit block with an earliest start time in the T bit blocks are received in a same radio resource pool.

According to one aspect of the present application, the above method is characterized in that when the third-type bit block is received in the first time window, the third-type bit block and the second-type bit block in the T bit blocks are received in a same radio resource pool.

According to one aspect of the present application, the above method is characterized in that when the third-type bit block is received in the first time window and a number of the second-type bit blocks in the T bit blocks is greater than 1, the third-type bit block and the second-type bit block with an earliest start time in the T bit blocks are received in a same radio resource pool.

According to one aspect of the present application, the above method is characterized in that for the T bit blocks and the first bit block, timeline condition(s) required to execute UCI multiplexing is(are) satisfied.

According to one aspect of the present application, the above method is characterized in that T radio resource pools are respectively reserved for the T bit blocks; a first radio resource pool is reserved for the first bit block, and the first radio resource overlap with each of the T radio resource pools in time domain.

According to one aspect of the present application, the above method is characterized in that a first radio resource pool is reserved for the first bit block, and the first radio resource pool comprises a PUCCH resource; a PUCCH format adopted by the PUCCH resource comprised in the first resource pool is PUCCH format 2.

According to one aspect of the present application, the above method is characterized in that a first radio resource pool is reserved for the first bit block, and the first radio resource pool comprises a PUCCH resource; a PUCCH format adopted by the PUCCH resource comprised in the first resource pool is PUCCH format 3.

According to one aspect of the present application, the above method is characterized in that a first radio resource pool is reserved for the first bit block, and the first radio resource pool comprises a PUCCH resource; a PUCCH format adopted by the PUCCH resource comprised in the first resource pool is PUCCH format 4.

According to one aspect of the present application, the above method is characterized in that all bit blocks in the T bit blocks correspond to a first priority index, the first bit block corresponds to a second priority index, and the second priority index is different from the first priority index.

According to one aspect of the present application, the above method is characterized in that the second-type bit block is a bit block comprising an SR bit.

According to one aspect of the present application, the above method is characterized in that the second-type bit block is a bit block comprising a bit indicating a positive SR.

According to one aspect of the present application, the above method is characterized in that the first value is equal to 0.

According to one aspect of the present application, the above method is characterized in that the first value is equal to 1.

According to one aspect of the present application, the above method is characterized in that the first value is equal to T.

According to one aspect of the present application, the above method is characterized in that the third-type bit block is: the first bit block, or, a bit block generated by the first bit block.

In one embodiment, multiple characteristics of the above method can be combined with each other arbitrarily without conflict.

The present application provides a first node for wireless communications, comprising:

a first receiver, receiving a first signaling; and a first transmitter, transmitting T bit blocks in a first time window, T being a positive integer greater than 1;

herein, a first bit block is associated with the first signaling, and the first bit block does not belong to the T bit blocks; any of the T bit blocks is a first-type bit block or a second-type bit block, the first-type bit block is a bit block comprising a HARQ-ACK information bit, and the second-type bit block is a bit block different from the first-type bit block and having a same priority as the first-type bit block; whether a third bit block is transmitted in the first time window is related to a number of the first-type bit block(s) in the T bit blocks, the third-type bit block is a bit block associated with the first bit block.

The present application provides a second node for wireless communications, comprising:

a second transmitter, transmitting a first signaling; and a second receiver, receiving T bit blocks in a first time window, T being a positive integer greater than 1;

herein, a first bit block is associated with the first signaling, and the first bit block does not belong to the T bit blocks; any of the T bit blocks is a first-type bit block or a second-type bit block, the first-type bit block is a bit block comprising a HARQ-ACK information bit, and the second-type bit block is a bit block different from the first-type bit block and having a same priority as the first-type bit block; whether a third bit block is received in the first time window is related to a number of the first-type bit block(s) in the T bit blocks, and the third-type bit block is a bit block associated with the first bit block.

In one embodiment, the method in the present application is advantageous in the following aspects:

being conducive to implementing the multiplexing of UCIs with different priorities;

being conducive to improving the system efficiency;

being conducive to ensuring the transmission performance of high-priority UCIs;

being conducive to implementing the multiplexing situation of applying a unified multiplexing rule for different priorities and different types of UCIs;

having good compatibility.

In one embodiment, the method in the present application is advantageous in the following aspects:

being conducive to ensuring the transmission performance of UL-SCH bits (especially high priority UL-SCH bits);

being conducive to avoiding low-priority UCIs occupying too much transmission resources reserved for high-priority bits;

being conducive to improving the system efficiency;

having good compatibility;

being conducive to multiplexing UCIs with different priorities onto a same PUSCH on the premise of ensuring the transmission performance of UL-SCH bits.

In one embodiment, the method in the present application is advantageous in the following aspects:

alleviating the problem of system performance degradation incurred by dropping a low-priority HARQ-ACK information bit;

being conducive to ensuring the transmission performance of high-priority UCIs;

avoiding the introduction of overly complex multiplexing rules.

BRIEF DESCRIPTION OF THE DRAWINGS

Other features, objects and advantages of the present application will become more apparent from the detailed description of non-restrictive embodiments taken in conjunction with the following drawings:

FIG. 8 illustrates a flowchart of determining a target radio resource pool based on a target index according to one embodiment of the present application;

FIG. 9 illustrates an illustration schematic diagram of a first index and a second index according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
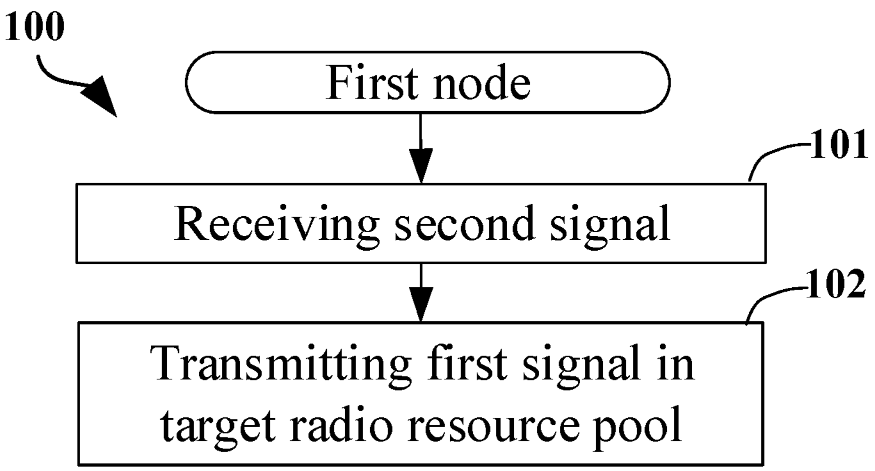
FIG. 1 illustrates a flowchart of the processing of a first node according to one embodiment of the present application.

Embodiment 1 illustrates a flowchart of processing of a first node according to one embodiment of the present application, as shown in FIG. 1.

In Embodiment 1, the first node in the present application receives a second signal in step 101; transmits a first signal in a target radio resource pool in step 102.

In Embodiment 1, the first signal carries a third bit block and a fourth bit block; a first bit block is associated with the second signal; a second bit block corresponds to a target index, the target index is a first index or a second index, and the first index is different from the second index; the third bit block is related to the first bit block, and the fourth bit block is related to the second bit block; a determination method of the target radio resource pool is related to the target index.

In one embodiment, the first signal in the present application comprises a radio signal.

In one embodiment, the first signal in the present application comprises a radio frequency signal.

In one embodiment, the first signal in the present application comprises a baseband signal.

In one embodiment, the second signal in the present application comprises a radio signal.

In one embodiment, the second signal in the present application comprises a radio frequency signal.

In one embodiment, the second signal in the present application comprises a baseband signal.

In one embodiment, the third signal in the present application comprises a radio signal.

In one embodiment, the third signal in the present application comprises a radio frequency signal.

In one embodiment, the third signal in the present application comprises a baseband signal.

In one embodiment, the radio resource pool in the present application comprises at least one Resource Element (RE) in time-frequency domain.

In one embodiment, the RE occupies a multicarrier symbol in time domain, and a subcarrier in frequency domain.

In one embodiment, the multicarrier symbol in the present application is an Orthogonal Frequency Division Multiplexing (OFDM) symbol.

In one embodiment, the multicarrier symbol in the present application is a Single Carrier-Frequency Division Multiple Access (SC-FDMA) symbol.

In one embodiment, the multicarrier symbol in the present application is a Discrete Fourier Transform Spread OFDM (DFT-S-OFDM) symbol.

In one embodiment, the multicarrier symbol in the present application is a Filter Bank Multicarrier (FBMC) symbol.

In one embodiment, the multicarrier symbol in the present application comprises a Cyclic Prefix (CP).

In one embodiment, the radio resource pool in the present application comprises a positive integer number of subcarrier(s) in frequency domain.

In one embodiment, the radio resource pool in the present application comprises a positive integer number of Physical Resource Block(s) (PRB(s)) in frequency domain.

In one embodiment, the radio resource pool in the present application comprises a positive integer number of Resource Block(s) (RB(s)) in frequency domain.

In one embodiment, the radio resource pool in the present application comprises a positive integer number of multicarrier symbol(s) in time domain.

In one embodiment, the radio resource pool in the present application comprises a positive integer number of slot(s) in time domain.

In one embodiment, the radio resource pool in the present application comprises a positive integer number of sub-slot (s) in time domain.

In one embodiment, the radio resource pool in the present application comprises a positive integer number of millisecond(s) in time domain.

In one embodiment, the radio resource pool in the present application comprises a positive integer number of continuous multicarrier symbols in time domain.

In one embodiment, the radio resource pool in the present application comprises a positive integer number of discontinuous slots in time domain.

In one embodiment, the radio resource pool in the present application comprises a positive integer number of continuous slots in time domain.

In one embodiment, the radio resource pool in the present application comprises a positive integer number of subframe(s) in time domain.

In one embodiment, the radio resource pool in the present application is indicated or configured by a higher-layer signaling.

In one embodiment, the radio resource pool in the present application is indicated by DCI, or configured by a Radio Resource Control (RRC) signaling or configured by a Medium Access Control layer Control Element (MAC CE) signaling.

In one embodiment, the radio resource pool in the present application is reserved for an uplink physical layer channel.

In one embodiment, the radio resource pool in the present application comprises radio resources occupied by an uplink physical layer channel.

In one embodiment, the uplink physical layer channel in the present application is a Physical Uplink Control CHannel (PUCCH) or a Physical Uplink Shared CHannel (PUSCH).

In one embodiment, the target radio resource pool in the present application comprises a PUCCH resource.

In one embodiment, the target radio resource pool comprises at least one RE in time-frequency domain.

In one embodiment, the target radio resource pool comprises a positive integer number of subcarrier(s) in frequency domain.

In one embodiment, the target radio resource pool comprises a positive integer number of Physical resource block(s) (PRB(s)) in frequency domain.

In one embodiment, the target radio resource pool comprises a positive integer number of Resource Block(s) (RB(s)) in frequency domain.

In one embodiment, the target radio resource pool comprises a positive integer number of multicarrier symbol(s) in time domain.

In one embodiment, the target radio resource pool comprises a positive integer number of slot(s) in time domain.

In one embodiment, the target radio resource pool comprises a positive integer number of subslot(s) in time domain.

In one embodiment, the target radio resource pool comprises a positive integer number of ms(s) in time domain.

In one embodiment, the target radio resource pool comprises a positive integer number of continuous multicarrier symbol(s) in time domain.

In one embodiment, the target radio resource pool comprises a positive integer number of discontinuous slot(s) in time domain.

In one embodiment, the target radio resource pool comprises a positive integer number of continuous slot(s) in time domain.

In one embodiment, the target radio resource pool comprises a positive integer number of sub-frame(s) in time domain.

In one embodiment, the second signal comprises a reference signal.

In one embodiment, the second signal comprises a reference signal used to perform a measurement to report a CSI report.

In one embodiment, the second signal comprises a reference signal used for channel measurement or interference measurement.

In one embodiment, the second signal comprises a Channel State Information-Reference Signal (CSI-RS).

In one embodiment, the meaning of the phrase that a first bit block is associated to the second signal comprises: the first bit block comprises a CSI report for the second signal.

In one embodiment, the second signal is transmitted on a PDSCH.

In one embodiment, the second signal carries one or multiple TBs.

In one embodiment, the meaning of the phrase that a first bit block is associated to the second signal comprises: the first bit block comprises a Hybrid Automatic Repeat reQuest ACKnowledgement (HARQ-ACK) information bit for the second signal.

In one embodiment, the meaning of the phrase that a first bit block is associated to the second signal comprises: the first bit block comprises an information bit indicating whether the second signal is correctly received.

In one embodiment, the first bit block comprises at least one bit.

In one embodiment, the first bit block comprises at least three bits.

In one embodiment, the first bit block comprises at least five bits.

In one embodiment, the second bit block comprises at least one bit.

In one embodiment, the first bit block comprises an Uplink Control Information (UCI) information bit.

In one embodiment, the second bit block comprises a UCI bit.

In one embodiment, the first bit block comprises a HARQ-ACK information bit, and the second bit block comprises a Scheduling Request (SR) bit.

In one subembodiment of the above embodiment, the first bit block comprises HARQ-ACK information bit(s) for PDSCH reception(s) scheduled by DCI(s).

In one subembodiment of the above embodiment, the first bit block only comprises HARQ-ACK information bit(s) for Semi-Persistent Scheduling (SPS) PDSCH reception(s).

In one embodiment, the first bit block comprises HARQ-ACK information bit(s), and the second bit block comprises positive SR bit(s).

In one subembodiment of the above embodiment, the first bit block comprises HARQ-ACK information bit(s) for PDSCH reception (s) scheduled for DCI(s).

In one subembodiment of the above embodiment, the first bit block only comprises HARQ-ACK information bit(s) for SPS PDSCH reception(s).

In one embodiment, the first bit block comprises HARQ-ACK information bit(s) for PDSCH reception(s) scheduled by DCI(s), and the second bit block only comprises HARQ-ACK information bit(s) for SPS PDSCH reception(s).

In one embodiment, the first bit block comprises a bit used for a Channel State Information report (CSI report), and the second bit block comprises at least one of the two of HARQ-ACK information bit(s) for SPS PDSCH reception(s) or an SR bit.

In one embodiment, the first bit block is used to generate the third bit block, or the third bit block is the first bit block.

In one embodiment, the second bit block is used to generate the fourth bit block, or, the fourth bit block is the second bit block.

In one embodiment, the third bit block comprises at least one bit.

In one embodiment, the third bit block comprises at least three bits.

In one embodiment, the third bit block comprises at least five bits.

In one embodiment, the fourth bit block comprises at least one bit.

In one embodiment, the third bit block comprises a UCI bit.

In one embodiment, the fourth bit block comprises a UCI bit.

In one embodiment, the third bit block comprises HARQ-ACK information bit(s), and the fourth bit block comprises Scheduling Request (SR) bit(s).

In one subembodiment of the above embodiment, the third bit block comprises HARQ-ACK information bit(s) for PDSCH reception(s) scheduled for DCI(s).

In one subembodiment of the above embodiment, the third bit block only comprises HARQ-ACK information bit(s) for SPS PDSCH reception(s).

In one embodiment, the third bit block comprises HARQ-ACK information bit(s), and the fourth bit block comprises positive SR bit(s).

In one subembodiment of the above embodiment, the third bit block comprises HARQ-ACK information bit(s) for PDSCH reception(s) scheduled for DCI(s).

In one subembodiment of the above embodiment, the third bit block only comprises HARQ-ACK information bit(s) for SPS PDSCH reception(s).

In one embodiment, the third bit block comprises HARQ-ACK information bit(s) for PDSCH reception(s) scheduled by DCI(s), and the fourth bit block only comprises HARQ-ACK information bit(s) for SPS PDSCH reception(s).

In one embodiment, the third bit block comprises bit(s) used for a Channel State Information report (CSI report), and the fourth bit block comprises at least one of the two of HARQ-ACK information bit(s) for SPS PDSCH reception (s) or an SR bit.

In one embodiment, an index corresponding to the third bit block is the same as an index corresponding to the first bit block.

In one embodiment, an index corresponding to the fourth bit block is the same as an index corresponding to the second bit block.

In one embodiment, a priority index corresponding to the third bit block is the same as a priority index corresponding to the first bit block.

In one embodiment, a priority index corresponding to the fourth bit block is the same as a priority index corresponding to the second bit block.

In one embodiment, the target index is a priority index, and a DCI or a higher-layer signaling indicates the target index corresponding to the second bit block.

In one embodiment, the target index is a priority index corresponding to the second bit block indicated by a DCI or a higher-layer signaling.

In one embodiment, all bits in the second bit block correspond to the target index.

In one embodiment, all bits in the first bit block correspond to the second index.

In one embodiment, all bits in the first bit block correspond to the first index.

In one embodiment, in the present application, a HARQ-ACK information bit corresponding to an index refers to: the HARQ-ACK information bit is a HARQ-ACK information bit of one of indicating a PDSCH reception scheduled by a DCI of the index, an SPS PDSCH reception corresponding to an SPS configuration of the index indicated by a higher-layer signaling, or an SPS PDSCH release corresponding to an SPS configuration of the index indicated by a higher-layer signaling.

In one embodiment, in the present application, an SR bit corresponding to an index refers to: the SR bit is an SR bit triggered by an SR-related configuration indicated by a higher-layer signaling the priority index.

In one embodiment, bit(s) used for CSI reporting in the present application is(are) pre-defined or configured by a higher-layer signaling to correspond to the second index.

In one embodiment, the meaning of the phrase that a first bit block corresponds to the first index comprises: any HARQ-ACK information bit comprised in the second bit block is a HARQ-ACK information bit for one of indicating a PDSCH reception scheduled by a DCI of the first index, indicating by a higher-layer signaling an SPS PDSCH reception corresponding to an SPS configuration of the first index, or indicating by a higher layer an SPS PDSCH release corresponding to an SPS configuration of the first index.

In one embodiment, the phrase in the present application that the third bit block is related to the first bit block refers to: the third bit block is the first bit block.

In one embodiment, the phrase in the present application that the third bit block is related to the first bit block refers to: the third bit block is a bit block generated by the first bit block.

In one embodiment, the phrase in the present application that the third bit block is related to the first bit block refers to: the third bit block is one of the first bit block or a bit block generated by the first bit block.

In one embodiment, the phrase in the present application that the fourth bit block is related to the second bit block refers to: the fourth bit block is the second bit block.

In one embodiment, the phrase in the present application that the fourth bit block is related to the second bit block refers to: the fourth bit block is a bit block generated by the second bit block.

In one embodiment, the phrase in the present application that the fourth bit block is related to the second bit block refers to: the fourth bit block is one of the second bit block or a bit block generated by the second bit block.

In one embodiment, the third bit block is acquired after the first bit block is through one or multiple of logical AND, logical OR, XOR, deleting bit, precoding, adding repeated bit or zero padding.

In one embodiment, the fourth bit block is acquired after the second bit block is through one or multiple of logical AND, logical OR, XOR, deleting bit, precoding, adding repeated bit or zero padding.

In one embodiment, the meaning of the phrase that a determination method of the target radio resource pool is related to the target index comprises: when the target index is the second index, the target radio resource pool is a third radio resource pool, and the third radio resource pool is reserved for the first bit block; when the target index is the first index, the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one subembodiment of the above embodiment, a number of radio resource pools comprised in any of the K radio resource pool lists is greater than 1.

In one embodiment, the meaning of the phrase that a determination method of the target radio resource pool is related to the target index comprises: when the target index is the second index, the target radio resource pool is a third radio resource pool, and the third radio resource pool is reserved for the first bit block; when the target index is the first index, the first bit block and the second bit block are both used to determine a first number, N radio resource pools respectively correspond to N number ranges, the target radio resource pool is a radio resource pool corresponding to a first number range among the N radio resource pools, the first number range is a number range comprising the first number among the N number ranges, N being a positive integer greater than 1.

In one embodiment, the meaning of the phrase that a determination method of the target radio resource pool is related to the target index comprises: a method of determining the target radio resource pool based on at least one of the first bit block or the second bit block is related to the target index.

In one embodiment, the meaning of the phrase that a determination method of the target radio resource pool is related to the target index comprises: a method of determining the target radio resource pool based on the first bit block and the second bit block is related to the target index.

In one embodiment, the meaning of the phrase that a determination method of the target radio resource pool is related to the target index comprises: the target index is used to determine that a method of determining the target radio resource pool is based on the first bit block and the second bit block.

In one embodiment, the meaning of the phrase that a determination method of the target radio resource pool is related to the target index comprises: the target index is used to determine a target radio resource pool list, and the target radio resource pool is a radio resource pool in the target radio resource pool list.

In one embodiment, the meaning of the phrase that a determination method of the target radio resource pool is related to the target index comprises: the target index, the first bit block and the second bit block are used together to determine a target radio resource pool list, and the target radio resource pool is a radio resource pool in the target radio resource pool list.

In one embodiment, the meaning of the phrase that a determination method of the target radio resource pool is related to the target index comprises: the target index is used to determine whether the first bit block and the second bit block are used together to determine the target radio resource pool or a radio resource pool list comprising the target radio resource pool.

In one embodiment, the first index and the second index in the present application are respectively different Radio Network Temporary Identities (RNTIs).

In one embodiment, in the present application, the meaning that a signal carries a bit block (or a TB) comprises: the signal comprises an output after all or partial bits in the bit block (or the TB) are sequentially through part or all of CRC Insertion, Segmentation, Code Block-level CRC Insertion, Channel Coding, Rate Matching, Concatenation, Scrambling, Modulation, Layer Mapping, Precoding, Mapping to Resource Element, Multicarrier symbol Generation and Modulation and Upconversion.

In one embodiment, in the present application, the meaning that a signal carries two bit blocks comprises: the signal comprises an output after all or partial bits in all bits comprised in the two bit blocks are sequentially through part or all of CRC Insertion, Segmentation, Code Block-level CRC Insertion, Channel Coding, Rate Matching, Concatenation, Scrambling, Modulation, Layer Mapping, Precoding, Mapping to Resource Element, Multicarrier symbol Generation and Modulation and Upconversion.

In one embodiment, in the present application, the meaning that a signal carries two bit blocks comprises: the signal comprises an output after all or partial bits in one of the two bit blocks are sequentially through part or all of CRC Insertion, Segmentation, Code Block-level CRC Insertion, Channel Coding, Rate Matching, Concatenation, Scrambling, Modulation, Layer Mapping, Precoding, Mapping to Resource Element, Multicarrier symbol Generation and Modulation and Upconversion, and the signal comprises an output after all or partial bits in the other one of the two bit blocks are sequentially through part or all of CRC Insertion, Segmentation, Code Block-level CRC Insertion, Channel Coding, Rate Matching, Concatenation, Scrambling, Modulation, Layer Mapping, Precoding, Mapping to Resource Element, Multicarrier symbol Generation and Modulation and Upconversion.

Embodiment 2

Figure 2:
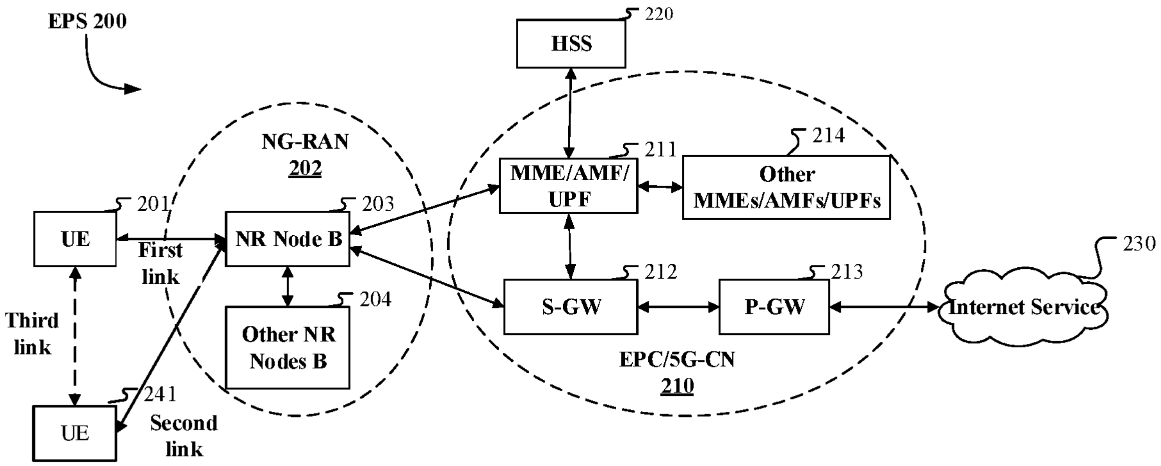
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 241 corresponds to the second node in the present application.

In one embodiment, the gNB 203 corresponds to the first node in the present application.

In one embodiment, the gNB 203 corresponds to the second node in the present application.

In one embodiment, the UE 241 corresponds to the first node in the present application.

In one embodiment, the UE 201 corresponds to the second node in the present application.

Embodiment 3

Figure 3:
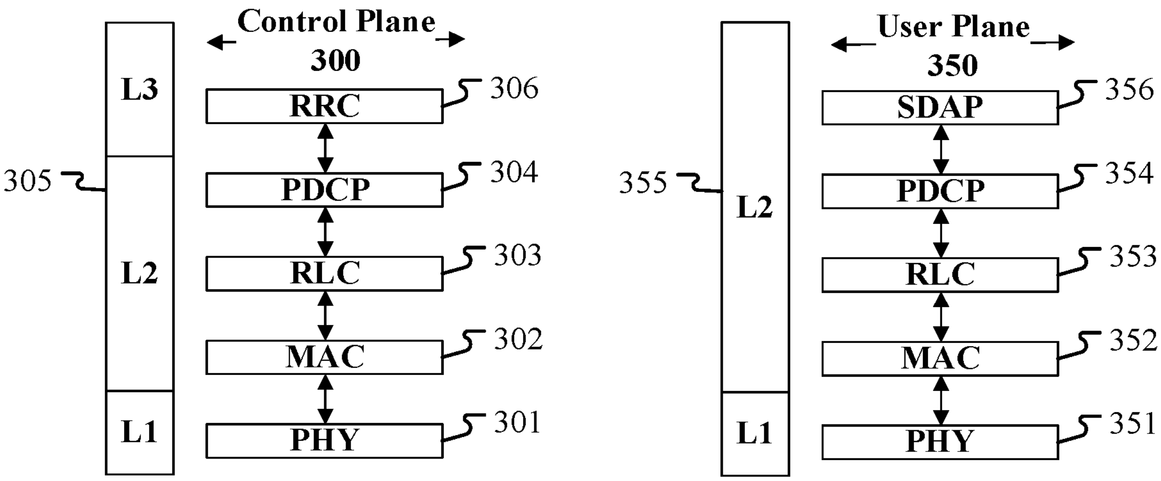
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC sublayer 306.

In one embodiment, the first signaling in the present application is generated by the MAC sublayer 302.

In one embodiment, the first signaling in the present application is generated by the MAC sublayer 352.

In one embodiment, the first signaling in the present application is generated by the PHY 301.

In one embodiment, the first signaling in the present application is generated by the PHY 351.

In one embodiment, the first bit block in the present application is generated by the RRC sublayer 306.

In one embodiment, the first bit block in the present application is generated by the SDAP sublayer 356.

In one embodiment, the first bit block in the present application is generated by the MAC sublayer 302.

In one embodiment, the first bit block in the present application is generated by the MAC sublayer 352.

In one embodiment, the first bit block in the present application is generated by the PHY 301.

In one embodiment, the first bit block in the present application is generated by the PHY 351.

In one embodiment, the second bit block in the present application is generated by the RRC sublayer 306.

In one embodiment, the second bit block in the present application is generated by the SDAP sublayer 356.

In one embodiment, the second bit block in the present application is generated by the MAC sublayer 302.

In one embodiment, the second bit block in the present application is generated by the MAC sublayer 352.

In one embodiment, the second bit block in the present application is generated by the PHY 301.

In one embodiment, the second bit block in the present application is generated by the PHY 351.

In one embodiment, the third bit block in the present application is generated by the RRC sublayer 306.

In one embodiment, the third bit block in the present application is generated by the SDAP sublayer 356.

In one embodiment, the third bit block in the present application is generated by the MAC sublayer 302.

In one embodiment, the third bit block in the present application is generated by the MAC sublayer 352.

In one embodiment, the third bit block in the present application is generated by the PHY 301.

In one embodiment, the third bit block in the present application is generated by the PHY 351.

In one embodiment, the fourth bit block in the present application is generated by the RRC sublayer 306.

In one embodiment, the fourth bit block in the present application is generated by the SDAP sublayer 356.

In one embodiment, the fourth bit block in the present application is generated by the MAC sublayer 302.

In one embodiment, the fourth bit block in the present application is generated by the MAC sublayer 352.

In one embodiment, the fourth bit block in the present application is generated by the PHY 301.

In one embodiment, the fourth bit block in the present application is generated by the PHY 351.

In one embodiment, one of the T bit blocks in the present application is generated by the RRC sublayer 306.

In one embodiment, one of the T bit blocks in the present application is generated by the SDAP sub-layer 356.

In one embodiment, one of the T bit blocks in the present application is generated by the MAC sublayer 302.

In one embodiment, one of the T bit blocks in the present application is generated by the MAC sublayer 352.

In one embodiment, one of the T bit blocks in the present application is generated by the PHY 301.

In one embodiment, one of the T bit blocks in the present application is generated by the PHY 351.

In one embodiment, the first signal in the present application is generated by the PHY 301.

In one embodiment, the first signal in the present application is generated by the PHY 351.

In one embodiment, the second signal in the present application is generated by the PHY 301.

In one embodiment, the second signal in the present application is generated by the PHY 351.

In one embodiment, the third signal in the present application is generated by the PHY 301.

In one embodiment, the third signal in the present application is generated by the PHY 351.

Embodiment 4

Figure 4:
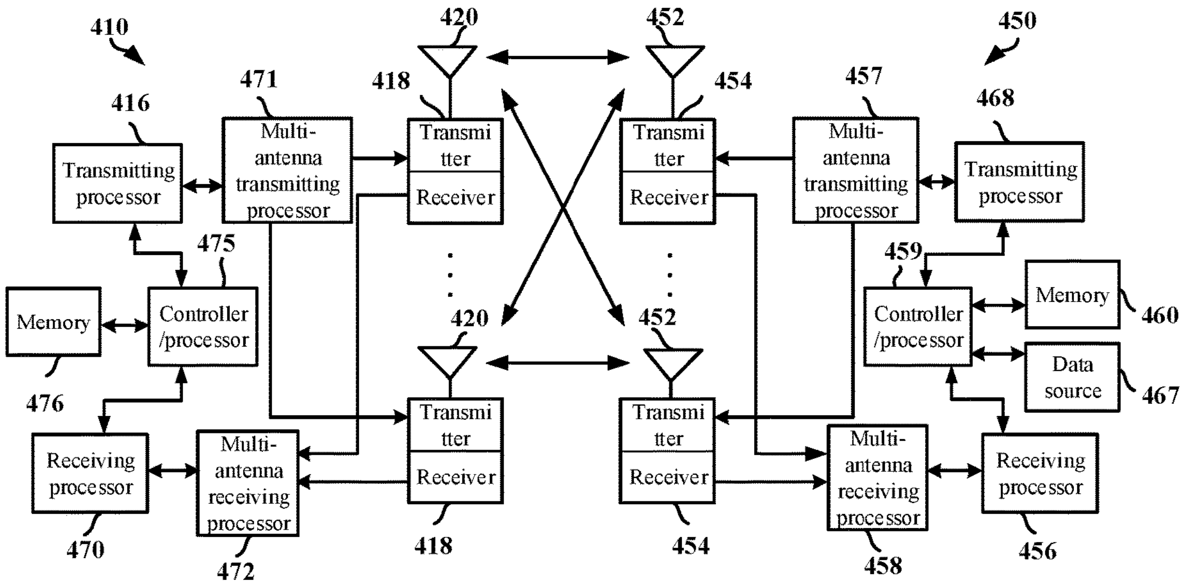
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BP SK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second node is a UE, and the first node is a base station.

In one subembodiment of the above embodiment, the second node is a relay node, and the first node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the second signal in the present application; transmits the first signal in the present application in the target radio resource pool in the present application, and the first signal carries the third bit block in the present application and the fourth bit block in the present application; herein, the first bit block in the present application is associated with the second signal; the second bit block in the present application corresponds to the target index in the present application, the target index is the first index in the present application or the second index in the present application, and the first index is different from the second index; the third bit block is related to the first bit block, and the fourth bit block is related to the second bit block; a determination method of the target radio resource pool is related to the target index.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving the second signal in the present application; transmitting the first signal in the present application in the target radio resource pool in the present application, and the first signal carrying the third bit block in the present application and the fourth bit block in the present application; herein, the first bit block in the present application is associated with the second signal; the second bit block in the present application corresponds to the target index in the present application, the target index is the first index in the present application or the second index in the present application, and the first index is different from the second index; the third bit block is related to the first bit block, and the fourth bit block is related to the second bit block; a determination method of the target radio resource pool is related to the target index.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the second signal in the present application; and receives the first signal in the present application in the target radio resource pool in the present application, and the first signal carries the third bit block in the present application and the fourth bit block in the present application; herein, the first bit block in the present application is associated with the second signal; the second bit block in the present application corresponds to the target index in the present application, the target index is the first index in the present application or the second index in the present application, and the first index is different from the second index; the third bit block is related to the first bit block, and the fourth bit block is related to the second bit block; a determination method of the target radio resource pool is related to the target index.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting the second signal in the present application; and receiving the first signal in the present application in the target radio resource pool in the present application, and the first signal carrying the third bit block in the present application and the fourth bit block in the present application; herein, the first bit block in the present application is associated with the second signal; the second bit block in the present application corresponds to the target index in the present application, the target index is the first index in the present application or the second index in the present application, and the first index is different from the second index; the third bit block is related to the first bit block, and the fourth bit block is related to the second bit block; a determination method of the target radio resource pool is related to the target index.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the receiver 454, the multi-antenna receiving processor 458, the receiving processor 456, the controller/processor 459, the memory 460, or the data source 467 is used to receive the second signal in the present application.

In one embodiment, at least one of the antenna 420, the transmitter 418, the multi-antenna transmitting processor 471, the transmitting processor 416, the controller/processor 475, or the memory 476 is used to transmit the second signal in the present application.

In one embodiment, at least one of the antenna 452, the receiver 454, the multi-antenna receiving processor 458, the receiving processor 456, the controller/processor 459, the memory 460, or the data source 467 is used to receive the third signal in the present application.

In one embodiment, at least one of the antenna 420, the transmitter 418, the multi-antenna transmitting processor 471, the transmitting processor 416, the controller/processor 475, or the memory 476 is used to transmit the third signal in the present application.

In one embodiment, at least one of the antenna 452, the transmitter 454, the multi-antenna transmission processor 458, the transmitting processor 468, the controller/processor 459, the memory 460, or the data source 467 is used to transmit the first signal in the present application in the target radio resource pool in the present application.

In one embodiment, at least one of the antenna 420, the receiver 418, the multi-antenna receiving processor 472, the receiving processor 470, the controller/processor 475, or the memory 476 is used to receive the first signal in the present application in the target radio resource pool in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the second signal in the present application; transmits the first signal in the present application in the target radio resource pool in the present application, and the first signal carries the third bit block in the present application and the fourth bit block in the present application; herein, the first bit block in the present application is associated with the second signal; the third bit block is related to the first bit block, and the fourth bit block is related to the second bit block in the present application; the first bit block and the second bit block are both used to determine the first number in the present application, the K radio resource pool lists in the present application respectively correspond to K number ranges in the present application, the target radio resource pool list in the present application is a radio resource pool list corresponding to the first number range in the present application among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving the second signal in the present application; transmitting the first signal in the present application in the target radio resource pool in the present application, and the first signal carrying the third bit block in the present application and the fourth bit block in the present application; herein, the first bit block in the present application is associated with the second signal; the third bit block is related to the first bit block, and the fourth bit block is related to the second bit block in the present application; the first bit block and the second bit block are both used to determine the first number in the present application, the K radio resource pool lists in the present application respectively correspond to K number ranges in the present application, the target radio resource pool list in the present application is a radio resource pool list corresponding to the first number range in the present application among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the second signal in the present application; and receives the first signal in the present application in the target radio resource pool in the present application, and the first signal carries the third bit block in the present application and the fourth bit block in the present application; herein, the first bit block in the present application is associated with the second signal; the third bit block is related to the first bit block, and the fourth bit block is related to the second bit block in the present application; the first bit block and the second bit block are both used to determine the first number in the present application, the K radio resource pool lists in the present application respectively correspond to K number ranges in the present application, the target radio resource pool list in the present application is a radio resource pool list corresponding to the first number range in the present application among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting the second signal in the present application; and receiving the first signal in the present application in the target radio resource pool in the present application, and the first signal carrying the third bit block in the present application and the fourth bit block in the present application; herein, the first bit block in the present application is associated with the second signal; the third bit block is related to the first bit block, and the fourth bit block is related to the second bit block in the present application; the first bit block and the second bit block are both used to determine the first number in the present application, the K radio resource pool lists in the present application respectively correspond to K number ranges in the present application, the target radio resource pool list in the present application is a radio resource pool list corresponding to the first number range in the present application among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one subembodiment of the above embodiment, the first communication device 410 corresponds to the second node in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present application; and transmits the first signal in the present application in the target radio resource pool in the present application, and the first signal carries the first bit block in the present application and the second bit block in the present application; herein, the first signaling is used to determine the target radio resource pool; a number of bit(s) comprised in the second bit block (size of the second bit block) is used to determine the first intermediate number in the present application, the first bit block and the first limiting parameter value in the present application are used to determine the second intermediate number in the present application, the second limiting parameter value in the present application is used to determine the third intermediate number in the present application, and the third intermediate number is linearly correlated with the second limiting parameter value; a number of resource elements used to transmit the second bit block in the target radio resource pool is not greater than a smallest one among a result of the first intermediate number rounding to an integer, the second intermediate number and a result of the third intermediate number rounding to an integer.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving the first signaling in the present application; and transmitting the first signal in the present application in the target radio resource pool in the present application, and the first signal carrying the first bit block in the present application and the second bit block in the present application; herein, the first signaling is used to determine the target radio resource pool; a number of bit(s) comprised in the second bit block (size of the second bit block) is used to determine the first intermediate number in the present application, the first bit block and the first limiting parameter value in the present application are used to determine the second intermediate number in the present application, the second limiting parameter value in the present application is used to determine the third intermediate number in the present application, and the third intermediate number is linearly correlated with integer, the second intermediate number and a result of the third intermediate number rounding to an integer.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling in the present application; and receives the first signal in the present application in the target radio resource pool in the present application, and the first signal carries the first bit block in the present application and the second bit block in the present application; herein, the first signaling is used to determine the target radio resource pool; a number of bit(s) comprised in the second bit block (size of the second bit block) is used to determine the first intermediate number in the present application, the first bit block and the first limiting parameter value in the present application are used to determine the second intermediate number in the present application, the second limiting parameter value in the present application is used to determine the third intermediate number in the present application, and the third intermediate number is linearly correlated with the second limiting parameter value; a number of resource elements used to transmit the second bit block in the target radio resource pool is not greater than a smallest one among a result of the first intermediate number rounding to an integer, the second intermediate number and a result of the third intermediate number rounding to an integer.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting the first signaling in the present application; and receiving the first signal in the present application in the target radio resource pool in the present application, and the first signal carrying the first bit block in the present application and the second bit block in the present application; herein, the first signaling is used to determine the target radio resource pool; a number of bit(s) comprised in the second bit block (size of the second bit block) is used to determine the first intermediate number in the present application, the first bit block and the first limiting parameter value in the present application are used to determine the second intermediate number in the present application, the second limiting parameter value in the present application is used to determine the third intermediate number in the present application, and the third intermediate number is linearly correlated with integer, the second intermediate number and a result of the third intermediate number rounding to an integer.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the transmitter 454, the multi-antenna transmission processor 458, the transmitting processor 468, the controller/processor 459, the memory 460, or the data source 467 is used to transmit the first signal in the present application in the target radio resource pool in the present application.

In one embodiment, at least one of the antenna 420, the receiver 418, the multi-antenna receiving processor 472, the receiving processor 470, the controller/processor 475, or the memory 476 is used to receive the first signal in the present application in the target radio resource pool in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present application; and transmits T bit blocks in the present application in the first time window in the present application, T being a positive integer greater than 1; herein, the first bit block in the present application is associated with the first signaling, and the first bit block does not belong to the T bit blocks; any of the T bit blocks is the first-type bit block in the present application or the second-type bit block in the present application, the first-type bit block is a bit block comprising a HARQ-ACK information bit, and the second-type bit block is a bit block different from the first-type bit block and having a same priority as the first-type bit block; whether the third bit block in the present application is transmitted in the first time window is related to a number of the first-type bit block(s) in the T bit blocks, the third-type bit block is a bit block associated with the first bit block.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving the first signaling in the present application; and transmitting T bit blocks in the present application in a first time window in the present application, T being a positive integer greater than 1; herein, the first bit block in the present application is associated with the first signaling, and the first bit block does not belong to the T bit blocks; any of the T bit blocks is the first-type bit block in the present application or the second-type bit block in the present application, the first-type bit block is a bit block comprising a HARQ-ACK information bit, and the second-type bit block is a bit block different from the first-type bit block and having a same priority as the first-type bit block; whether the third bit block in the present application is transmitted in the first time window is related to a number of the first-type bit block(s) in the T bit blocks, the third-type bit block is a bit block associated with the first bit block.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling in the present application; and receives T bit blocks in the present application in the first time window in the present application, T being a positive integer greater than 1; herein, the first bit block in the present application is associated with the first signaling, and the first bit block does not belong to the T bit blocks; any of the T bit blocks is the first-type bit block in the present application or the second-type bit block in the present application, the first-type bit block is a bit block comprising a HARQ-ACK information bit, and the second-type bit block is a bit block different from the first-type bit block and having a same priority as the first-type bit block; whether the third bit block in the present application is received in the first time window is related to a number of the first-type bit block(s) in the T bit blocks, and the third-type bit block is a bit block associated with the first bit block.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting the first signaling in the present application; and receiving T bit blocks in the present application in a first time window in the present application, T being a positive integer greater than 1; herein, the first bit block in the present application is associated with the first signaling, and the first bit block does not belong to the T bit blocks; any of the T bit blocks is the first-type bit block in the present application or the second-type bit block in the present application, the first-type bit block is a bit block comprising a HARQ-ACK information bit, and the second-type bit block is a bit block different from the first-type bit block and having a same priority as the first-type bit block; whether the third bit block in the present application is received in the first time window is related to a number of the first-type bit block(s) in the T bit blocks, and the third-type bit block is a bit block associated with the first bit block.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the transmitter 454, the multi-antenna transmission processor 458, the transmitting processor 468, the controller/processor 459, the memory 460, or the data source 467 is used to transmit the T bit blocks in the present application in the first time window in the present application.

In one embodiment, at least one of the antenna 420, the receiver 418, the multi-antenna receiving processor 472, the receiving processor 470, the controller/processor 475, or the memory 476 is used to receive the T bit blocks in the present application in the first time window in the present application.

In one embodiment, at least one of the antenna 452, the transmitter 454, the multi-antenna transmission processor 458, the transmitting processor 468, the controller/processor 459, the memory 460, or the data source 467 is used to transmit the third-type bit block in the present application in the first time window in the present application.

In one embodiment, at least one of the antenna 420, the receiver 418, the multi-antenna receiving processor 472, the receiving processor 470, the controller/processor 475, or the memory 476 is used to receive the third-type bit block in the present application in the first time window in the present application.

Embodiment 5

Figure 5:
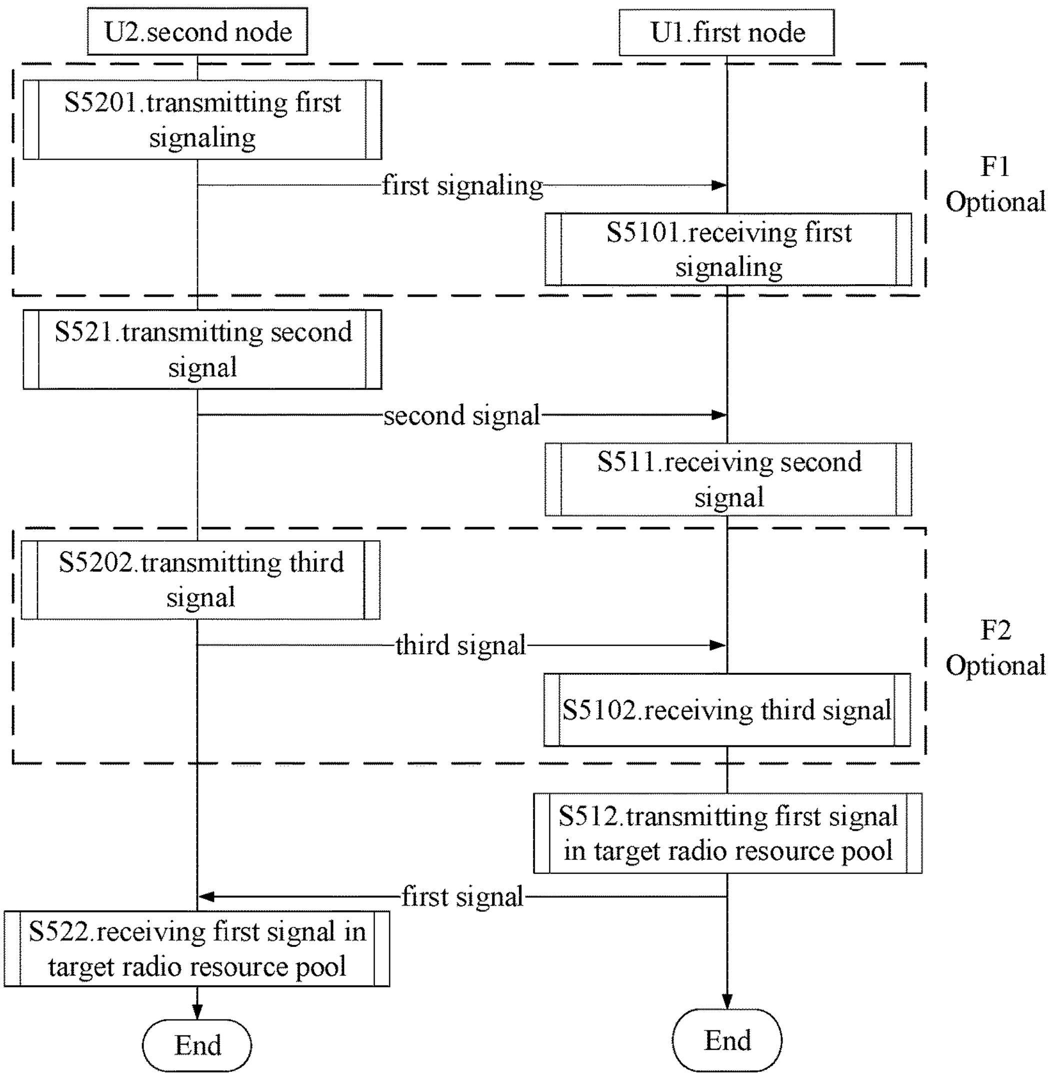
FIG. 5 illustrates a flowchart of signal transmission according to one embodiment of the present application.

Embodiment 5 illustrates a flowchart of signal transmission according to one embodiment in the present application, as shown in FIG. 5. In FIG. 5, a first node U1 and a second node U2 are in communications via an air interface. In FIG. 5, steps in the dotted blocks F1 and F2 are optional. In particular, the sequence between the two step pairs {S521, S511} and {S5202, S5102} in FIG. 5 does not represent that these steps are chronologically arranged. And multiple sub-embodiments in the embodiment 5 can be arbitrarily combined if there is no conflict.

The first node U1 receives a first signaling in step S5101; receives a second signal in step S511; receives a third signal in step S5102; transmits a first signal in a target radio resource pool in step S512.

The second node U2 transmits a first signaling in step S5201; transmits a second signal in step S521; and transmits a third signal in step S5202; receives a first signal in a target radio resource pool in step S522.

In Embodiment 5, the first signal carries a third bit block and a fourth bit block; a first bit block is associated with the second signal; a second bit block corresponds to a target index, the target index is a first index or a second index, and the first index is different from the second index; the third bit block is related to the first bit block, and the fourth bit block is related to the second bit block; a determination method of the target radio resource pool is related to the target index; the first signaling comprises scheduling information of the second signal; the first bit block comprises a UCI bit, and the second bit block comprises a UCI bit; the first index and the second index are priority indexes; a first radio resource pool is reserved for the first bit block, and a second radio resource pool is reserved for the second bit block; the first radio resource pool and the second radio resource pool are overlapped in time domain.

In one subembodiment of embodiment 5, the meaning of the phrase that a determination method of the target radio resource pool is related to the target index comprises: when the target index is the second index, the first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, the first signaling is used to indicate the target radio resource pool from the target radio resource pool list, M being a positive integer greater than 1; when the target index is the first index, the first bit block and the second bit block are both used to determine a first number, N radio resource pools respectively correspond to N number ranges, the target radio resource pool is a radio resource pool corresponding to a first number range among the N radio resource pools, the first number range is a number range comprising the first number among the N number ranges, N being a positive integer greater than 1.

In one subembodiment of embodiment 5, the meaning of the phrase that a determination method of the target radio resource pool is related to the target index comprises: when the target index is the second index, the first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, the first signaling is used to indicate the target radio resource pool from the target radio resource pool list, M being a positive integer greater than 1; when the target index is the first index, the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one subembodiment of embodiment 5, the meaning of the phrase that a determination method of the target radio resource pool is related to the target index comprises: when the target index is the second index, the first bit block and the second bit block are both used to determine a second number, N radio resource pools respectively correspond to N number ranges, the target radio resource pool is a radio resource pool corresponding to a second number range among the N radio resource pools, the second number range is a number range comprising the second number among the N number ranges, N being a positive integer greater than 1; when the target index is the first index, the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one subembodiment of embodiment 5, the second bit block is associated with third signal.

In one subembodiment of embodiment 5, the first bit block corresponds to the second index.

In one subembodiment of embodiment 5, the first bit block corresponds to the first index.

In one embodiment, the first node U1 is the first node in the present application.

In one embodiment, the second node U2 is the second node in the present application.

In one embodiment, the first node U1 is a UE.

In one embodiment, the second node U1 is a base station.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 comprises a cellular link.

In one embodiment, an air interface between the second node U2 and the first node U1 is a PC5 interface.

In one embodiment, an air interface between the second node U2 and the first node U1 comprises a sidelink.

In one embodiment, an air interface between the second node U2 and the first node U1 comprises a radio interface between a base station and a UE.

In one embodiment, an air interface between the second node U2 and the first node U1 comprises a radio interface between UEs.

In one embodiment, the first signaling is dynamically configured.

In one embodiment, the first signaling comprises a layer 1 (L1) signaling.

In one embodiment, the first signaling comprises a L1 control signaling.

In one embodiment, the first signaling comprises a physical-layer signaling.

In one embodiment, the first signaling comprises one or multiple fields in a physical-layer signaling.

In one embodiment, the first signaling comprises a higher-layer signaling.

In one embodiment, the first signaling comprises one or multiple fields in a higher-layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling comprises one or multiple fields in an RRC signaling.

In one embodiment, the first signaling comprises one or multiple fields in a MAC CE signaling.

In one embodiment, the first signaling comprises Downlink Control Information (DCI).

In one embodiment, the first signaling comprises one or multiple fields in a DCI.

In one embodiment, the first signaling is a DCI.

In one embodiment, the first signaling comprises Sidelink Control Information (SCI).

In one embodiment, the first signaling comprises one or multiple fields in an SCI.

In one embodiment, the first signaling comprises one or multiple fields in an Information Element (IE).

In one embodiment, the first signaling is a DownLink Grant Signalling.

In one embodiment, the first signaling is an UpLink Grant Signalling.

In one embodiment, the first signaling is transmitted on a downlink physical layer control channel (i.e., a downlink channel only capable of bearing a physical-layer signaling).

In one embodiment, the downlink physical-layer control channel in the present application is a Physical Downlink Control CHannel (PDCCH).

In one embodiment, the downlink physical layer control channel in the present application is a short PDCCH (sPDCCH).

In one embodiment, the downlink physical layer control channel in the present application is a Narrow Band PDCCH (NB-PDCCH).

In one embodiment, the first signaling is DCI format 1_0, and for the specific meaning of the DCI format refer to section 7.3.1.2 in 3GPP TS38. 212.

In one embodiment, the first signaling is DCI format 1_1, and for the specific meaning of the DCI format 1_1, refer to section 7.3.1.2 in 3GPP TS38. 212.

In one embodiment, the first signaling is DCI format 1_2, and for the specific meaning of the DCI format refer to section 7.3.1.2 in 3GPP TS38. 212.

In one embodiment, the first signaling is DCI format 0_0, and for the specific meaning of the DCI format refer to section 7.3.1.1 in 3GPP TS38. 212.

In one embodiment, the first signaling is DCI format 0_1, and for the specific meaning of the DCI format 0_1, refer to section 7.3.1.1 in 3GPP TS38. 212.

In one embodiment, the first signaling is DCI format 0_2, and for the specific meaning of the DCI format 0_2, refer to section 7.3.1.1 in 3GPP TS38. 212.

In one embodiment, the scheduling information in the present application comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a periodicity, a transmission antenna port, or a corresponding Transmission Configuration Indicator (TCI) state.

In one embodiment, the first signaling comprises a Priority indicator field, and the Priority indicator field comprised in the first signaling indicates a priority corresponding to the first bit block.

In one embodiment, steps in dotted box F1 in FIG. 5 exist.

In one embodiment, steps in dotted box F1 in FIG. 5 do not exist.

In one embodiment, steps in dotted box F2 in FIG. 5 exist.

In one embodiment, steps in dotted box F2 in FIG. 5 do not exist.

Embodiment 6

Figure 6:
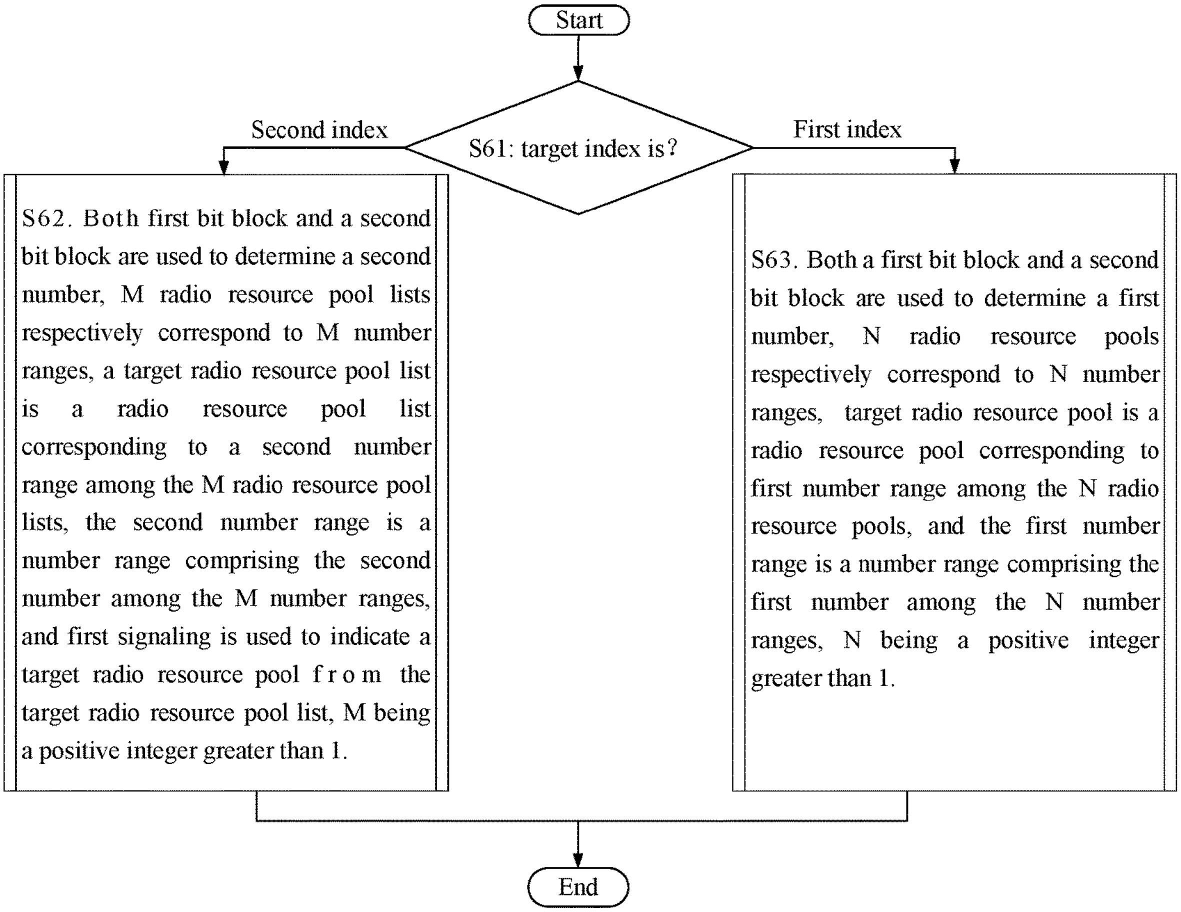
FIG. 6 illustrates a flowchart of determining a target radio resource pool based on a target index according to one embodiment of the present application.

Embodiment 6 illustrates a flowchart of determining a target radio resource pool based on a target index according to one embodiment of the present application, as shown in FIG. 6.

In Embodiment 6, the first node in the present application determines a target index in step S61; if the target index is a second index, then goes to step S61 to determine a target radio resource pool: a first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, a first signaling is used to indicate the target radio resource pool from a target radio resource pool list, M being a positive integer greater than 1; if the target index is a first index, then goes to step S63 to determine a target radio resource pool: a first bit block and the second bit block are both used to determine a first number, N radio resource pools respectively correspond to N number ranges, a target radio resource pool is a radio resource pool corresponding to a first number range among the N radio resource pools, the first number range is a number range comprising the first number among the N number ranges, N being a positive integer greater than 1.

In one embodiment, the radio resource pool list in the present application comprises one or multiple radio resource pools.

In one embodiment, the number range in the present application comprises one or multiple quantities.

In one embodiment, the meaning of the phrase that both the first bit block and the second bit block are used to determine a second number comprises: the second number is equal to a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a second number comprises: the second number is not greater than a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a second number comprises: the second number is equal to a sum of a number of bit(s) comprised in the third bit block and a number of bit(s) comprised in the fourth bit block, the third bit block is related to the first bit block, and the fourth bit block is related to the second bit block.

In one embodiment, the meaning of the phrase that both the first bit block and the second bit block are used to determine a second number comprises: the second number is equal to a number of bit(s) comprised in the first bit block (size of the first bit block) plus a second weight value multiplied by a number of bit(s) comprised in the second bit block (size of the second bit block).

In one embodiment, the meaning of the phrase that both the first bit block and the second bit block are used to determine a second number comprises: the second number is equal to a number of bit(s) comprised in the second bit block (size of the second bit block) plus a second weight value multiplied by a number of bit(s) comprised in the first bit block (size of the first bit block).

In one embodiment, the second weight value is predefined.

In one embodiment, the second weight value is configured by a higher-layer signaling.

In one embodiment, the second weight value is greater than 0 and not greater than 1.

In one embodiment, the meaning of the phrase that both the first bit block and the second bit block are used to determine a first number comprises: the first number is equal to a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a first number comprises: the first number is not greater than a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a first number comprises: the first number is equal to a sum of a number of bit(s) comprised in the third bit block and a number of bit(s) comprised in the fourth bit block, the third bit block is related to the first bit block, and the fourth bit block is related to the second bit block.

In one embodiment, the meaning of the phrase that both the first bit block and the second bit block are used to determine a first number comprises: the first number is equal to a number of bit(s) comprised in the first bit block (size of the first bit block) plus a first weight value multiplied by a number of bit(s) comprised in the second bit block (size of the second bit block).

In one embodiment, the meaning of the phrase that both the first bit block and the second bit block are used to determine a first number comprises: the first number is equal to a number of bit(s) comprised in the second bit block (size of the second bit block) plus a first weight value multiplied by a number of bit(s) comprised in the first bit block (size of the first bit block).

In one embodiment, the first weight value is predefined.

In one embodiment, the first weight value is configured by a higher-layer signaling.

In one embodiment, the first weight value is greater than 0 and not greater than 1.

In one embodiment, the first number is the second number.

In one embodiment, the first number is not the second number.

In one embodiment, the first number is equal to the second number.

In one embodiment, the first number is not equal to the second number.

In one embodiment, the first number is greater than the second number.

In one embodiment, the first number is less than the second number.

In one embodiment, any of the M number ranges comprises at least one number.

In one embodiment, one of the M number ranges is (0, 2].

In one embodiment, one of the M number ranges is (2, N2'].

In one embodiment, one of the M number ranges is (N2', N3'].

In one embodiment, one of the M number ranges is (N3', 1706].

In one embodiment, the N2' is indicated by a higher-layer signaling.

In one embodiment, the N3' is indicated by a higher-layer signaling.

In one embodiment, any two of the M number ranges are orthogonal to each other.

In one embodiment, when one number range among the M number ranges comprises a number: other number ranges besides the number range among the M number ranges do not comprise the number.

In one embodiment, M is not greater than 4.

In one embodiment, M is not greater than 1024.

In one embodiment, a corresponding rule between the M radio interface resource pool lists and the M number ranges is predefined (default).

In one embodiment, a corresponding rule between the M radio interface resource pool lists and the M number ranges is configured by a higher-layer signaling.

In one embodiment, the M radio resource pool lists are configured by a higher-layer signaling.

In one embodiment, any of the N number ranges comprises at least one number.

In one embodiment, one of the N number ranges is (0, 2].

In one embodiment, one of the N number ranges is (2, N2].

In one embodiment, one of the N number ranges is (N2, N3].

In one embodiment, one of the N number ranges is (N3, 1706].

In one embodiment, N2 is indicated by a higher-layer signaling.

In one embodiment, N3 is indicated by a higher-layer signaling.

In one embodiment, any two of the N number ranges are orthogonal to each other.

In one embodiment, when one number range among the N number ranges comprises a number: other number ranges besides the number range among the N number ranges do not comprise the number.

In one embodiment, N is not greater than 4.

In one embodiment, N is not greater than 1024.

In one embodiment, a corresponding rule between the N radio resource pools and the N number ranges is predefined (default).

In one embodiment, a corresponding rule between the N radio resource pools and the N number ranges is configured by a higher-layer signaling.

In one embodiment, the meaning of the phrase that the first signaling is used to indicate the target radio resource pool from the target radio resource pool list comprises: the first signaling indicates a sequential index of the target radio resource pool in the target radio resource pool list.

In one embodiment, the meaning of the phrase that the first signaling is used to indicate the target radio resource pool from the target radio resource pool list comprises: a PUCCH resource indicator field in the first signaling is used to indicate the target radio resource pool from the target radio resource pool list.

In one embodiment, when the target index is the second index, a number of radio resource pools comprised in the target radio resource pool list is greater than 1.

In one embodiment, the N radio resource pools are configured by a higher-layer signaling.

In one embodiment, the meaning of the phrase that the second number range is a number range comprising the second number among the M number ranges comprises: the second number range is one of the M number ranges, and the second number is a number in the second number range.

In one embodiment, the meaning of the phrase that the first number range is a number range comprising the first number among the N number ranges comprises: the first number range is one of the N number ranges, and the first number is a number in the first number range.

Embodiment 7

Figure 7:
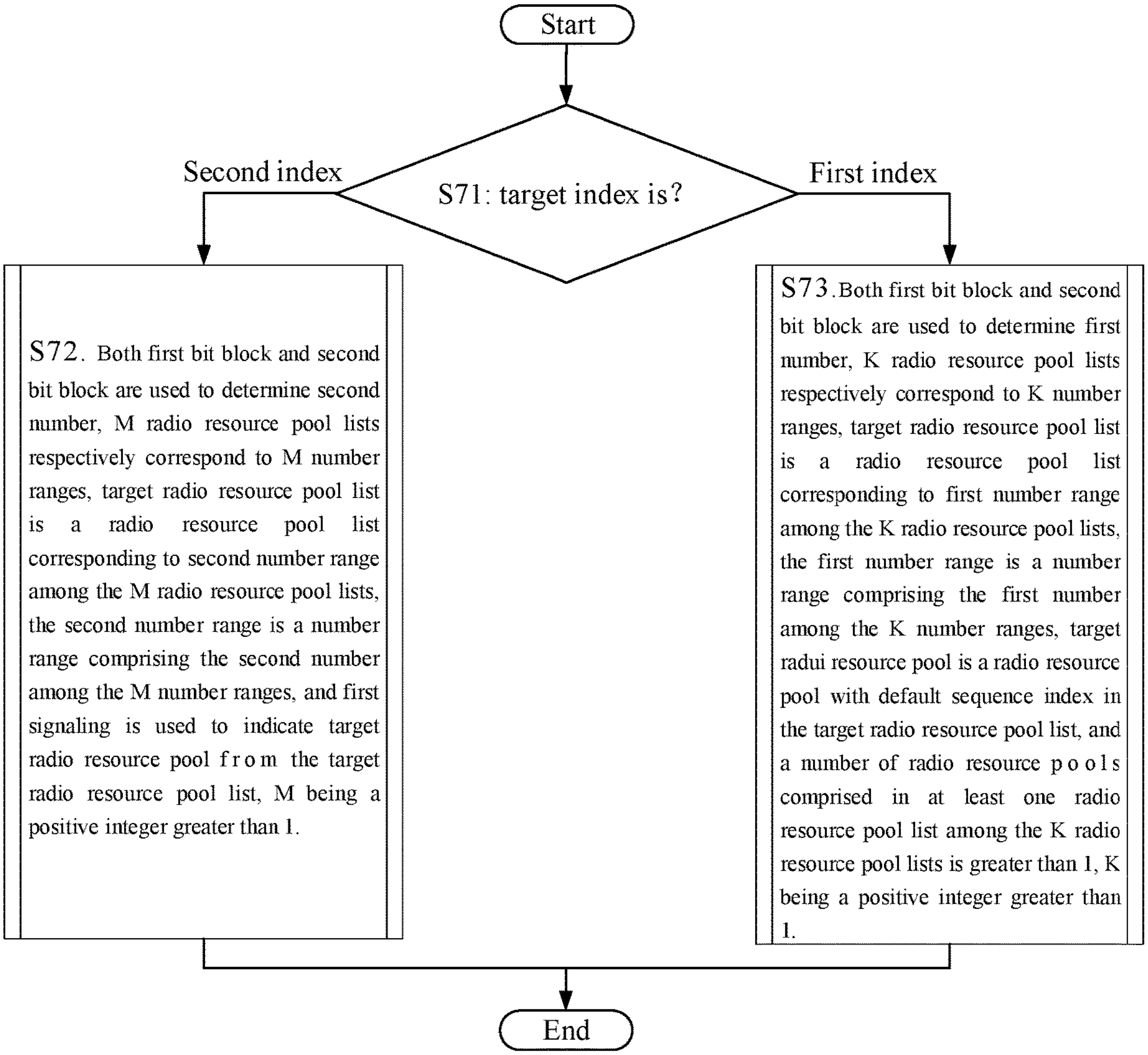
FIG. 7 illustrates a flowchart of determining a target radio resource pool based on a target index according to one embodiment of the present application.

Embodiment 7 illustrates a flowchart of determining a target radio resource pool based on a target index according to one embodiment of the present application, as shown in FIG. 7.

In Embodiment 7, the first node in the present application determines a target index in step S71; if the target index is a second index, then goes to step S72 to determine a target radio resource pool: a first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, a first signaling is used to indicate a target radio resource pool from the target radio resource pool list, M being a positive integer greater than 1; if the target index is a first index, then goes to step S73 to determine a target radio resource pool: a first bit block and a second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, a target radio resource pool is a radio resource pool with a default sequential index in the target radio resource pool list, and a number of radio resource pools comprised in at least one of the K radio resource pool lists is greater than 1, K being a positive integer greater than 1.

In one embodiment, the radio resource pool list in the present application comprises one or multiple radio resource pools.

In one embodiment, the number range in the present application comprises one or multiple numbers.

In one embodiment, the meaning of the phrase that both the first bit block and the second bit block are used to determine a second number comprises: the second number is equal to a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a second number comprises: the second number is not greater than a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a second number comprises: the second number is equal to a sum of a number of bit(s) comprised in the third bit block and a number of bit(s) comprised in the fourth bit block, the third bit block is related to the first bit block, and the fourth bit block is related to the second bit block.

In one embodiment, the meaning of the phrase that both the first bit block and the second bit block are used to determine a second number comprises: the second number is equal to a number of bit(s) comprised in the first bit block (size of the first bit block) plus a second weight value multiplied by a number of bit(s) comprised in the second bit block (size of the second bit block).

In one embodiment, the meaning of the phrase that both the first bit block and the second bit block are used to determine a second number comprises: the second number is equal to a number of bit(s) comprised in the second bit block (size of the second bit block) plus a second weight value multiplied by a number of bit(s) comprised in the first bit block (size of the first bit block).

In one embodiment, the second weight value is predefined.

In one embodiment, the second weight value is configured by a higher-layer signaling.

In one embodiment, the second weight value is greater than 0 and not greater than 1.

In one embodiment, the meaning of the phrase that both the first bit block and the second bit block are used to determine a first number comprises: the first number is equal to a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a first number comprises: the first number is not greater than a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a first number comprises: the first number is equal to a sum of a number of bit(s) comprised in the third bit block and a number of bit(s) comprised in the fourth bit block, the third bit block is related to the first bit block, and the fourth bit block is related to the second bit block.

In one embodiment, the meaning of the phrase that both the first bit block and the second bit block are used to determine a first number comprises: the first number is equal to a number of bit(s) comprised in the first bit block (size of the first bit block) plus a first weight value multiplied by a number of bit(s) comprised in the second bit block (size of the second bit block).

In one embodiment, the meaning of the phrase that both the first bit block and the second bit block are used to determine a first number comprises: the first number is equal to a number of bit(s) comprised in the second bit block (size of the second bit block) plus a first weight value multiplied by a number of bit(s) comprised in the first bit block (size of the first bit block).

In one embodiment, the first weight value is predefined.

In one embodiment, the first weight value is configured by a higher-layer signaling.

In one embodiment, the first weight value is greater than 0 and not greater than 1.

In one embodiment, the first number is the second number.

In one embodiment, the first number is not the second number.

In one embodiment, the first number is equal to the second number.

In one embodiment, the first number is not equal to the second number.

In one embodiment, the first number is greater than the second number.

In one embodiment, the first number is less than the second number.

In one embodiment, any of the M number ranges comprises at least one number.

In one embodiment, one of the M number ranges is (0, 2].

In one embodiment, one of the M number ranges is (2, N2'].

In one embodiment, one of the M number ranges is (N2', N3'].

In one embodiment, one of the M number ranges is (N3', 1706].

In one embodiment, the N2' is indicated by a higher-layer signaling.

In one embodiment, the N3' is indicated by a higher-layer signaling.

In one embodiment, any two of the M number ranges are orthogonal to each other.

In one embodiment, when one number range among the M number ranges comprises a number: other number ranges besides the number range among the M number ranges do not comprise the number.

In one embodiment, M is not greater than 4.

In one embodiment, M is not greater than 1024.

In one embodiment, a corresponding rule between the M radio interface resource pool lists and the M number ranges is predefined (default).

In one embodiment, a corresponding rule between the M radio interface resource pool lists and the M number ranges is configured by a higher-layer signaling.

In one embodiment, the M radio resource pool lists are configured by a higher-layer signaling.

In one embodiment, any of the K number ranges comprises at least one number.

In one embodiment, one of the K number ranges is (0, 2].

In one embodiment, one of the K number ranges is (2, N2"].

In one embodiment, one of the K number ranges is (N2", N3"].

In one embodiment, one of the K number ranges is (N3", 1706].

In one embodiment, the N2" is indicated by a higher-layer signaling.

In one embodiment, the N3" is indicated by a higher-layer signaling.

In one embodiment, any two of the K number ranges are orthogonal to each other.

In one embodiment, when one number range among the K number ranges comprises a number: other number ranges besides the number range among the K number ranges do not comprise the number.

In one embodiment, K is not greater than 4.

In one embodiment, K is not greater than 1024.

In one embodiment, a corresponding rule between the K radio resource pool lists and the K number ranges is predefined (default).

In one embodiment, a corresponding rule between the K radio interface resource pool lists and the K number ranges is configured by a higher-layer signaling.

In one embodiment, the meaning of the phrase that the first signaling is used to indicate the target radio resource pool from the target radio resource pool list comprises: the first signaling indicates a sequential index of the target radio resource pool in the target radio resource pool list.

In one embodiment, the meaning of the phrase that the first signaling is used to indicate the target radio resource pool from the target radio resource pool list comprises: a PUCCH resource indicator field in the first signaling is used to indicate the target radio resource pool from the target radio resource pool list.

In one embodiment, the meaning of the phrase that the target radio resource pool is a radio resource pool with a default sequential index in the target radio resource pool list comprises: the target radio resource pool is a first radio resource pool in the target radio resource pool list.

In one embodiment, the meaning of the phrase that the target radio resource pool is a radio resource pool with a default sequential index in the target radio resource pool list comprises: the target radio resource pool is a last radio resource pool in the target radio resource pool list.

In one embodiment, the default sequential index is a predefined sequential index.

In one embodiment, the default sequential index is a sequential index configured by a higher-layer signaling.

In one embodiment, when the target index is the first index, a number of radio resource pools comprised in the target radio resource pool list is greater than 1.

In one embodiment, when the target index is the second index, a number of radio resource pools comprised in the target radio resource pool list is greater than 1.

In one embodiment, a number of radio resource pools comprised in any of the K radio resource pool lists is greater than 1.

In one embodiment, the K radio resource pool lists are configured by a higher-layer signaling.

In one embodiment, the K radio resource pool lists in the present application are configured for multiplexing between UCI bits with different priorities.

In one embodiment, one of the K radio resource pool lists in the present application is configured for multiplexing between UCI bits with different priorities.

In one embodiment, the meaning of the phrase that the second number range is a number range comprising the second number among the M number ranges comprises: the second number range is one of the M number ranges, and the second number is a number in the second number range.

In one embodiment, the meaning of the phrase of the first number range is a number range comprising the first number among the K number ranges comprises: the first number range is one of the K number ranges, and the first number is a number in the first number range.

Embodiment 8

Embodiment 8 illustrates a flowchart of determining a target radio resource pool based on a target index according to one embodiment of the present application, as shown in FIG. 8.

In Embodiment 8, the first node in the present application determines a target index in step S81; if the target index is a second index, then goes to step S82 to determine a target radio resource pool: a first bit block and a second bit block are both used to determine a second number, N radio resource pools respectively correspond to N number ranges, a target radio resource pool is a radio resource pool corresponding to a second number range among the N radio resource pools, the second number range is a number range comprising the second number among the N number ranges, N being a positive integer greater than 1; if the target index is a first index, goes to step S83 to determine a target radio resource pool: a first bit block and a second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, a target radio resource pool is a radio resource pool with a default sequential index in the target radio resource pool list, and a number of radio resource pools comprised in at least one of the K radio resource pool lists is greater than 1, K being a positive integer greater than 1.

In one embodiment, the radio resource pool list in the present application comprises one or multiple radio resource pools.

In one embodiment, the number range in the present application comprises one or multiple quantities.

In one embodiment, the meaning of the phrase that both the first bit block and the second bit block are used to determine a second number comprises: the second number is equal to a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a second number comprises: the second number is not greater than a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a second number comprises: the second number is equal to a sum of a number of bit(s) comprised in the third bit block and a number of bit(s) comprised in the fourth bit block, the third bit block is related to the first bit block, and the fourth bit block is related to the second bit block.

In one embodiment, the meaning of the phrase that both the first bit block and the second bit block are used to determine a second number comprises: the second number is equal to a number of bit(s) comprised in the first bit block (size of the first bit block) plus a second weight value multiplied by a number of bit(s) comprised in the second bit block (size of the second bit block).

In one embodiment, the meaning of the phrase that both the first bit block and the second bit block are used to determine a second number comprises: the second number is equal to a number of bit(s) comprised in the second bit block (size of the second bit block) plus a second weight value multiplied by a number of bit(s) comprised in the first bit block (size of the first bit block).

In one embodiment, the second weight value is predefined.

In one embodiment, the second weight value is configured by a higher-layer signaling.

In one embodiment, the second weight value is greater than 0 and not greater than 1.

In one embodiment, the meaning of the phrase that both the first bit block and the second bit block are used to determine a first number comprises: the first number is equal to a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a first number comprises: the first number is not greater than a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a first number comprises: the first number is equal to a sum of a number of bit(s) comprised in the third bit block and a number of bit(s) comprised in the fourth bit block, the third bit block is related to the first bit block, and the fourth bit block is related to the second bit block.

In one embodiment, the meaning of the phrase that both the first bit block and the second bit block are used to determine a first number comprises: the first number is equal to a number of bit(s) comprised in the first bit block (size of the first bit block) plus a first weight value multiplied by a number of bit(s) comprised in the second bit block (size of the second bit block).

In one embodiment, the meaning of the phrase that both the first bit block and the second bit block are used to determine a first number comprises: the first number is equal to a number of bit(s) comprised in the second bit block (size of the second bit block) plus a first weight value multiplied by a number of bit(s) comprised in the first bit block (size of the first bit block).

In one embodiment, the first weight value is predefined.

In one embodiment, the first weight value is configured by a higher-layer signaling.

In one embodiment, the first weight value is greater than 0 and not greater than 1.

In one embodiment, the first number is the second number.

In one embodiment, the first number is not the second number.

In one embodiment, the first number is equal to the second number.

In one embodiment, the first number is not equal to the second number.

In one embodiment, the first number is greater than the second number.

In one embodiment, the first number is less than the second number.

In one embodiment, any of the N number ranges comprises at least one number.

In one embodiment, one of the N number ranges is (0, 2].

In one embodiment, one of the N number ranges is (2, N2].

In one embodiment, one of the N number ranges is (N2, N3].

In one embodiment, one of the N number ranges is (N3, 1706].

In one embodiment, N2 is indicated by a higher-layer signaling.

In one embodiment, N3 is indicated by a higher-layer signaling.

In one embodiment, any two of the N number ranges are orthogonal to each other.

In one embodiment, when one number range among the N number ranges comprises a number: other number ranges besides the number range among the N number ranges do not comprise the number.

In one embodiment, N is not greater than 4.

In one embodiment, N is not greater than 1024.

In one embodiment, a corresponding rule between the N radio interface resource pools and the N number ranges is predefined (default).

In one embodiment, a corresponding rule between the N radio resource pools and the N number ranges is configured by a higher-layer signaling.

In one embodiment, the N radio resource pools are configured by a higher-layer signaling.

In one embodiment, any of the K number ranges comprises at least one number.

In one embodiment, one of the K number ranges is (0, 2].

In one embodiment, one of the K number ranges is (2, N2"].

In one embodiment, one of the K number ranges is (N2", N3"].

In one embodiment, one of the K number ranges is (N3", 1706].

In one embodiment, the N2" is indicated by a higher-layer signaling.

In one embodiment, the N3" is indicated by a higher-layer signaling.

In one embodiment, any two of the K number ranges are orthogonal to each other.

In one embodiment, when one number range among the K number ranges comprises a number: other number ranges besides the number range among the K number ranges do not comprise the number.

In one embodiment, K is not greater than 4.

In one embodiment, K is not greater than 1024.

In one embodiment, a corresponding rule between the K radio resource pool lists and the K number ranges is predefined (default).

In one embodiment, a corresponding rule between the K radio interface resource pool lists and the K number ranges is configured by a higher-layer signaling.

In one embodiment, the meaning of the phrase that the target radio resource pool is a radio resource pool with a default sequential index in the target radio resource pool list comprises: the target radio resource pool is a first radio resource pool in the target radio resource pool list.

In one embodiment, the meaning of the phrase that the target radio resource pool is a radio resource pool with a default sequential index in the target radio resource pool list comprises: the target radio resource pool is a last radio resource pool in the target radio resource pool list.

In one embodiment, the default sequential index is a predefined sequential index.

In one embodiment, the default sequential index is a sequential index configured by a higher-layer signaling.

In one embodiment, when the target index is the first index, a number of radio resource pools comprised in the target radio resource pool list is greater than 1.

In one embodiment, a number of radio resource pools comprised in any of the K radio resource pool lists is greater than 1.

In one embodiment, the K radio resource pool lists are configured by a higher-layer signaling.

In one embodiment, the meaning of the phrase that the second number range is a number range comprising the second number among the N number ranges comprises: the second number range is one of the N number ranges, and the second number is a number in the second number range.

In one embodiment, the meaning of the phrase of the first number range is a number range comprising the first number among the K number ranges comprises: the first number range is one of the K number ranges, and the first number is a number in the first number range.

Embodiment 9

Embodiment 9 illustrates an illustration schematic diagram of a first index and a second index according to one embodiment of the present application, as shown in FIG. 9.

In embodiment 9, a first index and a second index are both priority indexes.

In one embodiment, the first index in the present application is priority index 0, and the second index in the present application is priority index 1.

In one embodiment, the first index in the present application is priority index 1, and the second index in the present application is priority index 0.

In one embodiment, the first index and the second index in the present application respectively indicate different priorities.

In one embodiment, the first index and the second index in the present application respectively indicate different Quality of Services (QoSs).

In one embodiment, the first index and the second index in the present application respectively indicate different service types.

Embodiment 10

Figure 10:
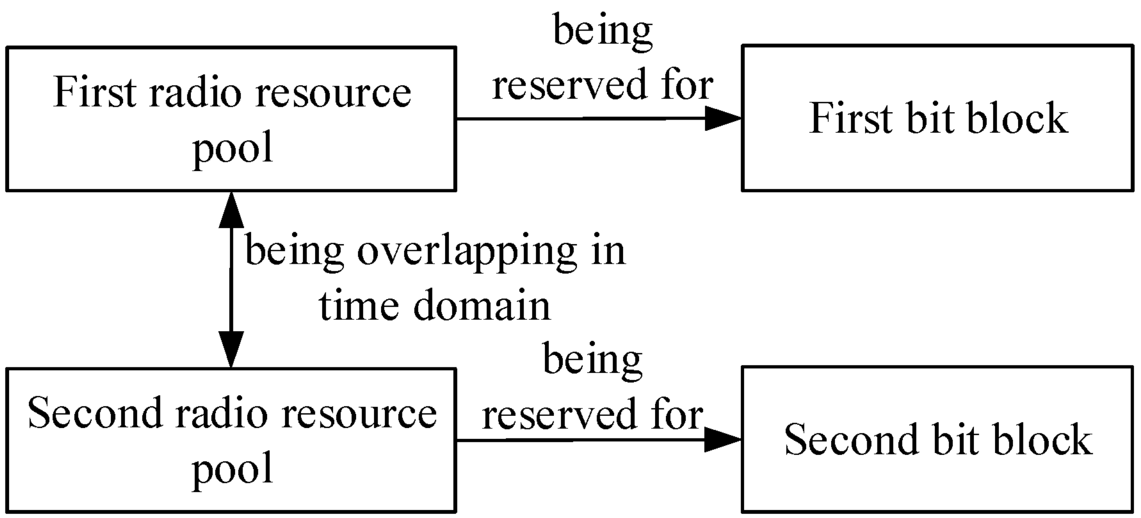
FIG. 10 illustrates a schematic diagram of relations among a first radio resource pool, a first bit block, a second radio resource pool and a second bit block according to one embodiment of the present application.

Embodiment 10 illustrates a schematic diagram of relations among a first radio resource pool, a first bit block, a second radio resource pool and a second bit block according to one embodiment of the present application, as shown in FIG. 10.

In embodiment 10, a first radio resource pool is reserved for a first bit block, and a second radio resource pool is reserved for a second bit block; the first radio resource pool and the second radio resource pool are overlapped in time domain.

In one embodiment, the first signaling in the present application indicates the first radio resource pool.

In one embodiment, the first radio resource pool is indicated by a DCI.

In one embodiment, the first radio resource pool is configured by a higher-layer signaling.

In one embodiment, the second radio resource pool is indicated by a DCI.

In one embodiment, the second radio resource pool is configured by a higher-layer signaling.

In one embodiment, the first radio resource pool comprises a PUCCH resource.

In one embodiment, the second radio resource pool comprises a PUCCH resource.

In one embodiment, the first radio resource pool is a PUCCH resource.

In one embodiment, the second radio resource pool is a PUCCH resource.

Embodiment 11

Figure 11:
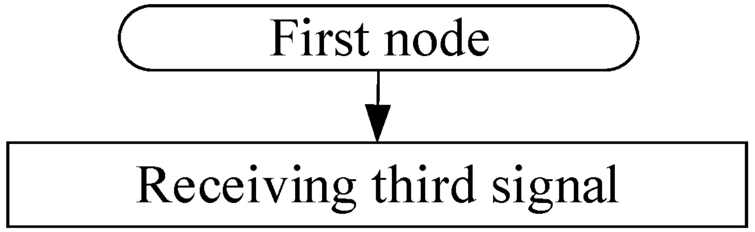
FIG. 11 illustrates a flowchart of processing performed by a first node on a third signal according to one embodiment of the present application.

Embodiment 11 illustrates a flowchart of the processing of a first node for a third signal according to one embodiment of the present application, as shown in FIG. 11.

In embodiment 11, the first node in the present application also receives a third signal, and the second bit block in the present application is associated with the third signal.

In one embodiment, the third signal is transmitted on a PDSCH.

In one embodiment, the third signal carries one or multiple TBs.

In one embodiment, the meaning of the phrase that a second bit block is associated to the third signal comprises: the second bit block comprises a HARQ-ACK information bit for the third signal.

In one embodiment, the meaning of the phrase that a second bit block is associated to the third signal comprises: the second bit block comprises an information bit indicating whether the third signal is correctly received.

Embodiment 12

Figure 12:
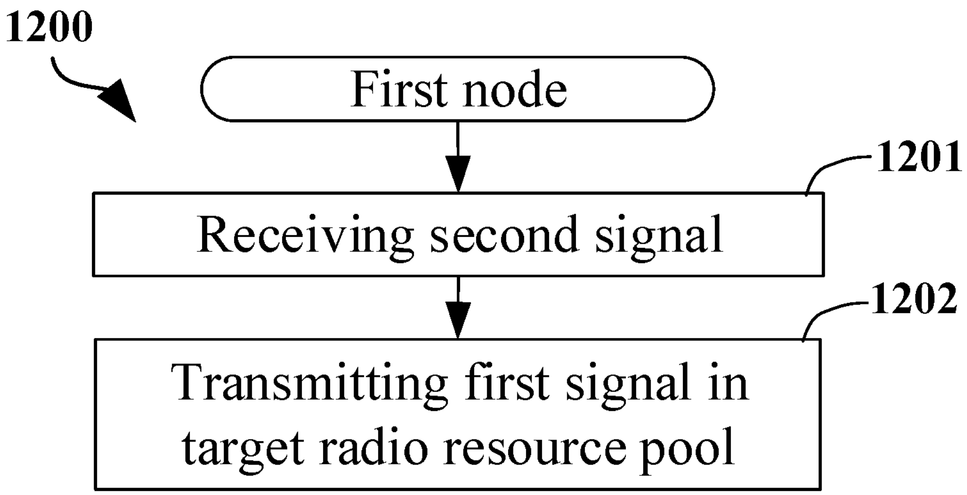
FIG. 12 illustrates a flowchart of the processing of a first node according to one embodiment of the present application.

Embodiment 12 illustrates a processing flowchart of a first node according to one embodiment of the present application, as shown in FIG. 12.

In Embodiment 12, the first node in the present application receives a second signal in step 1201; transmits a first signal on a target radio resource pool in step 1202.

In Embodiment 12, the first signal carries a third bit block and a fourth bit block; a first bit block is associated with the second signal; the third bit block is related to the first bit block, and the fourth bit block is related to a second bit block; the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one embodiment, the meaning of the phrase that a first bit block is associated to the second signal comprises: the first bit block comprises a CSI report for the second signal.

In one embodiment, the second signal is transmitted on a PDSCH.

In one embodiment, the second signal carries one or multiple TBs.

In one embodiment, the meaning of the phrase that a first bit block is associated to the second signal comprises: the first bit block comprises a HARQ-ACK information bit for the second signal.

In one embodiment, the meaning of the phrase that a first bit block is associated to the second signal comprises: the first bit block comprises an information bit indicating whether the second signal is correctly received.

In one embodiment, the first bit block comprises at least one bit.

In one embodiment, the first bit block comprises at least three bits.

In one embodiment, the first bit block comprises at least five bits.

In one embodiment, the second bit block comprises at least one bit.

In one embodiment, the first bit block comprises an Uplink Control Information (UCI) information bit.

In one embodiment, the second bit block comprises a UCI bit.

In one embodiment, the first bit block comprises a HARQ-ACK information bit, and the second bit block comprises a Scheduling Request (SR) bit.

In one subembodiment of the above embodiment, the first bit block comprises HARQ-ACK information bit(s) for PDSCH reception(s) scheduled for DCI(s).

In one subembodiment of the above embodiment, the first bit block only comprises HARQ-ACK information bit(s) for SPS PDSCH reception(s).

In one embodiment, the first bit block comprises HARQ-ACK information bit(s), and the second bit block comprises positive SR bit(s).

In one subembodiment of the above embodiment, the first bit block comprises HARQ-ACK information bit(s) for PDSCH reception(s) scheduled for DCI(s).

In one subembodiment of the above embodiment, the first bit block only comprises HARQ-ACK information bit(s) for SPS PDSCH reception(s).

In one embodiment, the first bit block comprises HARQ-ACK information bit(s) for PDSCH reception(s) scheduled by DCI(s), and the second bit block only comprises HARQ-ACK information bit(s) for SPS PDSCH reception(s).

In one embodiment, the first bit block comprises a bit used for a Channel State Information report (CSI report), and the second bit block comprises at least one of HARQ-ACK information bit(s) for SPS PDSCH reception(s) or an SR bit.

In one embodiment, the first bit block is used to generate the third bit block, or the third bit block is the first bit block.

In one embodiment, the second bit block is used to generate the fourth bit block, or, the fourth bit block is the second bit block.

In one embodiment, the third bit block comprises at least one bit.

In one embodiment, the third bit block comprises at least three bits.

In one embodiment, the third bit block comprises at least five bits.

In one embodiment, the fourth bit block comprises at least one bit.

In one embodiment, the third bit block comprises a UCI bit.

In one embodiment, the fourth bit block comprises a UCI bit.

In one embodiment, the third bit block comprises HARQ-ACK information bit(s), and the fourth bit block comprises Scheduling Request (SR) bit(s).

In one subembodiment of the above embodiment, the third bit block comprises HARQ-ACK information bit(s) for PDSCH reception(s) scheduled by DCI(s).

In one subembodiment of the above embodiment, the third bit block only comprises HARQ-ACK information bit(s) for SPS PDSCH reception(s).

In one embodiment, the third bit block comprises a HARQ-ACK information bit, and the fourth bit block comprises a positive SR bit.

In one subembodiment of the above embodiment, the third bit block comprises HARQ-ACK information bit(s) for PDSCH reception(s) scheduled by DCI(s).

In one subembodiment of the above embodiment, the third bit block only comprises HARQ-ACK information bit(s) for SPS PDSCH reception(s).

In one embodiment, the third bit block comprises HARQ-ACK information bit(s) for PDSCH reception(s) scheduled by DCI(s), and the fourth bit block only comprises HARQ-ACK information bit(s) for SPS PDSCH reception(s).

In one embodiment, the third bit block comprises a bit used for a Channel State Information report (CSI report), and the fourth bit block comprises at least one of HARQ-ACK information bit(s) for SPS PDSCH reception(s) or an SR bit.

In one embodiment, a priority index corresponding to the first bit block is different from a priority index corresponding to the second bit block.

In one embodiment, a priority index corresponding to the third bit block is the same as a priority index corresponding to the first bit block.

In one embodiment, a priority index corresponding to the fourth bit block is the same as a priority index corresponding to the second bit block.

In one embodiment, the meaning of the phrase that the first number range is a number range comprising the first number among the K number ranges comprises: the first number range is one of the K number ranges, and the first number is a number in the first number range.

In one embodiment, the number range comprises one or multiple numbers.

In one embodiment, the meaning of the phrase that both the first bit block and the second bit block are used to determine a first number comprises: the first number is equal to a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a first number comprises: the first number is not greater than a sum of a number of bit(s) comprised in the first bit block (size of the first bit block) and a number of bit(s) comprised in the second bit block (size of the second bit block).

In one embodiment, the meaning of the phrase that both the first bit block and the second bit block are used to determine a first number comprises: the first number is equal to a sum of a number of bit(s) comprised in the third bit block and a number of bit(s) comprised in the fourth bit block, the third bit block is related to the first bit block, and the fourth bit block is related to the second bit block.

In one embodiment, the meaning of the phrase that both the first bit block and the second bit block are used to determine a first number comprises: the first number is equal to a number of bit(s) comprised in the first bit block (size of the first bit block) plus a first weight value multiplied by a number of bit(s) comprised in the second bit block (size of the second bit block).

In one embodiment, the meaning of the phrase that both the first bit block and the second bit block are used to determine a first number comprises: the first number is equal to a number of bit(s) comprised in the second bit block (size of the second bit block) plus a first weight value multiplied by a number of bit(s) comprised in the first bit block (size of the first bit block).

In one embodiment, the first weight value is predefined.

In one embodiment, the first weight value is configured by a higher-layer signaling.

In one embodiment, the first weight value is greater than 0 and not greater than 1.

In one embodiment, any of the K number ranges comprises at least one number.

In one embodiment, one of the K number ranges is (0, 2].

In one embodiment, one of the K number ranges is (2, N2"].

In one embodiment, one of the K number ranges is (N2", N3"].

In one embodiment, one of the K number ranges is (N3", 1706].

In one embodiment, the N2" is indicated by a higher-layer signaling.

In one embodiment, the N3" is indicated by a higher-layer signaling.

In one embodiment, any two of the K number ranges are orthogonal to each other.

In one embodiment, when one number range among the K number ranges comprises one number: other number ranges besides the number range among the K number ranges do not comprise the number.

In one embodiment, K is not greater than 4.

In one embodiment, K is not greater than 1024.

In one embodiment, a corresponding rule between the K radio resource pool lists and the K number ranges is predefined (default).

In one embodiment, a corresponding rule between the K radio resource pool lists and the K number ranges is configured by a higher-layer signaling.

In one embodiment, the meaning of the phrase that the target radio resource pool is a radio resource pool with a default sequential index in the target radio resource pool list comprises: the target radio resource pool is a first radio resource pool in the target radio resource pool list.

In one embodiment, the meaning of the phrase that the target radio resource pool is a radio resource pool with a default sequential index in the target radio resource pool list comprises: the target radio resource pool is a last radio resource pool in the target radio resource pool list.

In one embodiment, the default sequential index is a predefined sequential index.

In one embodiment, the default sequential index is a sequential index configured by a higher-layer signaling.

In one embodiment, a number of radio resource pools comprised in the target radio resource pool list is greater than 1.

In one embodiment, a number of radio resource pools comprised in any of the K radio resource pool lists is greater than 1.

In one embodiment, the K radio resource pool lists are configured by a higher-layer signaling.

In one embodiment, all bits in the first bit block correspond to a first index, all bits in the second bit block correspond to a second index, and the first index is different from the second index.

Embodiment 13

Figure 13:
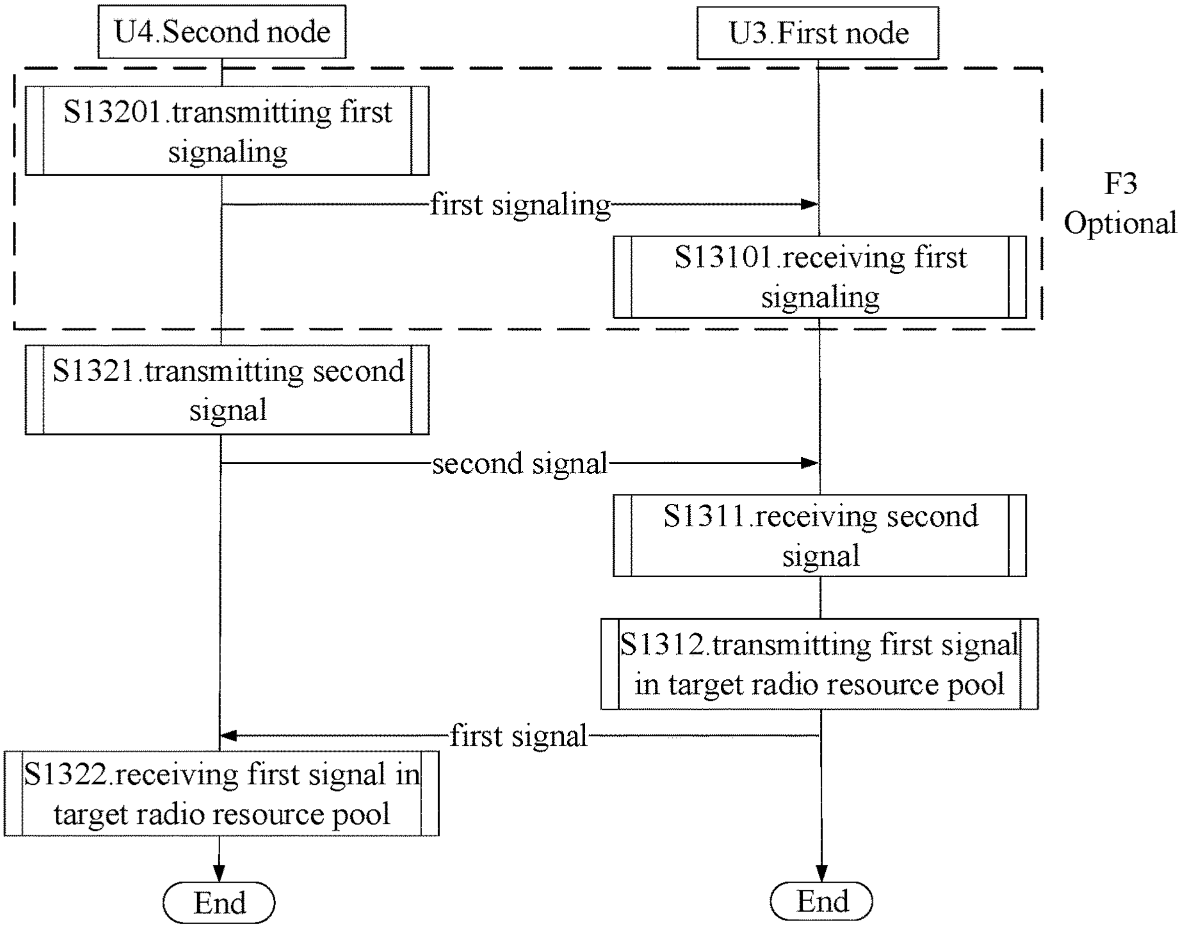
FIG. 13 illustrates a flowchart of signal transmission according to one embodiment of the present application.

Embodiment 13 illustrates a flowchart of signal transmission according to one embodiment in the present application, as shown in FIG. 13. In FIG. 13, a first node U3 and a second node U4 are in communication via an air interface. In FIG. 13, steps in dotted box F3 are optional. And multiple subembodiments in the embodiment 13 can be arbitrarily combined if there is no conflict.

The first node U3 receives a first signaling in step S13101; receives a second signal in step S1311; transmits a first signal in a target radio resource pool in step S1312.

The second node U4 transmits a first signaling in step S13201; transmits a second signal in step S1321; and receives a first signal in a target radio resource pool in step S1322.

In Embodiment 13, the first signal carries a third bit block and a fourth bit block; a first bit block is associated with the second signal; the third bit block is related to the first bit block, and the fourth bit block is related to a second bit block; the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one subembodiment of embodiment 13, the first signaling comprises scheduling information of the second signal.

In one subembodiment of embodiment 13, the first bit block comprises a UCI bit, and the second bit block comprises a UCI bit.

In one subembodiment of embodiment 13, the first bit block comprises a HARQ-ACK information bit.

In one subembodiment of embodiment 13, the second bit block comprises an SR bit.

In one subembodiment of embodiment 13, the first bit block corresponds to the second index.

In one subembodiment of embodiment 13, both the first index and the second index are priority indexes.

In one subembodiment of embodiment 13, a first radio resource pool is reserved for the first bit block, and a second radio resource pool is reserved for the second bit block; the first radio resource pool and the second radio resource pool are overlapped in time domain.

In one embodiment, the first node U3 is the first node in the present application.

In one embodiment, the second node U4 is the second node in the present application.

In one embodiment, the first node U3 is a UE.

In one embodiment, the second node U3 is a base station.

In one embodiment, the second node U4 is a base station.

In one embodiment, the second node U4 is a UE.

In one embodiment, an air interface between the second node U4 and the first node U3 is a Uu interface.

In one embodiment, an air interface between the second node U4 and the first node U3 comprises a cellular link.

In one embodiment, an air interface between the second node U4 and the first node U3 is a PC5 interface.

In one embodiment, an air interface between the second node U4 and the first node U3 comprises a sidelink.

In one embodiment, an air interface between the second node U4 and the first node U3 comprises a radio interface between a base station and a UE.

In one embodiment, an air interface between the second node U4 and the first node U3 comprises a radio interface between UEs.

In one embodiment, steps in dotted box F13 in FIG. 13 exist.

In one embodiment, steps in dotted box F13 in FIG. 13 do not exist.

Embodiment 14

Figure 14:
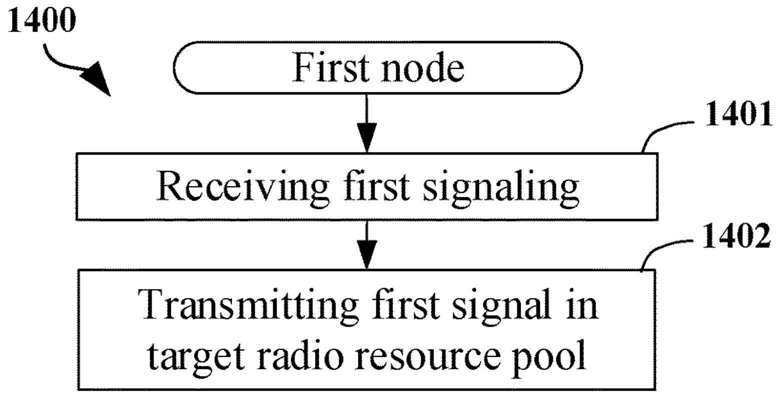
FIG. 14 illustrates a flowchart of the processing of a first node according to one embodiment of the present application.

Embodiment 14 illustrates a processing flowchart of a first node according to one embodiment of the present application, as shown in FIG. 14. And multiple subembodiments in the embodiment 14 can be arbitrarily combined if there is no conflict.

In Embodiment 14, the first node in the present application receives a first signaling in step 1401; transmits a first signal on a target radio resource pool in step 1402.

In embodiment 14, the first signal carries a first bit block and a second bit block; the first signaling is used to determine the target radio resource pool; a number of bit(s) comprised in the second bit block (size of the second bit block) is used to determine a first intermediate number, the first bit block and a first limiting parameter value are used to determine a second intermediate number, a second limiting parameter value is used to determine a third intermediate number, and the third intermediate number is linearly correlated with the second limiting parameter value; a number of resource elements used to transmit the second bit block in the target radio resource pool is not greater than a smallest one among a result of the first intermediate number rounding to an integer, the second intermediate number and a result of the third intermediate number rounding to an integer.

In one subembodiment of embodiment 14, the first signaling comprises one or multiple fields in a DCI.

In one subembodiment of embodiment 14, the first signaling is used to indicate the target radio resource pool.

In one subembodiment of embodiment 14, the target radio resource pool comprises radio resources occupied by a first PUSCH.

In one subembodiment of embodiment 14, the target radio resource pool comprises radio resources occupied by an actual repetition of a transmission of a first PUSCH.

In one subembodiment of embodiment 14, the target radio resource pool is reserved for a first PUSCH.

In one subembodiment of embodiment 14, the target radio resource pool is reserved for an actual repetition of a transmission of a first PUSCH.

In one subembodiment of embodiment 14, the first intermediate number, the second intermediate number and the third intermediate number are used to determine the number of the resource elements used to transmit the second bit block in the target radio resource pool.

In one subembodiment of embodiment 14, the number of the resource elements used to transmit the second bit block in the target radio resource pool is equal to a smallest one among a result of the first intermediate number rounding to an integer, the second intermediate number and a result of the third intermediate number rounding to an integer.

In one subembodiment of embodiment 14, a first actual resource amount is used to determine a fourth intermediate number; the number of the resource elements used to transmit the second bit block in the target radio resource pool is equal to a smallest one among the fourth of a result of the first intermediate number rounding to an integer, the second intermediate number, a result of the third intermediate number rounding to an integer, and the fourth intermediate number.

In one subembodiment of embodiment 14, the first limiting parameter value is configured for a first priority index, and the second limiting parameter value is configured for a second priority index.

In one subembodiment of embodiment 14, the first bit block comprises a HARQ-ACK information bit corresponding to a first priority index.

In one subembodiment of embodiment 14, the second bit block comprises a HARQ-ACK information bit corresponding to a second priority index.

In one subembodiment of embodiment 14, the first signal also carries a TB.

In one subembodiment of embodiment 14, the first priority index and the second priority index are both priority indexes.

In one embodiment, the rounding to integer in the present application refers to: rounding down to an integer.

In one embodiment, the rounding to integer in the present application refers to: rounding up to an integer.

In one embodiment, the first signaling is a DCI.

In one embodiment, the first signaling is a physical-layer signaling.

In one embodiment, the first signaling is a higher-layer signaling.

In one embodiment, the first signaling is an UpLink Grant Signalling.

In one embodiment, the first signaling explicitly indicates the target radio resource pool.

In one embodiment, the first signaling implicitly indicates the target radio resource pool.

In one embodiment, the first signaling indicates frequency-domain resources occupied by the target radio resource pool.

In one embodiment, the first signaling indicates time-domain resources occupied by the target radio resource pool.

In one embodiment, outputs after the first bit block and the second bit block are respectively channel coded are mapped into the target radio resource pool.

In one embodiment, outputs after the first bit block and the second bit block are respectively input into a same channel coding are mapped into the target radio resource pool.

In one embodiment, the meaning of the phrase that the first intermediate number, the second intermediate number and the third intermediate number are used to determine the number of the RE(s) used to transmit the second bit block comprises: the number of the resource elements used to transmit the second bit block in the target radio resource pool is equal to a smallest one among a result of the first intermediate number rounding to an integer, the second intermediate number and a result of the third intermediate number rounding to an integer.

In one embodiment, the meaning of the phrase that the first intermediate number, the second intermediate number and the third intermediate number are used to determine the number of the RE(s) used to transmit the second bit block comprises: a first actual resource amount is used to determine a fourth intermediate number, the number of the resource elements used to transmit the second bit block in the target radio resource pool is equal to a smallest one among the fourth of a result of the first intermediate number rounding to an integer, the second intermediate number, a result of the third intermediate number rounding to an integer, and the fourth intermediate number.

In one embodiment, the RE in the present application is a resource element (RE).

In one embodiment, the RE in the present application comprises a subcarrier in frequency domain.

In one embodiment, the RE in the present application comprises a multicarrier symbol in time domain.

In one embodiment, the first bit block comprises a UCI bit.

In one embodiment, the first bit block comprises a HARQ-ACK information bit.

In one embodiment, the first bit block does not comprise any CRC bit.

In one embodiment, the first bit block comprises a Cyclic Redundancy Check (CRC) bit.

In one embodiment, the second bit block comprises a UCI bit.

In one embodiment, the second bit block comprises a HARQ-ACK information bit.

In one embodiment, the second bit block does not comprise any CRC bit.

In one embodiment, the second bit block comprise a CRC bit.

In one embodiment, all HARQ-ACK information bits comprised in the first bit block correspond to a first priority index.

In one embodiment, all HARQ-ACK information bits comprised in the second bit block correspond to a second priority index.

In one embodiment, all UCI bits comprised in the first bit block correspond to a first priority index.

In one embodiment, all UCI bits comprised in the second bit block correspond to a second priority index.

In one embodiment, the first PUSCH is a PUSCH.

In one embodiment, in the present application, a HARQ-ACK information bit corresponding to a priority index refers to: the HARQ-ACK information bit is a HARQ-ACK information bit for one of indicating a PDSCH reception scheduled by a DCI of the priority index, or being indicated by a higher-layer signaling an SPS reception corresponding to an SPS configuration of the priority index, or being indicated by a higher-layer signaling an SPS PDSCH release corresponding to an SPS configuration of the priority index.

In one embodiment, in the present application, an SR bit corresponding to a priority index refers to: the SR bit is an SR bit triggered by an SR-related configuration indicated by a higher-layer signaling the priority index.

In one embodiment, bit(s) used for CSI reporting in the present application is(are) pre-defined or configured by a higher-layer signaling to correspond to the second priority index.

In one embodiment, the phrase of the first signal carrying a first bit block and a second bit block comprises: the first signal comprises an output after all or partial bits in the first bit block are sequentially through part or all of CRC Insertion, Segmentation, code-block level CRC Insertion, Channel Coding, Rate Matching, Concatenation, Scrambling, Modulation, Layer Mapping, Precoding, Mapping to Resource Element, multicarrier symbol Generation, and Modulation and Upconversion, and the first signal comprises an output after all or partial bits in the second bit block are sequentially through part or all of CRC Insertion, Segmentation, code-block level CRC Insertion, Channel Coding, Rate Matching, Concatenation, Scrambling, Modulation, Layer Mapping, Precoding, Mapping to Resource Element, multicarrier symbol Generation, and Modulation and Upconversion.

In one embodiment, the phrase of the first signal carrying a first bit block and a second bit block comprises: the first signal comprises an output after all or partial bits in the first bit block and the second bit block are sequentially through part or all of CRC Insertion, Segmentation, code-block level CRC Insertion, Channel Coding, Rate Matching, Concatenation, Scrambling, Modulation, Layer Mapping, Precoding, Mapping to Resource Element, multicarrier symbol Generation, and Modulation and Upconversion.

In one embodiment, the first signaling indicates a first priority index.

In one embodiment, the first signaling indicates a second priority index.

In one embodiment, the first priority index in the present application is priority index 0, and the second priority index in the present application is priority index 1.

In one embodiment, the first priority index in the present application is priority index 1, and the second priority index in the present application is priority index 0.

In one embodiment, the first priority index and the second priority index in the present application respectively indicate different priorities.

In one embodiment, the first priority index and the second priority index in the present application respectively indicate different Quality of Services (QoSs).

In one embodiment, the first priority index and the second priority index in the present application respectively indicate different service types.

In one embodiment, the number of the RE(s) used to transmit the second bit block in the target radio resource pool refers to: a number of RE(s) of coded modulation symbol(s) used to transmit the second bit block in the target radio resource pool.

In one embodiment, the number of the RE(s) used to transmit the second bit block in the target radio resource pool refers to: a number of RE(s) of a modulation symbol generated to carry the second bit block in the target radio resource pool.

In one embodiment, the meaning of the phrase that a number of bit(s) comprised in the second bit block (size of the second bit block) is used to determine a first intermediate number comprises: the first intermediate number is linearly correlated with the number of bit(s) comprised in the second bit block (size of the second bit block).

In one embodiment, the meaning of the phrase that a number of bit(s) comprised in the second bit block (size of the second bit block) is used to determine a first intermediate number comprises: the first intermediate number is equal to a number of bit(s) comprised in the second bit block (size of the second bit block) multiplied by a first compensation value multiplied by a first resource amount divided by a first load amount.

In one embodiment, the meaning of the phrase that a number of bit(s) comprised in the second bit block (size of the second bit block) is used to determine a first intermediate number comprises: the first intermediate number is equal to the number of bit(s) comprised in the second bit block multiplied by a first compensation value divided by the first code rate divided by a first modulation order.

In one embodiment, the meaning of the phrase that a number of bit(s) comprised in the second bit block (size of the second bit block) is used to determine a first intermediate number comprises: the first intermediate number is equal to a sum of the number of bit(s) comprised in the second bit block and a number of corresponding CRC bit(s) multiplied by a first compensation value multiplied by a first resource amount divided by a first load amount.

In one embodiment, the meaning of the phrase that a number of bit(s) comprised in the second bit block (size of the second bit block) is used to determine a first intermediate number comprises: the first intermediate number is equal to a sum of the number of bit(s) comprised in the second bit block and a number of corresponding CRC bit(s) multiplied by a first compensation value divided by a first code rate divided by a first modulation order.

In one embodiment, the compensation value in the present application is a $$\beta_{offset}^{HARQ-ACK}$$

value.

In one embodiment, the compensation value in the present application is a beta-offset value.

In one embodiment, characters used to represent the compensation value in the application comprise β.

In one embodiment, characters used to represent the compensation value in the present application comprise at least one of HARQ or ACK.

In one embodiment, characters used to represent the compensation value in the present application comprise offset.

In one embodiment, the first signaling indicates the first compensation value in the present application.

In one embodiment, a beta offset indicator field in the first signaling indicates the first compensation value in the present application.

In one embodiment, the first compensation value in the present application is configured by a higher-layer signaling.

In one embodiment, the first compensation value in the present application is one of multiple compensation values configured for a first priority index.

In one embodiment, the first resource amount in the present application is equal to a number of a positive integer number of RE(s).

In one embodiment, the first resource amount in the present application is equal to a number of RE(s) that can be used for UCI transmission on one or multiple multicarrier symbols.

In one embodiment, the first load amount in the present application is equal to a payload size of uplink data.

In one embodiment, the target radio resource pool comprises radio resources occupied by a first PUSCH.

In one embodiment, the target radio resource pool comprises radio resources occupied by an actual repetition of a transmission of a first PUSCH.

In one embodiment, the target radio resource pool is reserved for a first PUSCH.

In one embodiment, the target radio resource pool is reserved for an actual repetition of a first PUSCH.

In one embodiment, the first resource amount in the present application is equal to a number of RE(s) that can be used for UCI transmission on one or multiple multicarrier symbols in a transmission of the first PUSCH in the present application.

In one embodiment, the first resource amount in the present application is equal to a number of RE(s) that can be used for UCI transmission on one or multiple multicarrier symbols in a nominal repetition of a transmission of the first PUSCH in the present application.

In one embodiment, the first payload amount in the present application is equal to a total number of code block sizes of a UL-SCH transmitted on the first PUSCH.

In one embodiment, the first code rate in the present application is a code rate of the first PUSCH.

In one embodiment, the first modulation order in the present application is a modulation order of the first PUSCH.

In one embodiment, the first signaling indicates the first code-rate in the present application.

In one embodiment, the first signaling indicates the first modulation order in the present application.

In one embodiment, the meaning of the phrase that the first bit block and a first limiting parameter value are used to determine a second intermediate number comprises: the second intermediate number is equal to a result of rounding a product of the first limiting parameter value and a second resource amount minus a fifth intermediate amount, and the fifth intermediate number is related to the first bit block.

In one embodiment, the first limiting parameter value in the present application is configured by a higher-layer signaling.

In one embodiment, the first limiting parameter value in the present application is configured by a higher-layer parameter scaling.

In one embodiment, the first limiting parameter value in the present application is configured by a higher-layer parameter scaling for a first priority index.

In one embodiment, the second resource number in the present application is equal to a number of a positive integer number of RE(s).

In one embodiment, the second resource amount in the present application is equal to a number of RE(s) that can be used for UCI transmission on one or multiple multicarrier symbols.

In one embodiment, the second resource amount in the present application is equal to a number of RE(s) that can be used for UCI transmission on one or multiple multicarrier symbols in a transmission of the first PUSCH in the present application.

In one embodiment, the second resource amount in the present application is equal to a number of RE(s) that can be used for UCI transmission on one or multiple multicarrier symbols in a nominal repetition of a transmission of the first PUSCH in the present application.

In one embodiment, the second resource amount in the present application is the first resource amount in the present application.

In one embodiment, the second resource amount in the present application is not the first resource amount in the present application.

In one embodiment, the second resource amount in the present application is not greater than the first resource amount in the present application.

In one embodiment, the second resource amount in the present application is less than the first resource amount in the present application.

In one embodiment, the first node in the present application executes calculation to determine the fifth intermediate number in the present application.

In one embodiment, the second node in the present application executes calculation to determine the fifth intermediate number in the present application.

In one embodiment, the fifth intermediate number in the present application is equal to a number of RE(s) used to transmit the first bit block in the target radio resource pool.

In one embodiment, the fifth intermediate number in the present application is equal to a number of coded modulation symbol(s) per layer transmitted for the first bit block in the target radio resource pool.

In one embodiment, the fifth intermediate number in the present application is equal to a number of RE(s) used to transmit the first bit block in the target radio resource pool determined by the calculation executed by the first node in the present application.

In one embodiment, the fifth intermediate number in the present application is equal to a number of coded modulation symbols per layer for a transmission of the first bit block in the target radio resource pool determined by the calculation executed by the first node in the present application.

In one embodiment, for a node in the present application (that is, the first node in the present application or the second node in the present application), the fifth intermediate number in the present application is equal to a number of RE(s) used to transmit the first bit block in the target radio resource pool determined by the calculation executed by the node in the present application.

In one embodiment, for a node in the present application (that is, the first node in the present application or the second node in the present application), the fifth intermediate number in the present application is equal to a number of coded modulation symbols per layer for a transmission of the first bit block in the target radio resource pool determined by the calculation executed by the node in the present application.

In one embodiment, for determination method of the fifth intermediate number in the present application, refer to the description related to HARQ-ACK transmission corresponding to a first priority index in a sub-section of section 6.3.2.4.1 in 3GPP TS38.212.

In one embodiment, the fifth intermediate number in the present application is used as an input to execute the calculation of the number of the RE(s) used to transmit the second bit block in the target radio resource pool claimed by the present application.

In one embodiment, the meaning of the phrase that a second limit parameter value is used to determine a third intermediate number, and the third intermediate number is linearly correlated with the second limit parameter value comprises: the third intermediate number is equal to a product of the second limit parameter value and a third resource amount.

In one embodiment, the second limit parameter value in the present application is configured by a higher-layer signaling.

In one embodiment, the second limit parameter value in the present application is configured by a higher-layer parameter scaling.

In one embodiment, the second limit parameter value in the present application is configured by a higher-layer parameter scaling for a second priority index.

In one embodiment, the third resource amount in the present application is equal to a number of a positive integer number of RE(s).

In one embodiment, the third resource amount in the present application is equal to a number of RE(s) that can be used for UCI transmission on one or multiple multicarrier symbols.

In one embodiment, the third resource amount in the present application is equal to a number of RE(s) that can be used for UCI transmission on one or multiple multicarrier symbols in a transmission of the first PUSCH in the present application.

In one embodiment, the third resource amount in the present application is equal to a number of RE(s) that can be used for UCI transmission on one or multiple multicarrier symbols in a nominal repetition of a transmission of the first PUSCH in the present application.

In one embodiment, the third resource amount in the present application is the second resource amount in the present application.

In one embodiment, the third resource amount in the present application is not the second resource amount in the present application.

In one embodiment, the third resource amount in the present application is the first resource amount in the present application.

In one embodiment, the third resource amount in the present application is not the first resource amount in the present application.

In one embodiment, the third resource amount in the present application is not greater than the first resource amount in the present application.

In one embodiment, the third resource amount in the present application is less than the first resource amount in the present application.

In one embodiment, the meaning of the phrase that a first actual resource amount is used to determine a fourth intermediate number comprises: the fourth intermediate number is the first actual resource number.

In one embodiment, the meaning of the phrase that a first actual resource amount is used to determine a fourth intermediate number comprises: the fourth intermediate number is equal to the first actual resource number minus the fifth intermediate number in the present application.

In one embodiment, the meaning of the phrase that a first actual resource amount is used to determine a fourth intermediate number comprises: the fourth intermediate number is equal to the first actual resource number minus a fifth intermediate number, and the fifth intermediate number is related to the first bit block.

In one embodiment, the first actual resource amount in the present application is equal to a number of a positive integer number of RE(s).

In one embodiment, the first actual resource amount in the present application is equal to a number of RE(s) that can be used for UCI transmission on one or multiple multicarrier symbols.

In one embodiment, the first actual resource amount in the present application is equal to a number of RE(s) that can be used for UCI transmission on one or multiple multicarrier symbols in a nominal actual repetition of a transmission of the first PUSCH in the present application.

In one embodiment, the first actual resource amount in the present application is not greater than the first resource amount in the present application.

In one embodiment, the first actual resource amount in the present application is not greater than the second resource amount in the present application.

In one embodiment, the first actual resource amount in the present application is not greater than the third resource amount in the present application.

Embodiment 15

Figure 15:
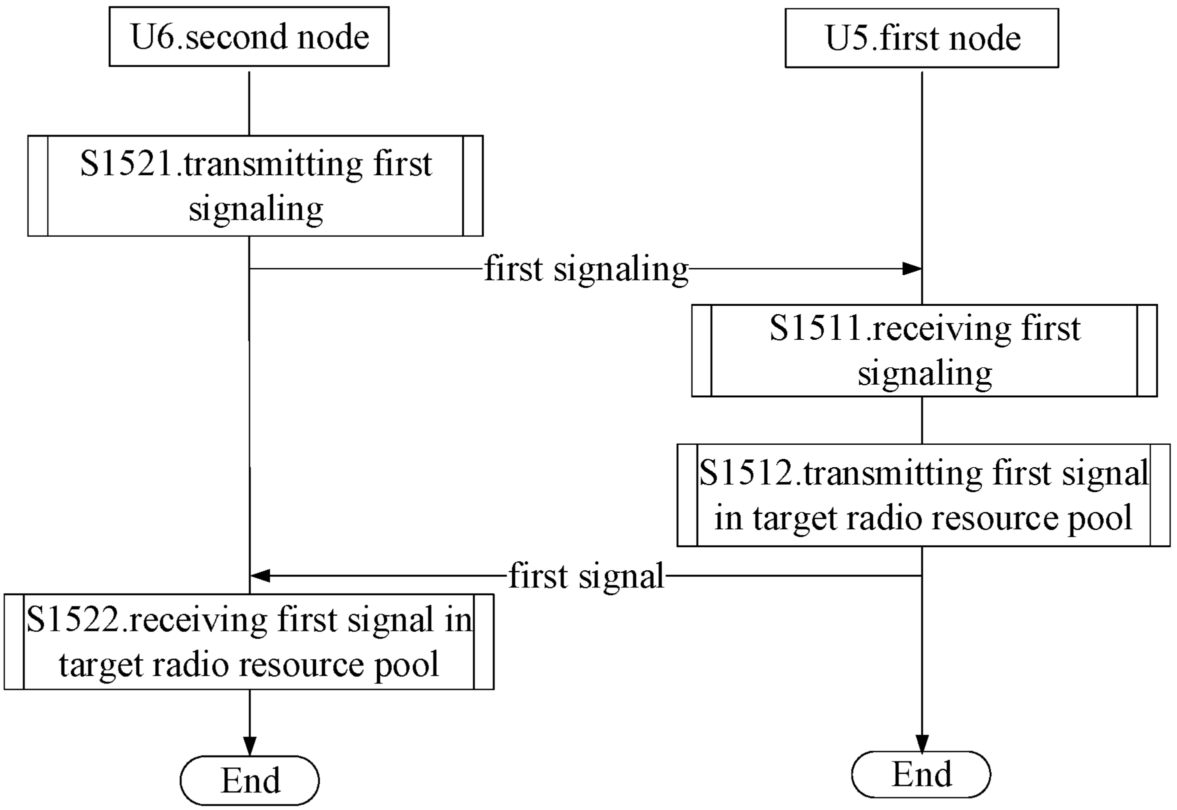
FIG. 15 illustrates a flowchart of signal transmission according to one embodiment of the present application.

Embodiment 15 illustrates a flowchart of signal transmission according to one embodiment in the present application, as shown in FIG. 15. In FIG. 15, a first node U5 and a second node U6 are in communications via an air interface. And multiple subembodiments in the embodiment 15 can be arbitrarily combined if there is no conflict.

The first node U5 receives a first signaling in step S1511; transmits a first signal in a target radio resource pool in step S1512.

The second node U6 transmits a first signaling in step S1521; receives a first signal in a target radio resource pool in step S1522.

In embodiment 15, the first signal carries a first bit block and a second bit block; the first signaling is used to determine the target radio resource pool; a number of bit(s) comprised in the second bit block (size of the second bit block) is used to determine a first intermediate number, the first bit block and a first limiting parameter value are used to determine a second intermediate number, a second limiting parameter value is used to determine a third intermediate number, and the third intermediate number is linearly correlated with the second limiting parameter value; a number of resource elements used to transmit the second bit block in the target radio resource pool is not greater than a smallest one among a result of the first intermediate number rounding to an integer, the second intermediate number and a result of the third intermediate number rounding to an integer; the first bit block comprises a HARQ-ACK information bit corresponding to a first priority index, the second bit block comprises a HARQ-ACK information bit corresponding to a second priority index, and both the first priority index and the second priority index are priority indexes.

In one subembodiment of embodiment 15, the target radio resource pool is reserved for a first PUSCH.

In one subembodiment of embodiment 15, the target radio resource pool is reserved for an actual repetition of a transmission of a first PUSCH.

In one subembodiment of embodiment 15, the first intermediate number, the second intermediate number and the third intermediate number are used to determine the number of the RE(s) used to transmit the second bit block in the target radio resource pool.

In one subembodiment of embodiment 15, the number of the RE(s) used to transmit the second bit block in the target radio resource pool is equal to a smallest one among a result of the first intermediate number rounding to an integer, the second intermediate number and a result of the third intermediate number rounding to an integer.

In one subembodiment of embodiment 15, a first actual resource amount is used to determine a fourth intermediate number; the number of the resource elements used to transmit the second bit block in the target radio resource pool is equal to a smallest one among the fourth of a result of the first intermediate number rounding to an integer, the second intermediate number, a result of the third intermediate number rounding to an integer, and the fourth intermediate number.

In one subembodiment of embodiment 15, the first limiting parameter value is configured for a first priority index, and the second limiting parameter value is configured for a second priority index.

In one subembodiment of embodiment 15, the first signal also carries a TB.

In one embodiment, the first node U5 is the first node in the present application.

In one embodiment, the second node U6 is the second node in the present application.

In one embodiment, the first node U5 is a UE.

In one embodiment, the second node U5 is a base station.

In one embodiment, the second node U6 is a base station.

In one embodiment, the second node U6 is a UE.

In one embodiment, an air interface between the second node U6 and the first node U5 is a Uu interface.

In one embodiment, an air interface between the second node U6 and the first node U5 comprises a cellular link.

In one embodiment, an air interface between the second node U6 and the first node U5 is a PC5 interface.

In one embodiment, an air interface between the second node U6 and the first node U5 comprises a sidelink.

In one embodiment, an air interface between the second node U6 and the first node U5 comprises a radio interface between a base station and a UE.

In one embodiment, an air interface between the second node U6 and the first node U5 comprises a radio interface between UEs.

Embodiment 16

Figure 16:
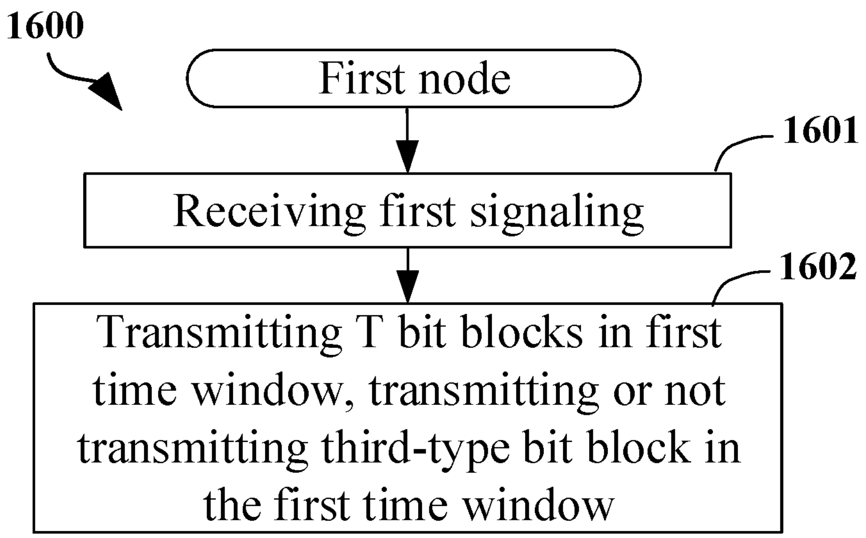
FIG. 16 illustrates a flowchart of the processing of a first node according to one embodiment of the present application.

Embodiment 16 illustrates a processing flowchart of a first node according to one embodiment of the present application, as shown in FIG. 16. And multiple subembodiments in the embodiment 16 can be arbitrarily combined if there is no conflict.

In Embodiment 16, the first node in the present application receives a first signaling in step 1601; in step 1602: transmits T bit blocks in a first time window, and transmits or not transmits a third-type bit block in the first time window.

In embodiment 16, T is a positive integer greater than 1; herein, a first bit block is associated with the first signaling, and the first bit block does not belong to the T bit blocks; any of the T bit blocks is a first-type bit block or a second-type bit block, the first-type bit block is a bit block comprising a HARQ-ACK information bit, and the second-type bit block is a bit block different from the first-type bit block and having a same priority as the first-type bit block; whether a third bit block is transmitted in the first time window is related to a number of the first-type bit block(s) in the T bit blocks, the third-type bit block is a bit block associated with the first bit block.

In one subembodiment of embodiment 16, the T bit blocks are respectively transmitted in different T time sub-windows in the first time window.

In one subembodiment of embodiment 16, the first time window is a slot.

In one subembodiment of embodiment 16, time-domain resources occupied by transmissions of any two of the T bit blocks are not overlapping.

In one subembodiment of embodiment 16, when a number of the first-type bit block(s) in the T bit blocks is greater than a first value, the third-type bit block is transmitted in the first time window; when a number of the first-type bit block(s) in the T bit blocks is not greater than a first value, the third-type bit block is not transmitted in the first time window.

In one subembodiment of embodiment 16, when a number of the first-type bit block(s) in the T bit blocks is not greater than a first value, the third-type bit block is transmitted in the first time window; when a number of the first-type bit block(s) in the T bit blocks is greater than a first value, the third-type bit block is not transmitted in the first time window.

In one subembodiment of embodiment 16, when a number of the first-type bit block(s) in the T bit blocks is less than a first value, the third-type bit block is transmitted in the first time window; when a number of the first-type bit block(s) in the T bit blocks is not less than a first value, the third-type bit block is not transmitted in the first time window.

In one subembodiment of embodiment 16, when a number of the first-type bit block(s) in the T bit blocks is less than a first value, the third-type bit block is transmitted in the first time window; when a number of the first-type bit block(s) in the T bit blocks is less than a first value, the third-type bit block is not transmitted in the first time window.

In one subembodiment of embodiment 16, when a first difference value is greater than a first value, the third-type bit block is transmitted in the first time window; when a first difference value is not greater than a first value, the third-type bit block is not transmitted in the first time window; the first difference value is equal to T minus a number of the first-type bit block(s) in the T bit blocks.

In one subembodiment of embodiment 16, when a first difference value is not greater than a first value, the third-type bit block is transmitted in the first time window; when a first difference value is greater than a first value, the third-type bit block is not transmitted in the first time window; the first difference value is equal to T minus a number of the first-type bit block(s) in the T bit blocks.

In one subembodiment of embodiment 16, when a first difference value is not less than a first value, the third-type bit block is transmitted in the first time window; when a first difference value is less than a first value, the third-type bit block is not transmitted in the first time window; the first difference value is equal to T minus a number of the first-type bit block(s) in the T bit blocks.

In one subembodiment of embodiment 16, when a first difference value is less than a first value, the third-type bit block is transmitted in the first time window; when a first difference value is not less than a first value, the third-type bit block is not transmitted in the first time window; the first difference value is equal to T minus a number of the first-type bit block(s) in the T bit blocks.

In one subembodiment of embodiment 16, when the third-type bit block is transmitted in the first time window, the third-type bit block and the first-type bit block in the T bit blocks are transmitted in a same radio resource pool.

In one subembodiment of embodiment 16, when the third-type bit block is transmitted in the first time window and a number of the first-type bit blocks in the T bit blocks is greater than 1, the third-type bit block and the first-type bit block with an earliest start time in the T bit blocks are transmitted in a same radio resource pool.

In one subembodiment of embodiment 16, the T bit blocks are respectively transmitted on T PUCCHs.

In one embodiment, whether the third-type bit block is transmitted in the first time window is related to a size relation between a number of the first-type bit block(s) in the T bit blocks and a first value.

In one embodiment, whether the third-type bit block is transmitted in the first time window is related to a size relation between a first difference value and a first value, and the first difference value is equal to T minus a number of the first-type bit block(s) in the T bit blocks.

In one embodiment, the first value in the application is a non-negative integer.

In one embodiment, the number of the first-type bit block(s) in the T bit blocks is a non-negative integer.

In one embodiment, the number of the first-type bit block(s) in the T bit blocks is not greater than T.

In one embodiment, when one bit block in the T bit block is the first-type bit block, the bit block in the T bit blocks is not the second-type bit block.

In one embodiment, when one bit block in the T bit block is the second-type bit block, the bit block in the T bit blocks is not the first-type bit block.

In one embodiment, in the present application, the meaning of transmitting a bit block comprises: transmitting a signal carrying the bit block.

In one embodiment, the first signaling is a DCI.

In one embodiment, the first signaling comprises one or multiple fields in a DCI.

In one embodiment, the first signaling is a higher-layer signaling.

In one embodiment, the first signaling comprises one or multiple fields in a higher-layer signaling.

In one embodiment, any of the T bit blocks comprises at least one bit.

In one embodiment, any of the T bit blocks comprises at least one UCI bit.

In one embodiment, the first bit block comprises at least one bit.

In one embodiment, the first bit block comprises at least one UCI bit.

In one embodiment, the first bit block comprises at least one HARQ-ACK information bit.

In one embodiment, the first bit block comprises at least three HARQ-ACK information bits.

In one embodiment, the first bit block comprises at least one SR bit.

In one embodiment, one of the T bit blocks comprises at least one bit.

In one embodiment, one of the T bit blocks comprises at least one UCI bit.

In one embodiment, the meaning of the phrase that a first bit block is associated with the first signaling comprises: the first bit block comprises a HARQ-ACK information bit for a PDSCH reception scheduled by the first signaling.

In one embodiment, the meaning of the phrase that a first bit block is associated with the first signaling comprises: the first signaling is used to trigger the first bit block or a transmission of a bit block generated by the first bit block.

In one embodiment, the meaning of the phrase that a first bit block is associated with the first signaling comprises: the first signaling is used to indicate a radio resource pool reserved for the first bit block.

In one embodiment, the third-type bit block comprises at least one bit.

In one embodiment, the third-type bit block comprises at least one UCI bit.

In one embodiment, the first-type bit block is a bit block comprising HARQ-ACK information bit(s) for PDSCH reception(s) scheduled by DCI(s).

In one embodiment, T1 bit block(s) in the T bit blocks is(are) the first-type bit block, and T2 bit block(s) in the T bit blocks is(are) the second-type bit block; where T and T1 and T2 are non-negative integers, T is equal to T1 plus T2, T being greater than 1.

In one embodiment, the second-type bit block is a bit block comprising an SR bit.

In one embodiment, the second-type bit block is a bit block not comprising a HARQ-ACK information bit.

In one embodiment, T is equal to 2.

In one embodiment, T is equal to one of 2 to 16.

In one embodiment, T is greater than 2 and not greater than 1024.

In one embodiment, the first time window comprises multiple time sub-windows.

In one embodiment, different time sub-windows in the first time window are not overlapping in time domain.

In one embodiment, the first time window comprises a slot.

In one embodiment, the first time window comprises multiple sub-slots.

In one embodiment, the first time window comprises multiple multicarrier symbols.

In one embodiment, the time sub-window in the present application comprises a sub-slot.

In one embodiment, the time sub-window in the present application is a sub-slot.

In one embodiment, the time sub-window in the present application comprises at least one multicarrier symbol.

In one embodiment, numbers of time-domain resources occupied by any two time sub-windows in the first time window are the same.

In one embodiment, in the first time window, there exists numbers of time-domain resources occupied by two time sub-windows being different.

In one embodiment, a total number of time sub-windows comprised in the first time window is equal to T.

In one embodiment, a total number of time sub-windows comprised in the first time window is greater than T.

In one embodiment, when the third-type bit block is transmitted in the first time window, the third-type bit block and the first-type bit block in the T bit blocks are transmitted in the same time sub-window in the present application.

In one embodiment, when the third-type bit block is transmitted in the first time window and a number of the first-type bit blocks in the T bit blocks is greater than 1, the third-type bit block and the first-type bit block with an earliest start time in the T bit blocks are transmitted in the same time sub-window in the present application.

In one embodiment, all time-domain resources occupied by a radio resource pool used to transmit any bit block in the T bit blocks belong to the same time sub-window in the present application.

In one embodiment, when the third-type bit block is received in the first time window, the third-type bit block and the first-type bit block in the T bit blocks are received in the same time sub-window in the present application.

In one embodiment, when the third-type bit block is received in the first time window and a number of the first-type bit blocks in the T bit blocks is greater than 1, the third-type bit block and the first-type bit block with an earliest start time in the T bit blocks are received in the same time sub-window in the present application.

In one embodiment, all time-domain resources occupied by a radio resource pool used to transmit any bit block in the T bit blocks belong to the same time sub-window in the present application.

In one embodiment, when the third-type bit block is transmitted in the first time window, the third-type bit block and the second-type bit block in the T bit blocks are transmitted in a same radio resource pool.

In one embodiment, when the third-type bit block is transmitted in the first time window and a number of the second-type bit blocks in the T bit blocks is greater than 1, the third-type bit block and the second-type bit block with an earliest start time in the T bit blocks are transmitted in a same radio resource pool.

In one embodiment, when the third-type bit block is transmitted in the first time window, the third-type bit block and the second-type bit block in the T bit blocks are transmitted in the same time sub-window in the present application.

In one embodiment, when the third-type bit block is transmitted in the first time window and a number of the second-type bit blocks in the T bit blocks is greater than 1, the third-type bit block and the second-type bit block with an earliest start time in the T bit blocks are transmitted in the same time sub-window in the present application.

In one embodiment, when the third-type bit block is received in the first time window, the third-type bit block and the second-type bit block in the T bit blocks are received in the same time sub-window in the present application.

In one embodiment, when the third-type bit block is received in the first time window and a number of the second-type bit blocks in the T bit blocks is greater than 1, the third-type bit block and the second-type bit block with an earliest start time in the T bit blocks are received in the same time sub-window in the present application.

In one embodiment, for the T bit blocks and the first bit block, timeline condition(s) required to execute UCI multiplexing is(are) satisfied.

In one embodiment, T radio resource pools are respectively reserved for the T bit blocks; a first radio resource pool is reserved for the first bit block, and the first radio resource overlap with each of the T radio resource pools in time domain.

In one embodiment, a first radio resource pool is reserved for the first bit block, and the first radio resource pool comprises a PUCCH resource; a PUCCH format adopted by the PUCCH resource comprised in the first resource pool is PUCCH format 2.

In one embodiment, a first radio resource pool is reserved for the first bit block, and the first radio resource pool comprises a PUCCH resource; a PUCCH format adopted by the PUCCH resource comprised in the first resource pool is PUCCH format 3.

In one embodiment, a first radio resource pool is reserved for the first bit block, and the first radio resource pool comprises a PUCCH resource; a PUCCH format adopted by the PUCCH resource comprised in the first resource pool is PUCCH format 4.

In one embodiment, a first radio resource pool is reserved for the first bit block, and the first radio resource pool comprises a PUCCH resource; a PUCCH format adopted by the PUCCH resource comprised in the first resource pool is one of PUCCH format 2, PUCCH format 3 or PUCCH format 4.

In one embodiment, a first radio resource pool is reserved for the first bit block, and the first radio resource pool comprises a PUCCH resource; a PUCCH format adopted by the PUCCH resource comprised in the first resource pool is one of PUCCH format 3 or PUCCH format 4.

In one embodiment, the first signaling is used to indicate the first radio resource pool.

In one embodiment, the first signaling is used to indicate time-domain resources occupied by the first radio resource pool.

In one embodiment, the first signaling is used to indicate frequency-domain resources occupied by the first radio resource pool.

In one embodiment, the first signaling is used to indicate an index of the first radio resource pool in a radio resource pool set.

In one embodiment, all bit blocks in the T bit blocks correspond to a first priority index, the first bit block corresponds to a second priority index, and the second priority index is different from the first priority index.

In one embodiment, at least one DCI or a higher-layer signaling is used to indicate that a priority index corresponding to a bit block in the T bit blocks is the first priority index.

In one embodiment, at least one DCI or a higher-layer signaling is used to indicate that a priority index corresponding to the first bit block is the second priority index.

In one embodiment, the priority index in the present application is a physical-layer priority index.

In one embodiment, the priority index in the present application is a higher-layer priority index.

In one embodiment, the first priority index in the present application is priority index 0, and the second priority index in the present application is priority index 1.

In one embodiment, the first priority index in the present application is priority index 1, and the second priority index in the present application is priority index 0.

In one embodiment, the first priority index and the second priority index in the present application respectively indicate different priorities.

In one embodiment, the first priority index and the second priority index in the present application respectively indicate different Quality of Services (QoSs).

In one embodiment, for the first-type bit block in the T bit blocks, the comprised HARQ-ACK information bit is HARQ-ACK information bit(s) for PDSCH reception(s) scheduled by DCI(s) indicating the first priority index.

In one embodiment, for the first-type bit block in the T bit blocks, the comprised HARQ-ACK information is a HARQ-ACK information bit of an SPS PDSCH reception or an SPS PDSCH release corresponding to an SPS configuration of the first priority index indicated by a higher-layer signaling.

In one embodiment, for the second-type bit block in the T bit blocks, the comprised SR bit is an SR bit configured by a higher-layer signaling with the first priority index.

In one embodiment, for the first bit block, the comprised HARQ-ACK information bit is HARQ-ACK information bit(s) for PDSCH reception(s) scheduled by DCI(s) indicating the second priority index.

In one embodiment, for the first bit block, the comprised HARQ-ACK information bit is a HARQ-ACK information bit of an SPS PDSCH reception or an SPS PDSCH release corresponding to an SPS configuration of the second priority index indicated by a higher-layer signaling.

In one embodiment, for the first bit block, the comprised SR bit is an SR bit configured by a higher-layer signaling with the second priority index.

In one embodiment, the higher-layer signaling in the present application comprises an RRC signaling.

In one embodiment, the higher-layer signaling in the present application comprises a MAC CE signaling.

In one embodiment, the higher-layer signaling in the present application comprises a core-network signaling.

In one embodiment, a priority index corresponding to the third-type bit block is a priority index corresponding to the first bit block.

In one embodiment, the second-type bit block is a bit block comprising an SR bit.

In one embodiment, the second-type bit block is a bit block comprising a bit indicating a positive SR.

In one embodiment, the second-type bit block is a bit block not comprising a HARQ-ACK information bit.

In one embodiment, the second-type bit block is a bit block comprising a Scheduling Request (SR) bit and not comprising a HARQ-ACK information bit.

In one embodiment, the second-type bit block is a bit block comprising a bit indicating a positive SR and not comprising a HARQ-ACK information bit.

In one embodiment, the first value is equal to 0.

In one embodiment, the first value is equal to 1.

In one embodiment, the first value is equal to T.

In one embodiment, the first value is not greater than T.

In one embodiment, the first value is a pre-defined positive integer.

In one embodiment, the first value is a positive integer configured by a higher-layer signaling.

In one embodiment, the third bit block is: the first bit block, or, a bit block generated by the first bit block.

In one embodiment, the phrase that the third-type bit block is transmitted in the first time window refers to: the first bit block is transmitted in the first time window.

In one embodiment, the phrase that the third-type bit block is transmitted in the first time window refers to: a bit block generated by the first bit block is transmitted in the first time window.

In one embodiment, the phrase that the third-type bit block is transmitted in the first time window refers to: a bit block generated by the first bit block and the first bit block are transmitted in the first time window.

In one embodiment, the meaning of the phrase that the third-type bit block is not transmitted in the first time window comprises: any the third-type bit block is not transmitted in the first time window.

In one embodiment, the meaning of the phrase that the third-type bit block is not transmitted in the first time window comprises: the first bit block and any bit block generated by the first bit block are not transmitted in the first time window.

In one embodiment, the meaning of the phrase that the third-type bit block is not transmitted in the first time window comprises: the first node drops transmitting the first bit block and any bit block generated by the first bit block in the first time window.

In one embodiment, the meaning of the phrase that the third-type bit block is not transmitted in the first time window comprises: the first node drops transmitting the first bit block and any bit block generated by the first bit block.

In one embodiment, the meaning of the phrase that the third-type bit block is not transmitted in the first time window comprises: the first node drops transmitting the first bit block in the first time window.

In one embodiment, the meaning of the phrase that the third-type bit block is not transmitted in the first time window comprises: the first node drops transmitting the first bit block.

In one embodiment, the third-type bit block in the present application being transmitted in a time window (or a time sub-window) refers to: the third-type bit block is transmitted by the first node in the time window (or the time sub-window).

In one embodiment, the third-type bit block in the present application not being transmitted in a time window (or a time sub-window) refers to: the third-type bit block is not transmitted by the first node in the time window (or the time sub-window).

In one embodiment, the phrase that the third-type bit block is received in the first time window refers to: the first bit block is received in the first time window.

In one embodiment, the phrase that the third-type bit block is received in the first time window refers to: a bit block generated by the first bit block is received in the first time window.

In one embodiment, the phrase that the third-type bit block is received in the first time window refers to: a bit block generated by the first bit block and the first bit block are received in the first time window.

In one embodiment, the meaning of the phrase that the third-type bit block is not received in the first time window comprises: any third-type bit block is not received in the first time window.

In one embodiment, the meaning of the phrase that the third-type bit block is not received in the first time window comprises: the first bit block and any bit block generated by the first bit block are not received in the first time window.

In one embodiment, the meaning of the phrase that the third-type bit block is not received in the first time window comprises: the second node drops receiving the first bit block and any bit block generated by the first bit block in the first time window.

In one embodiment, the meaning of the phrase that the third-type bit block is not received in the first time window comprises: the second node drops receiving the first bit block and any bit block generated by the first bit block.

In one embodiment, the third-type bit block in the present application being received in a time window (or a time sub-window) refers to: the third-type bit block is received by the second node in the time window (or the time sub-window).

In one embodiment, the third-type bit block in the present application not being received in a time window (or a time sub-window) refers to: the third-type bit block is not received by the second node in the time window (or the time sub-window).

In one embodiment, in the present application, the meaning of one bit block generating another bit block comprises: the another bit block is acquired after the bit block is through one or multiple of logical AND, logical OR, XOR, deleting bit, precoding, adding repeated bit or zero padding.

In one embodiment, in the present application, the meaning of one bit block generating another bit block refers to: the another bit block is acquired after the bit block is through one or multiple of logical AND, logical OR, XOR, deleting bit, precoding, adding repeated bit or zero padding.

Embodiment 17

Figure 17:
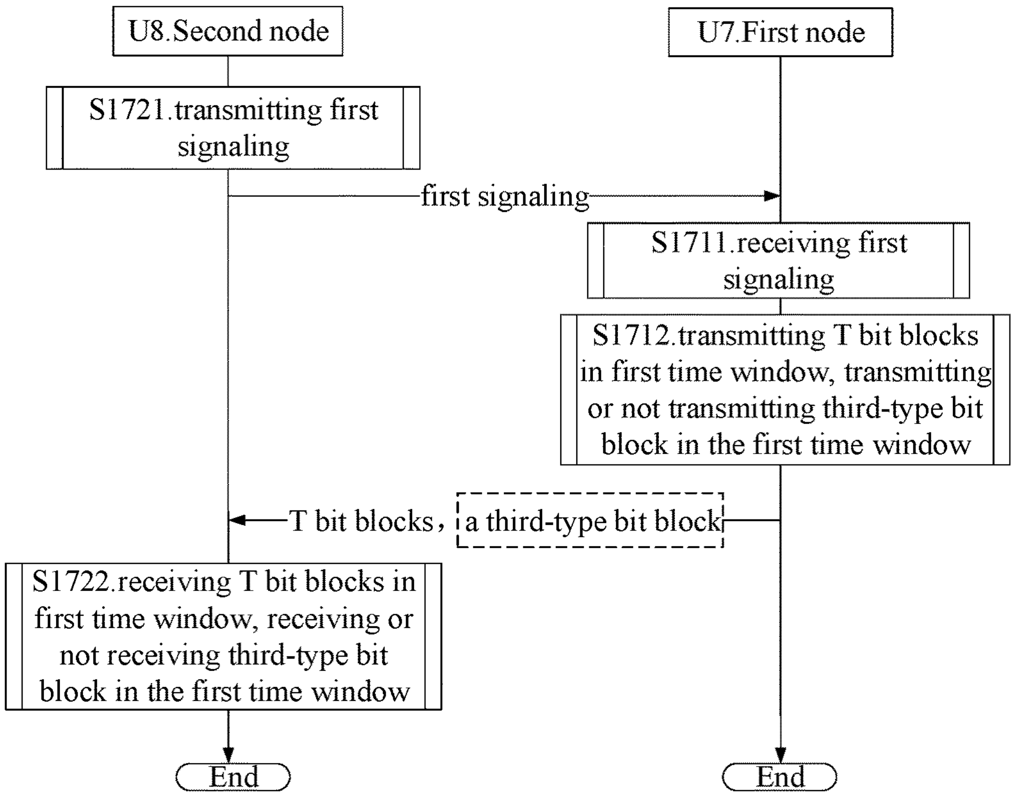
FIG. 17 illustrates a flowchart of signal transmission according to one embodiment of the present application.

Embodiment 17 illustrates a flowchart of signal transmission according to one embodiment in the present application, as shown in FIG. 17. In FIG. 17, a first node U7 and a second node U8 are in communication via an air interface. Particularly, bit blocks in the dotted box in FIG. 17 are transmitted or not transmitted.

The first node U7 receives a first signaling in step S1711; transmits T bit blocks in a first time window in step S1712, and transmits or does not transmit a third-type bit block in the first time window.

The second node U8 transmits a first signaling in step S1721; receives T bit blocks in a first time window in step S1722, and receives or does not receive a third-type bit block in the first time window.

In embodiment 17, T is a positive integer greater than 1; a first bit block is associated with the first signaling, and the first bit block does not belong to the T bit blocks; any of the T bit blocks is a first-type bit block or a second-type bit block, the first-type bit block is a bit block comprising a HARQ-ACK information bit, and the second-type bit block is a bit block different from the first-type bit block and having a same priority as the first-type bit block; whether a third bit block is transmitted in the first time window is related to a number of the first-type bit block(s) in the T bit blocks, the third-type bit block is a bit block associated with the first bit block.

In one embodiment, the first node U7 is the first node in the present application.

In one embodiment, the second node U8 is the second node in the present application.

In one embodiment, the first node U7 is a UE.

In one embodiment, the second node U7 is a base station.

In one embodiment, the second node U8 is a base station.

In one embodiment, the second node U8 is a UE.

In one embodiment, an air interface between the second node U8 and the first node U7 is a Uu interface.

In one embodiment, an air interface between the second node U8 and the first node U7 comprises a cellular link.

In one embodiment, an air interface between the second node U8 and the first node U7 is a PC5 interface.

In one embodiment, an air interface between the second node U8 and the first node U7 comprises a sidelink.

In one embodiment, an air interface between the second node U8 and the first node U7 comprises a radio interface between a base station and a UE.

In one embodiment, an air interface between the second node U8 and the first node U7 comprises a radio interface between UEs.

Embodiment 18

Figure 18:
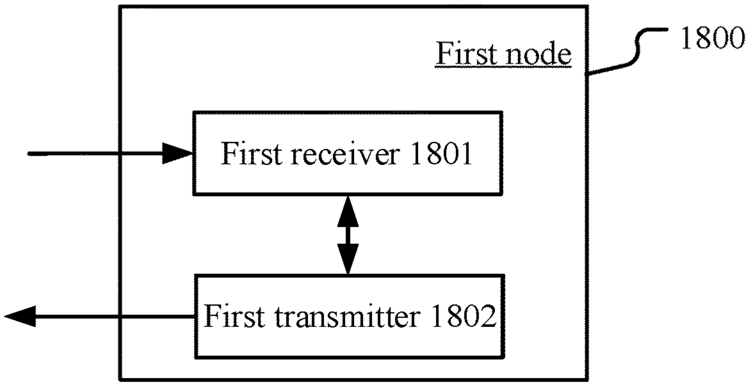
FIG. 18 illustrates a structure block diagram of a processor in a first node according to one embodiment of the present application.

Embodiment 18 illustrates a structure block diagram of a processor in a first node, as shown in FIG. 18. In FIG. 18, a processor 1800 of a first node comprises a first receiver 1801 and a first transmitter 1802.

In one embodiment, the first node 1800 is a UE.

In one embodiment, the first node 1800 is a relay node.

In one embodiment, the first node 1800 is a vehicle-mounted communication device.

In one embodiment, the first node 1800 is a UE that supports V2X communications.

In one embodiment, the first node 1800 is a relay node that supports V2X communications.

In one embodiment, the first receiver 1801 comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1801 comprises at least the first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1801 comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1801 comprises at least the first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1801 comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1802 comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1802 comprises at least first five the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1802 comprises at least first four the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1802 comprises at least first three the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1802 comprises at least first two the antenna 452, the transmitter 454, the multi-antenna transmitting processor 457, the transmitting processor 468, the controller/processor 459, the memory 460, and the data source 467 in FIG. 4 of the present application.

In one embodiment, the first receiver 1801 receives a second signal; the first transmitter 1802 transmits a first signal in a target radio resource pool, the first signal carries a third bit block and a fourth bit block; herein, a first bit block is associated with the second signal; a second bit block corresponds to a target index, the target index is a first index or a second index, and the first index is different from the second index; the third bit block is related to the first bit block, and the fourth bit block is related to the second bit block; a determination method of the target radio resource pool is related to the target index.

In one embodiment, the first receiver 1801, receives a first signaling; herein, the first signaling comprises scheduling information of the second signal.

In one embodiment, the meaning of the phrase that a determination method of the target radio resource pool is related to the target index comprises: when the target index is the second index, the first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, the first signaling is used to indicate the target radio resource pool from the target radio resource pool list, M being a positive integer greater than 1; when the target index is the first index, the first bit block and the second bit block are both used to determine a first number, N radio resource pools respectively correspond to N number ranges, the target radio resource pool is a radio resource pool corresponding to a first number range among the N radio resource pools, the first number range is a number range comprising the first number among the N number ranges, N being a positive integer greater than 1.

In one embodiment, the meaning of the phrase that a determination method of the target radio resource pool is related to the target index comprises: when the target index is the second index, the first bit block and the second bit block are both used to determine a second number, M radio resource pool lists respectively correspond to M number ranges, a target radio resource pool list is a radio resource pool list corresponding to a second number range among the M radio resource pool lists, the second number range is a number range comprising the second number among the M number ranges, the first signaling is used to indicate the target radio resource pool from the target radio resource pool list, M being a positive integer greater than 1; when the target index is the first index, the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one embodiment, the meaning of the phrase that a determination method of the target radio resource pool is related to the target index comprises: when the target index is the second index, the first bit block and the second bit block are both used to determine a second number, N radio resource pools respectively correspond to N number ranges, the target radio resource pool is a radio resource pool corresponding to a second number range among the N radio resource pools, the second number range is a number range comprising the second number among the N number ranges, N being a positive integer greater than 1; when the target index is the first index, the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one embodiment, the first bit block comprises a UCI bit, and the second bit block comprises a UCI bit.

In one embodiment, the first bit block corresponds to the second index.

In one embodiment, both the first index and the second index are priority indexes.

In one embodiment, a first radio resource pool is reserved for the first bit block, while a second radio resource pool is reserved for the second bit block; the first radio resource pool and the second radio resource pool are overlapping in time domain.

In one embodiment, the first receiver 1801 receives a third signal; herein, the second bit block is associated with the third signal.

In one embodiment, the first receiver 1801 receives a second signal; the first transmitter 1802 transmits a first signal in a target radio resource pool, the first signal carries a third bit block and a fourth bit block; herein, a first bit block is associated with the second signal; the third bit block is related to the first bit block, and the fourth bit block is related to a second bit block; the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one embodiment, the first receiver 1801, receives a first signaling; the first transmitter 1802 transmits a first signal in a target radio resource pool, the first signal carries a first bit block and a second bit block; herein, the first signaling is used to determine the target radio resource pool; a number of bit(s) comprised in the second bit block (size of the second bit block) is used to determine a first intermediate number, the first bit block and a first limiting parameter value are used to determine a second intermediate number, a second limiting parameter value is used to determine a third intermediate number, and the third intermediate number is linearly correlated with the second limiting parameter value; a number of resource elements used to transmit the second bit block in the target radio resource pool is not greater than a smallest one among a result of the first intermediate number rounding to an integer, the second intermediate number and a result of the third intermediate number rounding to an integer.

In one embodiment, the first intermediate number, the second intermediate number and the third intermediate number are used to determine the number of the RE(s) used to transmit the second bit block in the target radio resource pool.

In one embodiment, the number of the RE(s) used to transmit the second bit block in the target radio resource pool is equal to a smallest one among a result of the first intermediate number rounding to an integer, the second intermediate number and a result of the third intermediate number rounding to an integer.

In one embodiment, a first actual resource amount is used to determine a fourth intermediate number; the number of the RE(s) used to transmit the second bit block in the target radio resource pool is equal to a smallest one among the fourth of a result of the first intermediate number rounding to an integer, the second intermediate number, a result of the third intermediate number rounding to an integer, and the fourth intermediate number.

In one embodiment, the first limiting parameter value is configured for a first priority index, and the second limiting parameter value is configured for a second priority index.

In one embodiment, the first bit block comprises a HARQ-ACK information bit corresponding to a first priority index.

In one embodiment, the second bit block comprises a HARQ-ACK information bit corresponding to a second priority index.

In one embodiment, the first signal also carries a transport block.

In one embodiment, the first signaling indicates a first priority index.

In one embodiment, the first receiver 1801 receives a first signaling; the first transmitter 1802 transmits T bit blocks in a first time window, T being a positive integer greater than 1; herein, a first bit block is associated with the first signaling, and the first bit block does not belong to the T bit blocks; any of the T bit blocks is a first-type bit block or a second-type bit block, the first-type bit block is a bit block comprising a HARQ-ACK information bit, and the second-type bit block is a bit block different from the first-type bit block and having a same priority as the first-type bit block; whether a third bit block is transmitted in the first time window is related to a number of the first-type bit block(s) in the T bit blocks, the third-type bit block is a bit block associated with the first bit block.

Embodiment 19

Figure 19:
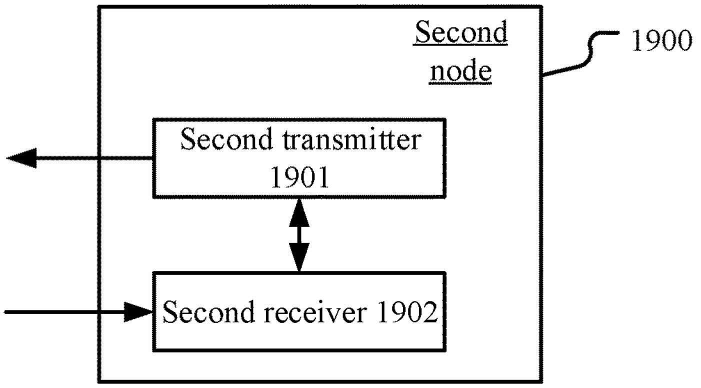
FIG. 19 illustrates a structure block diagram of a processor in second node according to one embodiment of the present application.

Embodiment 19 illustrates a structure block diagram of a processor in a second node, as shown in FIG. 19. In FIG. 19, a processor 1900 of a second node comprises a second transmitter 1901 and a second receiver 1902.

In one embodiment, the second node 1900 is a UE.

In one embodiment, the second node 1900 is a base station.

In one embodiment, the second node 1900 is a relay node.

In one embodiment, the second node 1900 is a vehicle-mounted communication device.

In one embodiment, the second node 1900 is a UE supporting V2X communications.

In one embodiment, the second transmitter 1901 comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1901 comprises at least the first five of the antenna 420, the transmitter 418, the multi-antenna transmitting processor 471, the transmitting processor 416, the controller/processor 475 and the memory 476 in FIG. 4 of the present application.

In one embodiment, the second transmitter 1901 comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1901 comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1901 comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1902 comprises at least one of the antenna 420, the receiver 418, the multi-antenna receiving processor 472, the receiving processor 470, the controller/processor 475 or the memory 476 in FIG. 4 of the present application.

In one embodiment, the second receiver 1902 comprises at least first five of the antenna 420, the receiver 418, the multi-antenna receiving processor 472, the receiving processor 470, the controller/processor 475 and the memory 476 in FIG. 4 of the present application.

In one embodiment, the second receiver 1902 comprises at least first four of the antenna 420, the receiver 418, the multi-antenna receiving processor 472, the receiving processor 470, the controller/processor 475 and the memory 476 in FIG. 4 of the present application.

In one embodiment, the second receiver 1902 comprises at least first three of the antenna 420, the receiver 418, the multi-antenna receiving processor 472, the receiving processor 470, the controller/processor 475 and the memory 476 in FIG. 4 of the present application.

In one embodiment, the second receiver 1902 comprises at least first two of the antenna 420, the receiver 418, the multi-antenna receiving processor 472, the receiving processor 470, the controller/processor 475 and the memory 476 in FIG. 4 of the present application.

In one embodiment, the second transmitter 1901 transmits a second signal; the second receiver 1902 receives a first signal in a target radio resource pool, and the first signal carries a third bit block and a fourth bit block; herein, a first bit block is associated with the second signal; a second bit block corresponds to a target index, the target index is a first index or a second index, and the first index is different from the second index; the third bit block is related to the first bit block, and the fourth bit block is related to the second bit block; a determination method of the target radio resource pool is related to the target index.

In one embodiment, the second transmitter 1901 transmits a first signaling; herein, the first signaling comprises scheduling information of the second signal.

In one embodiment, the second transmitter 1901 transmits a third signal; herein, the second bit block is associated with the third signal.

In one embodiment, the second transmitter 1901 transmits a second signal; the second receiver 1902 receives a first signal in a target radio resource pool, and the first signal carries a third bit block and a fourth bit block; herein, a first bit block is associated with the second signal; the third bit block is related to the first bit block, and the fourth bit block is related to a second bit block; the first bit block and the second bit block are both used to determine a first number, K radio resource pool lists respectively correspond to K number ranges, a target radio resource pool list is a radio resource pool list corresponding to a first number range among the K radio resource pool lists, the first number range is a number range comprising the first number among the K number ranges, the target radio resource pool is a radio resource pool with a default sequential index in the target radio resource pool list, and a number of radio resource pools comprised in at least one of the K radio resource pool lists is greater than 1, K being a positive integer greater than 1.

In one embodiment, the second transmitter 1901 transmits a first signaling; the second receiver 1902 receives a first signal in a target radio resource pool, and the first signal carries a first bit block and a second bit block; herein, the first signaling is used to determine the target radio resource pool; a number of bit(s) comprised in the second bit block (size of the second bit block) is used to determine a first intermediate number, the first bit block and a first limiting parameter value are used to determine a second intermediate number, a second limiting parameter value is used to determine a third intermediate number, and the third intermediate number is linearly correlated with the second limiting parameter value; a number of resource elements used to transmit the second bit block in the target radio resource pool is not greater than a smallest one among a result of the first intermediate number rounding to an integer, the second intermediate number and a result of the third intermediate number rounding to an integer.

In one embodiment, the second transmitter 1901 transmits a first signaling; the second receiver 1902 receives T bit blocks in a first time window, T being a positive integer greater than 1; herein, a first bit block is associated with the first signaling, and the first bit block does not belong to the T bit blocks; any of the T bit blocks is a first-type bit block or a second-type bit block, the first-type bit block is a bit block comprising a HARQ-ACK information bit, and the second-type bit block is a bit block different from the first-type bit block and having a same priority as the first-type bit block; whether a third bit block is received in the first time window is related to a number of the first-type bit block(s) in the T bit blocks, and the third-type bit block is a bit block associated with the first bit block.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations, test device, test equipment, test instrument and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE), comprising:

a receiver configured to receive a physical downlink shared channel (PDSCH); and a transmitter configured to transmit a physical uplink control channel (PUCCH) in a PUCCH resource pool, wherein the PUCCH carries a first uplink control information (UCI) and a second UCI, wherein the first UCI includes hybrid automatic repeat request acknowledgement (HARQ-ACK) information that is associated with the PDSCH, the second UCI is associated with a priority index that is one of a first priority index or a second priority index different from the first priority index, wherein the UE determines the PUCCH resource pool using a resource determination method that is associated with the priority index, and wherein, in the resource determination method, the UE determines the PUCCH resource pool based on a sum of a number of bits of the first UCI and a number of bits of the second UCI.

2. The UE according to claim 1, wherein:

the receiver is configured to receive downlink control information (DCI) including scheduling information of the PDSCH.

3. The UE according to claim 2, wherein when the priority index is the second priority index, M PUCCH resource pool lists respectively correspond to M number ranges, a PUCCH resource pool list corresponds to a second number range among the M PUCCH resource pool lists, the second number range is a number range comprising the sum among the M number ranges, the DCI indicates the PUCCH resource pool from the PUCCH resource pool list, and wherein when the priority index is the first priority index, the first UCI and the second UCI are both used to determine a first number, N PUCCH resource pools respectively correspond to N number ranges, the PUCCH resource pool corresponds to a first number range among the N PUCCH resource pools, the first number range is a number range comprising the first number among the N number ranges, M being a positive integer greater than 1; N being a positive integer greater than 1.

4. The UE according to claim 2, wherein when the priority index is the second priority index, M PUCCH resource pool lists respectively correspond to M number ranges, a PUCCH resource pool list corresponds to a second number range among the M PUCCH resource pool lists, the second number range is a number range comprising the sum of bits of the first UCI and the second UCI among the M number ranges, the DCI indicates the PUCCH resource pool from the PUCCH resource pool list, and wherein when the priority index is the first priority index, the first UCI and the second UCI are both used to determine a first number, K PUCCH resource pool lists respectively correspond to K number ranges, a PUCCH resource pool list corresponds to a first number range among the K PUCCH resource pool lists, the first number range is a number range comprising the first number among the K number ranges, the PUCCH target resource pool is a resource pool with a default sequential index in the PUCCH resource pool list, and a number of PUCCH resource pools comprised in at least one of the K PUCCH resource pool lists is greater than 1, K being a positive integer greater than 1 , M being a positive integer greater than 1.

5. The UE according to claim 1, wherein when the priority index is the second priority index, N PUCCH resource pools respectively correspond to N number ranges, the PUCCH resource pool corresponds to a second number range among the N PUCCH resource pools, the second number range is a number range comprising the second number among the N number ranges, N being a positive integer greater than 1, and wherein when the priority index is the first priority index, the first UCI and the second UCI are both used to determine a first number, K PUCCH resource pool lists respectively correspond to K number ranges, a PUCCH radio resource pool list corresponds to a first number range among the K PUCCH resource pool lists, the first number range is a number range comprising the first number among the K number ranges, the PUCCH radio resource pool is a radio resource pool with a default sequential index in the PUCCH radio resource pool list, and a number of PUCCH resource pools comprised in at least one of the K PUCCH resource pool lists is greater than 1, K being a positive integer greater than 1.

6. The UE according to claim 3, wherein the first number is a sum of the number of bits of the first UCI and the number of bits of the second UCI.

7. The UE according to claim 3, wherein the second UCI includes HARQ-ACK information of an SPS PDSCH reception.

8. A base station, comprising:

a transmitter configured to transmit a physical downlink shared channel (PDSCH); and a receiver configured to receive a physical uplink control channel (PUCCH) in a PUCCH resource pool, wherein the PUCCH carries a first uplink control information (UCI) and a second UCI, wherein the first UCI includes hybrid automatic repeat request acknowledgement (HARQ-ACK) information that is associated with the PDSCH, the second UCI is associated with a priority index that is one of a first priority index or a second priority index different from the first priority index, wherein the PUCCH resource pool is determined using a resource determination method that is associated with the priority index, and wherein, in the resource determination method, the PUCCH resource pool is determined based on a sum of a number of bits of the first UCI and a number of bits of the second UCI.

9. The base station according to claim 8, wherein:

the transmitter is configured to transmit downlink control information (DCI) including the PDSCH.

10. The base station according to claim 9, wherein when the priority index is the second priority index, M PUCCH resource pool lists respectively correspond to M number ranges, a PUCCH resource pool list corresponds to a second number range among the M PUCCH resource pool lists, the second number range is a number range comprising the sum among the M number ranges, the DCI indicates the PUCCH resource pool from the PUCCH resource pool list, M being a positive integer greater than 1; when the priority index is the first priority index, the first UCI and the second UCI are both used to determine a first number, N PUCCH resource pools respectively correspond to N number ranges, the PUCCH resource pool corresponds to a first number range among the N PUCCH resource pools, the first number range is a number range comprising the first number among the N number ranges, N being a positive integer greater than 1;

or wherein when the priority index is the second priority index, M PUCCH resource pool lists respectively correspond to M number ranges, a PUCCH resource pool list corresponds to a second number range among the M PUCCH resource pool lists, the second number range is a number range comprising the sum among the M number ranges, the DCI indicates the PUCCH resource pool from the PUCCH resource pool list, M being a positive integer greater than 1, and when the priority index is the first priority index, the first UCI and the second UCI are both used to determine a first number, K PUCCH resource pool lists respectively correspond to K number ranges, a PUCCH resource pool list corresponds to a first number range among the K PUCCH resource pool lists, the first number range is a number range comprising the first number among the K number ranges, the PUCCH resource pool is a resource pool with a default sequential index in the PUCCH resource pool list, and a number of PUCCH resource pools comprised in at least one of the K PUCCH resource pool lists is greater than 1, K being a positive integer greater than 1;

or wherein when the priority index is the second priority index, N PUCCH resource pools respectively correspond to N number ranges, the PUCCH resource pool corresponds to a second number range among the N PUCCH resource pools, the second number range is a number range comprising the sum among the N number ranges, N being a positive integer greater than 1, and when the priority index is the first priority index, the first UCI and the second UCI are both used to determine a first number, K PUCCH resource pool lists respectively correspond to K number ranges, a PUCCH resource pool list corresponds to a first number range among the K PUCCH resource pool lists, the first number range is a number range comprising the first number among the K number ranges, the PUCCH resource pool is a resource pool with a default sequential index in the PUCCH resource pool list, and a number of PUCCH resource pools comprised in at least one of the K PUCCH resource pool lists is greater than 1, K being a positive integer greater than 1.

11. The base station according to claim 10, wherein the first number is a sum of the number of bits of the first UCI and the number of bits of the second UCI;

or wherein the second UCI only comprises HARQ-ACK information for an SPS PDSCH reception.

12. A method, comprising:

receiving a physical downlink shared channel (PDSCH);

transmitting a physical uplink control channel (PUCCH) in a PUCCH resource pool, wherein the PUCCH carries a first uplink control information (UCI) and a second UCI, the first UCI includes hybrid automatic repeat request acknowledgement (HARQ-ACK) information that is associated with the PDSCH, and the second UCI is associated with a priority index that is one of a first priority index or a second priority index different from the first priority index;

determining the PUCCH resource pool using a resource determination method that is associated with the priority index; and determining, in the resource determination method, the PUCCH resource pool based on a sum of a number of bits of the first UCI and a number of bits of the second UCI.

13. The method according to claim 12, comprising:

receiving downlink control information (DCI) including scheduling information of the PDSCH.

14. The method according to claim 13, wherein when the priority index is the second priority index, M PUCCH resource pool lists respectively correspond to M number ranges, a PUCCH resource pool list corresponds to a second number range among the M PUCCH resource pool lists, the second number range is a number range comprising the sum among the M number ranges, the DCI indicates the PUCCH resource pool from the PUCCH resource pool list, and wherein when the priority index is the first priority index, the first UCI and the second UCI are both used to determine a first number, N PUCCH resource pools respectively correspond to N number ranges, the PUCCH resource pool corresponds to a first number range among the N PUCCH resource pools, the first number range is a number range comprising the first number among the N number ranges, M being a positive integer greater than 1; N being a positive integer greater than 1.

15. The method according to claim 13, wherein when the priority index is the second priority index, M PUCCH resource pool lists respectively correspond to M number ranges, a PUCCH resource pool list corresponds to a second number range among the M PUCCH resource pool lists, the second number range is a number range comprising the sum of bits of the first UCI and the second UCI among the M number ranges, the DCI indicates the PUCCH resource pool from the PUCCH resource pool list, and wherein when the priority index is the first priority index, the first UCI and the second UCI are both used to determine a first number, K PUCCH resource pool lists respectively correspond to K number ranges, a PUCCH resource pool list corresponds to a first number range among the K PUCCH resource pool lists, the first number range is a number range comprising the first number among the K number ranges, the PUCCH resource pool is a resource pool with a default sequential index in the PUCCH resource pool list, and a number of PUCCH resource pools comprised in at least one of the K PUCCH resource pool lists is greater than 1, K being a positive integer greater than 1 , M being a positive integer greater than 1.

16. The method according to claim 12, wherein when the priority index is the second priority index, N PUCCH resource pools respectively correspond to N number ranges, the PUCCH resource pool corresponds to a second number range among the N PUCCH resource pools, the second number range is a number range comprising the second number among the N number ranges, N being a positive integer greater than 1, and wherein when the priority index is the first priority index, the first UCI and the second UCI are both used to determine a first number, K PUCCH resource pool lists respectively correspond to K number ranges, a PUCCH radio resource pool list corresponds to a first number range among the K PUCCH resource pool lists, the first number range is a number range comprising the first number among the K number ranges, the PUCCH radio resource pool is a radio resource pool with a default sequential index in the PUCCH radio resource pool list, and a number of PUCCH resource pools comprised in at least one of the K PUCCH resource pool lists is greater than 1, K being a positive integer greater than 1.

17. The method according to claim 14, wherein the first number is the sum of the number of bits of the first UCI and the number of bits of the second UCI.

18. The method according to claim 14, wherein the second UCI includes HARQ-ACK information of an SPS PDSCH reception.

* * * * *